United States Patent
Cass et al.

(10) Patent No.: US 12,482,243 B1
(45) Date of Patent: Nov. 25, 2025

(54) LEVERAGING ENVIRONMENTAL INFORMATION TO FACILITATE TRAINING AND EVALUATING MACHINE LEARNING MODELS AND RELATED TECHNOLOGY

(71) Applicant: Agility Robotics, Inc., Pittsburgh, PA (US)

(72) Inventors: Shelby Cass, Corvallis, OR (US); Brent Griffin, Dexter, MI (US); Robert DeBortoli, Corvallis, OR (US)

(73) Assignee: Agility Robotics, Inc., Salem, OR (US)

( * ) Notice: Subject to any disclaimer, the term of this patent is extended or adjusted under 35 U.S.C. 154(b) by 270 days.

(21) Appl. No.: 18/488,895

(22) Filed: Oct. 17, 2023

Related U.S. Application Data

(60) Provisional application No. 63/508,793, filed on Jun. 16, 2023.

(51) Int. Cl.
  *G06V 10/766* (2022.01)
  *B25J 9/16* (2006.01)
  (Continued)

(52) U.S. Cl.
  CPC ............ *G06V 10/776* (2022.01); *B25J 9/163* (2013.01); *B25J 9/1689* (2013.01); *B25J 9/1697* (2013.01);
  (Continued)

(58) Field of Classification Search
  CPC ..... G06V 10/776; G06V 10/774; B25J 9/163; B25J 9/1689; B25J 9/1697;
  (Continued)

(56) References Cited

U.S. PATENT DOCUMENTS 11,097,418 B2   8/2021   Nagarajan
11,144,798 B2   10/2021  Rizzoli et al.
(Continued)

FOREIGN PATENT DOCUMENTS

WO  WO-2022229657 A1 * 11/2022  ........... G01C 21/005
WO  WO-2024040199 A2 *  2/2024  ........... B25J 15/0616

OTHER PUBLICATIONS

"A Fast Stochastic Contact Model for Planar Pushing and Grasping: Theory and Experimental Validation." J Zhou, JA Bagnell, MT Mason. arXiv preprint arXiv:1705.10664 (May 30, 2017).

*Primary Examiner* — Shefali D Goradia

(57) ABSTRACT

A method in accordance with at least some embodiments of the present technology includes providing an image and a plurality of indicators. The image depicts an environment of a robot and corresponds to vision data collected by a vision sensor of the robot at a given timestep of a plurality of timesteps. Indicators among the plurality of indicators correspond to respective expected object locations within the environment. The method further includes receiving user input indicating a user identified state of the given one of the expected object locations based at least partially on the image. Finally, the method includes associating additional vision data with the user identified state of the given one of the expected object locations at least partially in response to receiving the user input. The additional vision data is collected by the vision sensor at additional timesteps of the plurality of timesteps.

20 Claims, 42 Drawing Sheets

(51) Int. Cl.
 *G06F 3/04842* (2022.01)
 *G06T 7/00* (2017.01)
 *G06T 7/73* (2017.01)
 *G06V 10/774* (2022.01)
 *G06V 10/776* (2022.01)

(52) U.S. Cl.
 CPC ........ *G06F 3/04842* (2013.01); *G06T 7/0004* (2013.01); *G06T 7/74* (2017.01); *G06V 10/774* (2022.01); *G06T 2200/24* (2013.01); *G06T 2207/20081* (2013.01); *G06T 2207/30164* (2013.01)

(58) Field of Classification Search
 CPC ..... G06F 3/04842; G06T 7/0004; G06T 7/74; G06T 2200/24; G06T 2207/20081; G06T 2207/30164
 See application file for complete search history.

(56) References Cited

U.S. PATENT DOCUMENTS

| | | | |
|---|---|---|---|
| 11,348,269 B1* | 5/2022 | Ebrahimi Afrouzi | G01S 17/48 |
| 2015/0231782 A1* | 8/2015 | Kawamoto | B25J 9/1697 |
| | | | 901/1 |
| 2017/0062016 A1 | 3/2017 | Samra et al. | |
| 2022/0011779 A1 | 1/2022 | Kim | |
| 2022/0126451 A1 | 4/2022 | Hopkinson et al. | |
| 2023/0219231 A1* | 7/2023 | Okada | G06T 7/73 |
| | | | 700/259 |
| 2023/0364798 A1 | 11/2023 | Akihiro | |
| 2024/0144354 A1* | 5/2024 | Glaser | G06Q 10/087 |
| 2024/0371138 A1 | 11/2024 | Keegan | |

\* cited by examiner

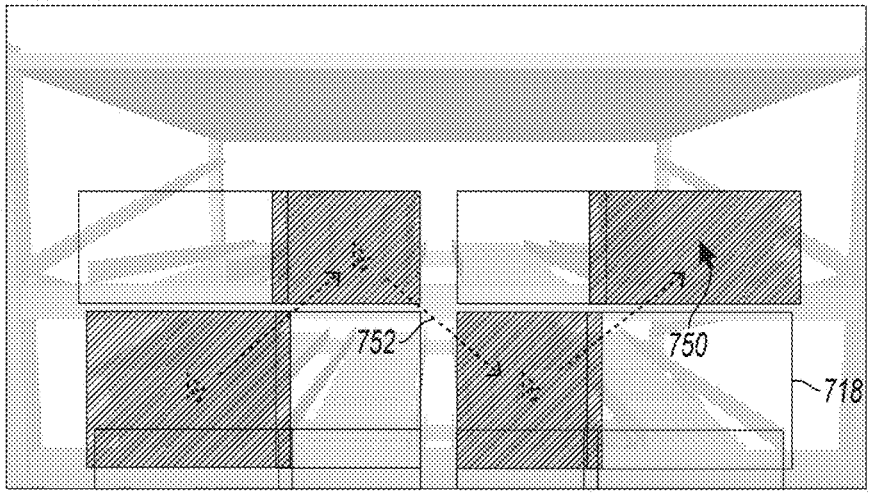
*Fig. 50*
| Bay 1 | Vacant |
|---|---|
| Bay 2 | Occupied |
| Bay 3 | Vacant |
| Bay 4 | Occupied |
| Bay 5 | Occupied |
| Bay 6 | Vacant |
| Bay 7 | Occupied |
| Bay 8 | Vacant |
| Bay 9 | Vacant |
| Bay 10 | Vacant |
| Bay 11 | Vacant |
| Bay 12 | Vacant |
*Fig. 51*
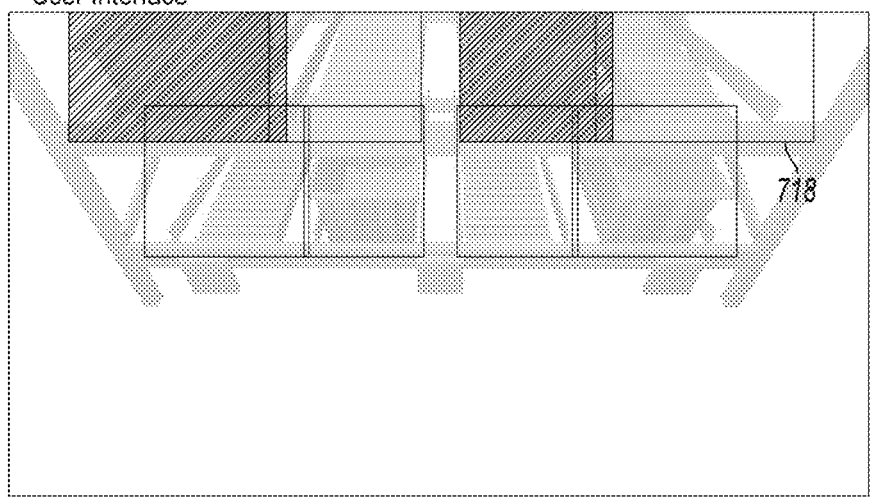
*Fig. 52*

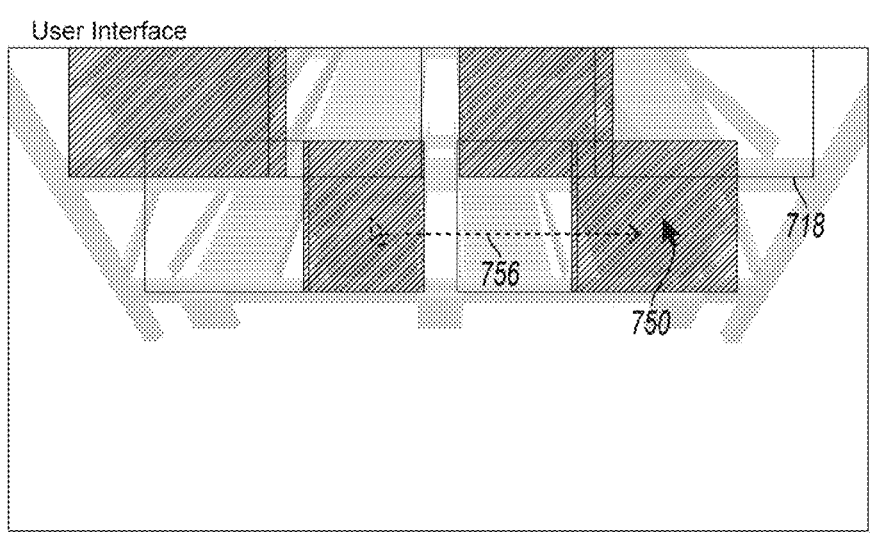
Fig. 53
Fig. 54
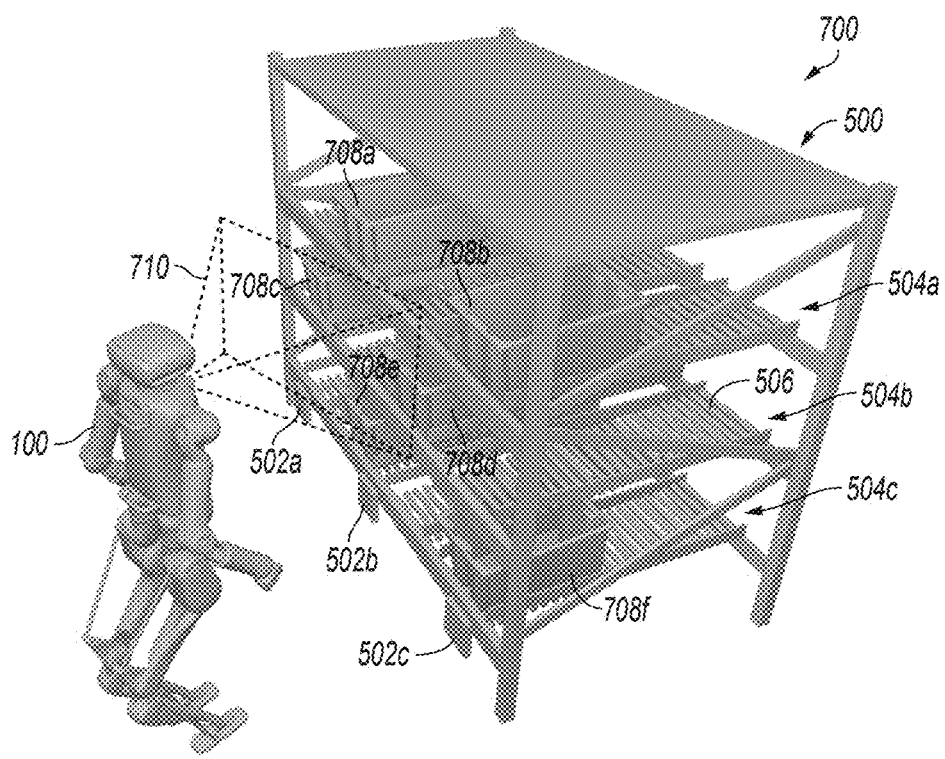
Fig. 55

LEVERAGING ENVIRONMENTAL INFORMATION TO FACILITATE TRAINING AND EVALUATING MACHINE LEARNING MODELS AND RELATED TECHNOLOGY

CROSS-REFERENCE TO RELATED APPLICATION

This claims the benefit of U.S. Provisional Application No. 63/508,793, filed Jun. 16, 2023. The foregoing application is incorporated herein by reference in its entirety. To the extent the foregoing application or any other material incorporated by reference conflicts with the present disclosure, the present disclosure controls.

TECHNICAL FIELD

The present technology relates to machine learning models, such as machine learning models used for object detection in robotics.

BACKGROUND

Many simple tasks that humans currently perform are amenable to automation using robotics. Among such tasks are those involving moving goods between locations within distribution centers. For example, after a trailer containing goods arrives at a distribution center, human workers may move the goods from the trailer onto conveyors that carry the goods to other locations within the distribution center for further processing. Similarly, although conveyors can be used to deliver outgoing goods to loading docks and to palletizing stations at distribution centers, human workers are still needed to move the goods from the conveyors onto outgoing trailers and pallets. As another example, human workers at order-fulfillment distribution centers are often tasked with retrieving specific goods for last-mile delivery. Modern order-fulfillment distribution centers are massive and handle thousands of different goods. Even with the aid of sophisticated route optimization systems, locating and retrieving specific goods to fill orders as needed is labor intensive. Indeed, it is not uncommon for human workers at order-fulfillment distribution centers to walk ten or more miles a day. Despite the apparent simplicity of loading and unloading trailers and pallets and of retrieving specific goods for last-mile delivery, these tasks have conventionally been difficult or impossible to fully automate.

In the forgoing examples and in other cases, the use of human workers to perform repetitive and time-consuming tasks is inefficient. Human effort would be far better applied to more complex tasks, particularly those involving creativity and advanced problem solving. Presently, however, the need for distribution centers is large and rapidly increasing. Some analysts forecast a shortage of a million or more distribution-center workers within the next ten to fifteen years. Due to the importance of this field, even small improvements in efficiency can have major impacts on macroeconomic productivity. For these and/or other reasons, there is a significant and growing need for innovation that supports automating simple tasks that humans currently perform at distribution centers and elsewhere.

BRIEF DESCRIPTION OF THE DRAWINGS

Certain aspects of the present technology can be better understood with reference to the following drawings. The relative dimensions in the drawings may be to scale with respect to some embodiments of the present technology. With respect to other embodiments, the drawings may not be to scale. The drawings may also be enlarged arbitrarily. For clarity, reference-number labels for analogous components or features may be omitted when the appropriate reference-number labels for such analogous components or features are clear in the context of the specification and all of the drawings considered together. Furthermore, the same reference numbers may be used to identify analogous components or features in multiple described embodiments.

FIG. 50 is a representation of a user interface displaying the bounding shapes of FIG. 48 projected onto the two-dimensional input of FIG. 44 after user selection of a first set of the bounding shapes during an embodiment of the method of FIG. 38.

FIG. 51 is a representation of a database of a labeler of the system of FIG. 7 after the user selections of FIG. 50 during an embodiment of the method of FIG. 38.

FIG. 52 is a representation of the user interface of FIG. 50 displaying the bounding shapes of FIG. 49 projected onto the two-dimensional input of FIG. 45 after the user selections of FIG. 50 and before any additional user selections during an embodiment of the method of FIG. 38.

FIG. 53 is a representation of the user interface of FIG. 50 displaying the bounding shapes of FIG. 49 projected onto the two-dimensional input of FIG. 45 after the user selections of FIG. 50 and after user selection of a second set of the bounding shapes during an embodiment of the method of FIG. 38.

FIG. 54 is a representation of the database of FIG. 51 after the user selections of FIGS. 50 and 53 during an embodiment of the method of FIG. 38.

FIG. 55 is a perspective view of the robot of FIGS. 1-3, the support structure of FIG. 12, the objects of FIG. 42, and the first field of view of the first camera of the robot at a time during an embodiment of the method of FIG. 38.

DETAILED DESCRIPTION

Figure 1:
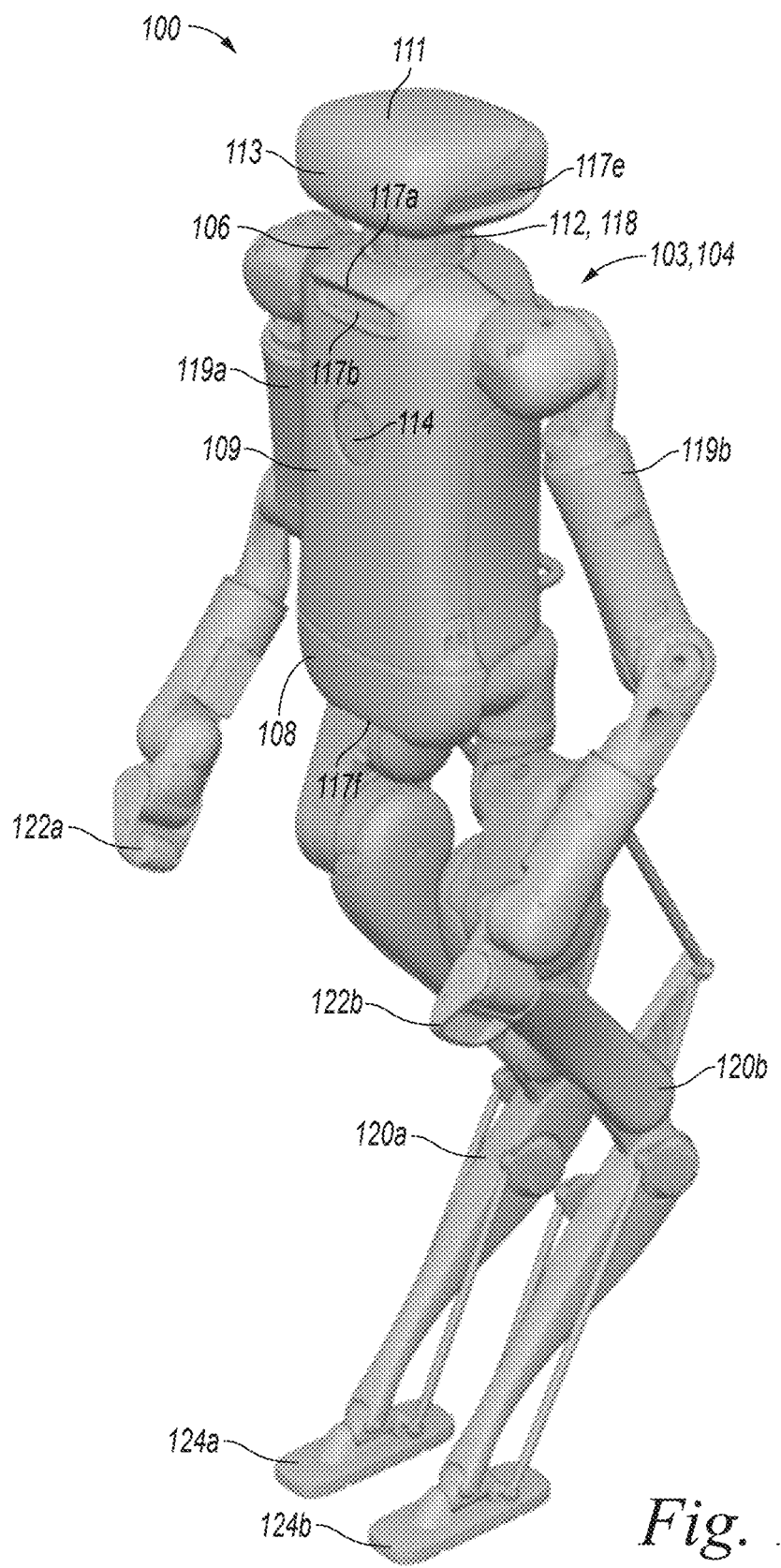
FIGS. 1-3 are, respectively, a first perspective view, a second perspective view, and a front profile view of a robot in accordance with at least some embodiments of the present technology.

Humans receive information about the environment via senses, analyze the information, and use the results to control behaviors. This process of sensing and control is also important in robotics. Modern robots are often expected to work in dynamic environments and to perform dynamic tasks. This calls for at least some level of sensing and control. In particular, many robots require a capacity for object detection. Object detection involves sensing the presence or absence of objects in an environment, sensing the type of objects in an environment, and/or sensing other object-related information. Robots that move objects in distribution centers and elsewhere, for example, may require the ability to identify objects to be moved and the ability to distinguish such objects from other objects that should not be moved. For a robot to be a useful stand-in for a human worker, these and other forms of object detection should be extremely reliable.

Machine learning is a recent advancement with great promise to improve various capabilities of robots, including capabilities related to object detection. In a machine learning process, an algorithm uses training data to adjust the weights and biases it associates with features of incoming data and thereby iteratively improves its performance of a task. The product of this iteration is a type of computer program called a machine learning model. Robots can implement machine learning models to interpret their environments. For example, a robot may use a machine learning model provided with vision data to estimate that a certain type of object is present at a particular location in an environment. The robot can then use this information to take an appropriate action, such as moving the object, avoiding the object, etc. The accuracy of conventional general-purpose machine learning models for object detection is often better than alternatives when averaged across many different environments. Average performance, however, is not necessarily a good predictor of performance in a particular environment of interest. In the context of a particular environment, a model with lower average performance may nevertheless perform better than a model with higher average performance. Every environment has its own potentially confounding nuances and irregularities. Robots often encounter new environments and would benefit from better ways to ensure accurate object detection in such environments.

One way to improve the accuracy of object detection in a given real-world environment is to collect new training data specific to that environment and to generate a new machine learning model based on the new training data. The conventional approach to collecting training data for this purpose, however, requires significant time and resources. The next best solution may be to evaluate the relative performance of multiple machine learning models in the environment and to select the highest performing model for deployment. As with collecting new training data, however, the conventional approach to measuring the relative performance of multiple machine learning models also typically requires significant time and resources. In both cases, conventional approaches may call for human labeling of thousands of images, which can easily take weeks. When time and resources are constrained, the only currently available option is often to select a machine learning model based on a universal performance measurement, such as average precision against the Common Objects in Context (COCO) dataset. Unfortunately, as discussed above, a measurement of average performance across many different environments tends to be an inadequate predictor of performance in a specific environment. This problem is a significant and ongoing obstacle to realizing the full potential of machine learning for object detection and other purposes in robotics.

For the forgoing and/or other reasons, new approaches to training machine learning algorithms and evaluating machine learning models in real-world environments are needed. In particular, there is a need for new approaches to collecting training data for specific environments and for new approaches to evaluating the relative performance of machine learning models in such environments. Devices, systems, and methods in accordance with embodiments of the present technology include one or more innovative features related to these and/or other objectives. Methods in accordance with at least some embodiments of the present technology include leveraging spatial information about an environment to facilitate labeling vision data corresponding to the environment. For example, rather than individually labeling vision data corresponding to every appearance of an object at every timestep of a log, selected appearances of an object can be labeled and those labels then propagated throughout all vision data in a log based on corresponding expected object locations. In at least some cases, vision data is collected in logs such that for any given log the presence or absence of objects of interest at expected object locations do not change. The ground truth regarding the presence or absence of the objects of interest for the entirety of a log, therefore, can be expressed in a relational database with object location as a first field and occupancy status as a second field. This information can be generated relatively easily and propagated throughout a log. The labeled images can then be used to train a machine learning algorithm and/or to evaluate machine learning models as needed. In this way, accurate machine learning models can be generated or selected at only a tiny fraction (e.g., less than 1%) of the time and cost that would otherwise be required. This is a major advancement with the potential to vastly improve the practical value of machine learning in robotics.

Figure 76:
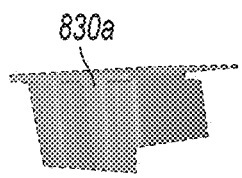

The foregoing and other features of devices, systems, and methods in accordance with various embodiments of the present technology are further described below with reference to FIGS. 1-76. Although methods, devices, and systems may be described herein primarily or entirely in the context of bipedal robots that detect and manipulate totes, other contexts are within the scope of the present technology. For example, suitable features of described methods, devices, and systems can be implemented in the context of object detection for controlling other types of mobile robots (e.g., wheeled, tracked, etc.) or even in the context of object detection for purposes other than controlling robots. Furthermore, suitable features of described methods, devices, and systems can be implemented in the context of detecting objects other than totes, such as boxes, crates, non-packaged hard goods, irregularly shaped objects, door handles, railings, etc. Finally, it should be understood, in general, that other methods, devices, and systems in addition to those disclosed herein are within the scope of the present technology. For example, methods, devices, and systems in accordance with embodiments of the present technology can have different and/or additional configurations, components, procedures, etc. than those disclosed herein. Moreover, methods, devices, and systems in accordance with embodiments of the present technology can be without one or more of the configurations, components, procedures, etc. disclosed herein without deviating from the present technology.

Examples of Robot Systems

Figure 2:
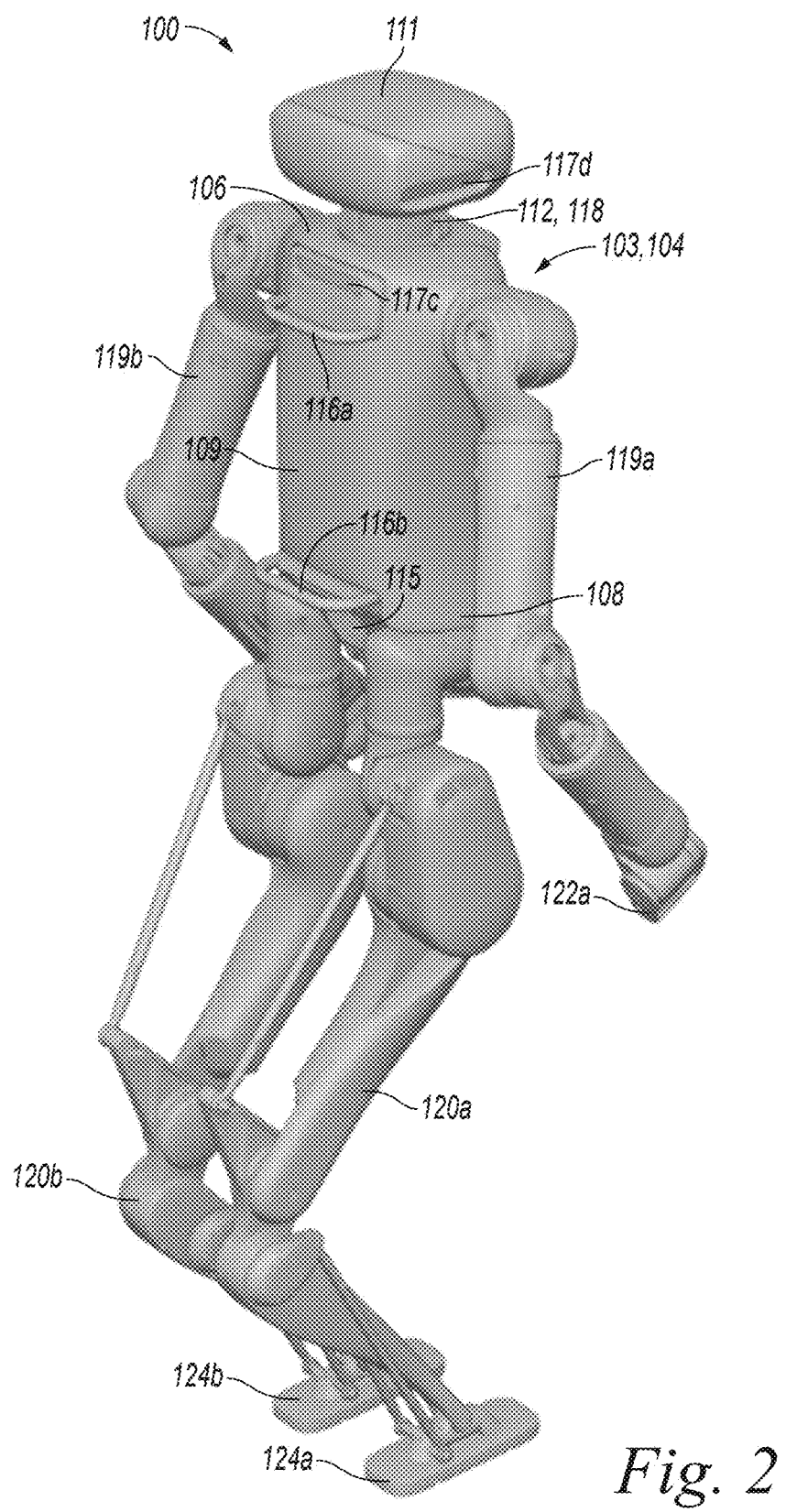
Figure 3:
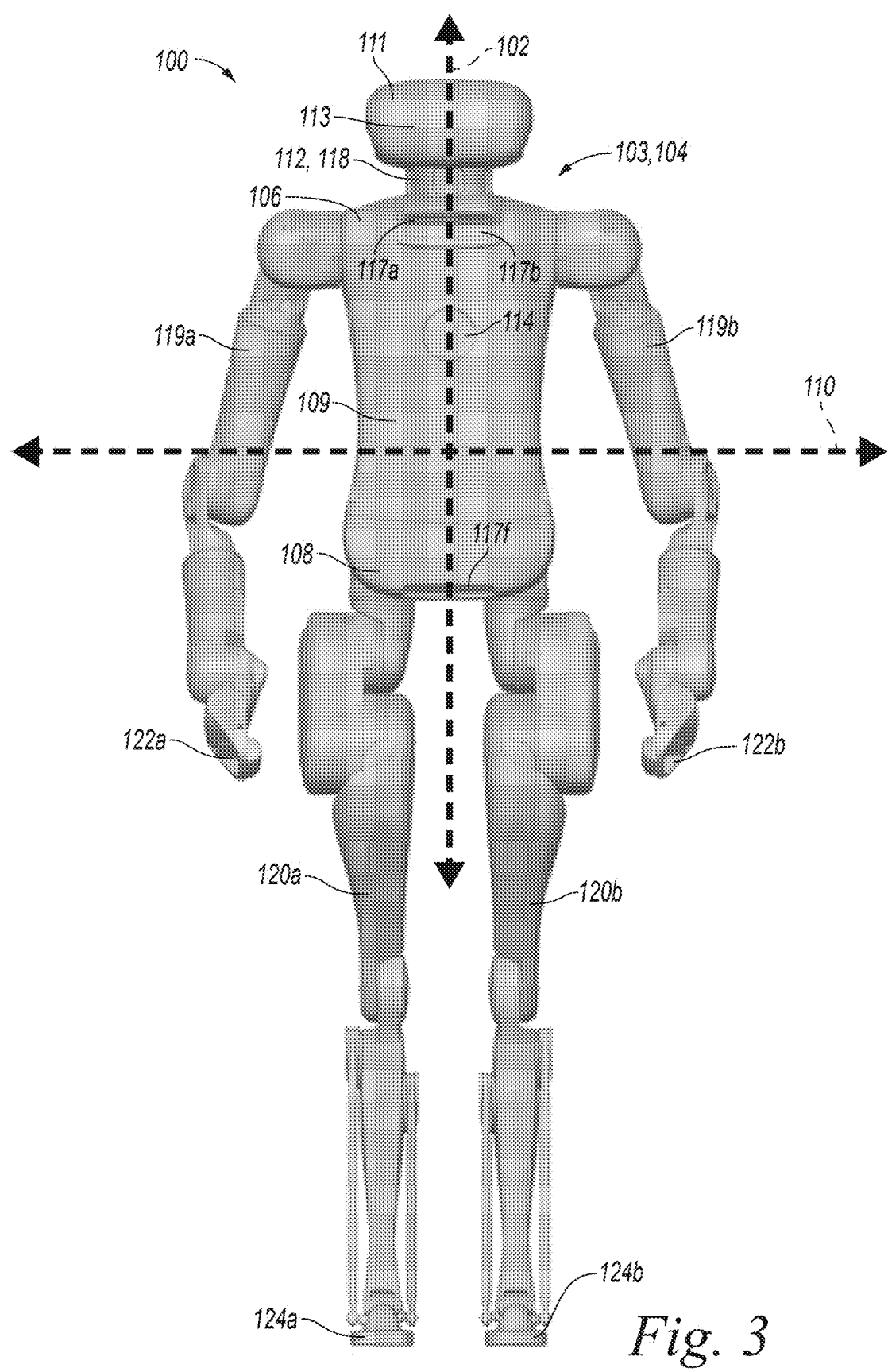

FIGS. 1 and 2 are different perspective views of a robot 100 in accordance with at least some embodiments of the present technology. FIG. 3 is a front profile view of the robot 100. As shown in FIGS. 1-3, the robot 100 can include structures resembling human anatomy with respect to the features, positions, and/or other characteristics of such structures. In at least some cases, the robot 100 defines a midsagittal plane 102 about which the robot 100 is bilaterally symmetrical. In these and other cases, the robot 100 can be configured for bipedal locomotion similar to that of a human. Counterparts of the robot 100 can have other suitable forms and features. For example, a counterpart of the robot 100 can have a non-humanoid form, such as a canine form, an insectoid form, an arachnoid form, or a form with no animal analog. Furthermore a counterpart of the robot 100 can be asymmetrical or have symmetry other than bilateral. Still further, a counterpart of the robot 100 can be configured for non-bipedal locomotion. For example, a counterpart of the robot 100 can be configured for another type of legged locomotion (e.g., quadrupedal locomotion, octopedal locomotion, etc.) and/or non-legged locomotion (e.g., wheeled locomotion, continuous-track locomotion, etc.).

With reference again to FIGS. 1-3, the robot 100 can include a centrally disposed body 103 through which other structures of the robot 100 are interconnected. As all or a portion of the body 103, the robot 100 can include a torso 104 having a superior portion 106, an inferior portion 108, and an intermediate portion 109 therebetween. The robot 100 can define a transverse plane 110 from which the superior and inferior portions 106, 108 of the torso 104 are respectively superiorly and inferiorly spaced apart. The robot 100 can further include a head 111 superiorly spaced apart from the torso 104. The robot 100 can also include a neck 112 through which the head 111 is connected to the torso 104 via the superior portion 106 of the torso 104. The head 111 can have an anteriorly directed display 113. The robot 100 can further include an anteriorly directed audio transmissive window 114 at the intermediate portion 109 of the torso 104, a posteriorly directed exhaust vent 115 at the inferior portion 108 of the torso 104, and handles 116a, 116b extending, respectively, posteriorly from the superior portion 106 of the torso 104 and posteriorly from the inferior portion 108 of the torso 104.

The robot 100 can still further include elongate sensor bays 117 (individually identified as elongate sensor bays 117a-117f) carried by the torso 104 and the head 111. The sensor bay 117a can be at the anterior side of the superior portion 106 of the torso 104 and tilted inferiorly. The sensor bay 117b can be inferiorly adjacent to the sensor bay 117a at the anterior side of the superior portion 106 of the torso 104 and less tilted than the sensor bay 117a. The sensor bay 117c can be at the posterior side of the superior portion 106 of the torso 104 and posteriorly directed. The sensor bays 117d, 117e can be at opposite respective sides of the head 111 and can be directed in opposite respective lateral directions. The sensor bay 117f can be at the inferior portion 108 of the torso 104 and directed anteriorly and inferiorly toward a ground level in front of the robot 100. The robot 100 can further include a cylindrical sensor bay 118 at the neck 112. At the elongate sensor bays 117a-117f and the cylindrical sensor bay 118, the robot 100 can include perception sensors through which the robot 100 can receive information about an environment in which it operates. The perception sensors can emit and/or receive optical, audio, electromagnetic, and/or other types of signals. Examples of suitable perception sensors include cameras (e.g., red-green-blue (RGB) cameras, infrared cameras, stereoscopic cameras, etc.), light detection and ranging (LIDAR) sensors, and sound navigation and ranging (SONAR) sensors. In a particular example, the robot 100 includes cameras at the elongate sensor bays 117a-117f and a LIDAR sensor at the cylindrical sensor bay 118.

The robot 100 can further include articulated appendages carried by the torso 104. Among these articulated appendages, the robot 100 can include arms 119a, 119b and legs 120a, 120b. At the individual articulations of the arms 119a, 119b and legs 120a, 120b, the robot 100 can include a joint and a corresponding actuator, such as a rotary actuator with a motor and gearing (e.g., cycloidal or strain-wave gearing). For clarity of illustration the joints and actuators are not labeled with reference numbers in FIGS. 1-3. In at least some cases, the robot 100 is configured to manipulate objects via the arms 119a, 119b, such as bimanually. In these and other cases, the robot 100 can be configured to ambulate via the legs 120a, 120b, such as bipedally. The arms 119a, 119b and the legs 120a, 120b can define kinematic chains. In at least some cases, the kinematic chains corresponding to the arms 119a, 119b provide at least five degrees of freedom, such as exactly five or exactly six degrees of freedom. In these and other cases, the kinematic chains corresponding to the legs 120a, 120b can provide at least four degrees of freedom, such as exactly four, exactly five, or exactly six degrees of freedom. As parts of the arms 119a, 119b, the robot 100 can include end effectors 122a, 122b at distalmost portions of the corresponding kinematic chains. Similarly, as parts of the legs 120a, 120b, the robot 100 can include feet 124a, 124b at distalmost portions of the corresponding kinematic chains. In the illustrated embodiment, the end effectors 122a, 122b and the feet 124a, 124b are not articulated. In other embodiments, counterparts of some or all of the end effectors 122a, 122b and the feet 124a, 124b can be articulated, such as with one or more movable fingers or toes.

Examples of Electrical, Computer, and Software Systems

Figure 4:
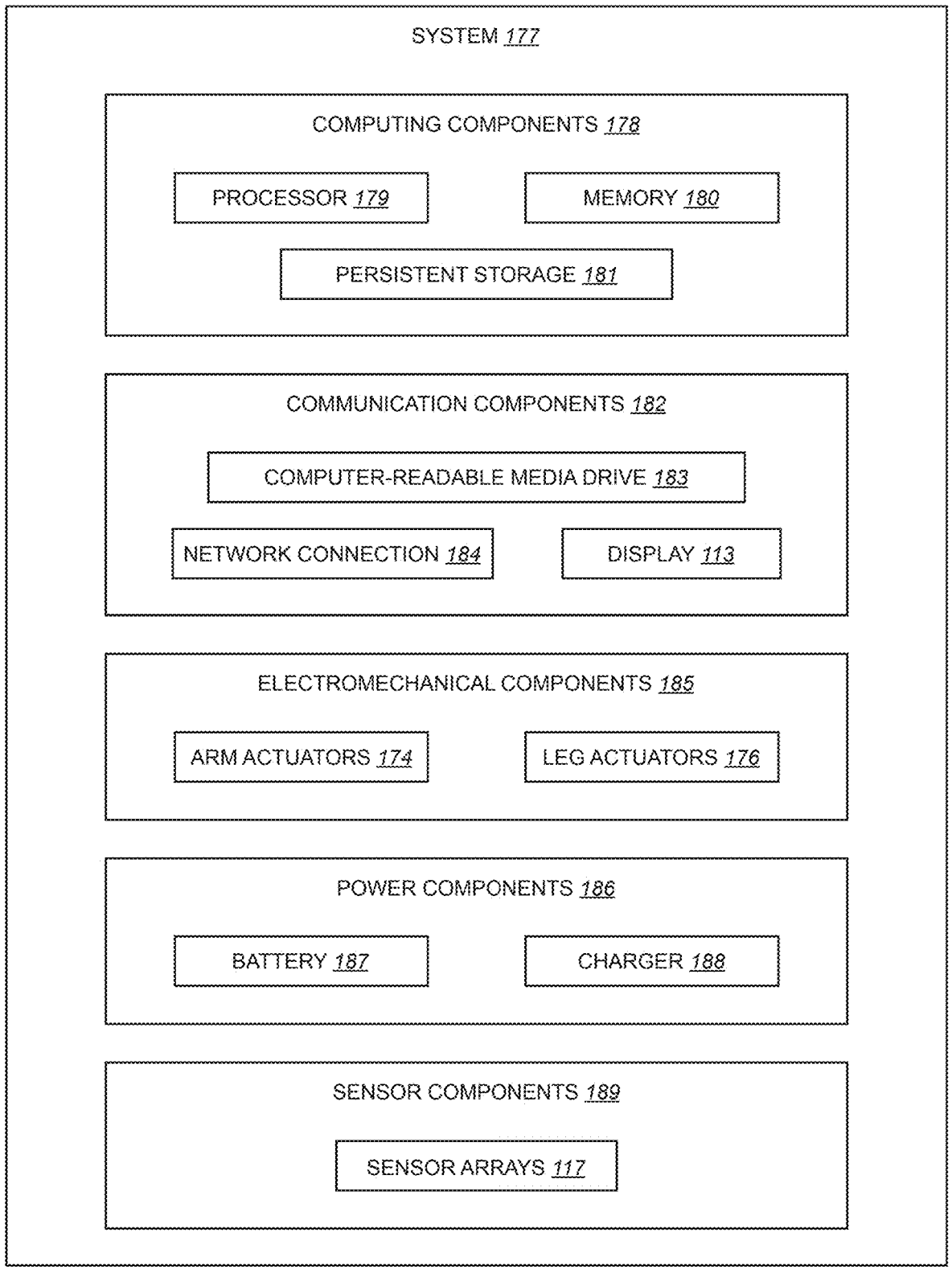
FIG. 4 is a block diagram corresponding to a system including electrical, computer, and software components of the robot of FIGS. 1-3.

When suitable, operations described elsewhere in this disclosure (e.g., data operations, movements of the robot 100, other operations of the robot 100, etc.) can be implemented at least partially via the electrical, computer, and software devices and systems disclosed in this section. FIG. 4 is a block diagram corresponding to a system 177 including electrical, computer, and software components of the robot 100. As shown in FIG. 4, the system 177 can include computing components 178. The computing components 178 can include a processor 179, such as one or more general-purpose and/or special-purpose integrated circuits including digital logic gates for executing programs and/or for otherwise processing data. The computing components 178 can further include memory 180, such as one or more integrated circuits for storing data in use. The memory 180 can include a multithreaded program, an operating system including a kernel, device drivers, etc. The computing components 178 can further include persistent storage 181, such as a hard drive for persistently storing data. Examples of data that can be stored by the persistent storage 181 include diagnostic data, sensor data, configuration data, environmental data, and current-state data. The computing components 178 can collectively define a computer configured to manage, control, receive information from, deliver information to, and/or otherwise usefully interact with other components of the system 177.

The system 177 can further include communication components 182. The communication components 182 can include a computer-readable media drive 183 for reading computer programs and/or other data stored on computer-readable media. As one example, the computer-readable media drive 183 can be a flash-memory drive. The communication components 182 can further include a network connection 184 for connecting the robot 100 to other devices and systems, such as other robots and/or other computer systems. The network connection 184 can be wired and/or wireless and can be via the Internet, a Local Area Network (LAN), a Wide Area Network (WAN), BLUETOOTH, WiFi, a cell phone network, etc. The network connection 184 can include networking hardware, such as routers, switches, transmitters, receivers, computer-readable transmission media, etc. The communication components 182 can further include the display 113 discussed above and/or other suitable components for communicating with a user. The robot 100 can use the communication components 182 for internal operations and/or to interact with devices and/or systems external to the robot 100, such as systems for providing contextual information about the environment in which the robot 100 operates and/or systems for changing operating conditions of the robot 100.

The system 177 can further include electromechanical components 185. The electromechanical components 185 can include the actuators discussed above and/or other suitable components for implementing mechanical action within the robot 100. The system 177 can further include power components 186. The power components 186 can include a battery 187 and a charger 188. The battery 187 can be a lithium-ion battery, a lead-acid battery, or a battery of another suitable type. The charger 188 can include a connector (not shown) compatible with a power source (e.g., a wall outlet) and leads (also not shown) extending between the connector and the battery 187. In at least some cases, the robot 100 is configured to operate wirelessly via the battery 187 and to recharge occasionally via the charger 188.

Finally, the system 177 can include sensor components 189 for capturing, providing, and/or analyzing information about the robot 100 itself and/or the environment in which the robot 100 is operating. The sensor components 189 can include the examples discussed above of sensors at the elongate sensor bays 117a-117f and at the cylindrical sensor bay 118. At these and/or at one or more other suitable locations, the robot 100 can include among the sensor components 189 a light sensor (e.g., a photoresistor), a sound sensor (e.g., a microphone), a location sensor (e.g., using the Global Positioning System), a two-dimensional sensor, a three-dimensional sensor, and/or a proximity sensor, among other examples. Within the body 103 and/or at one or more other suitable locations, the robot 100 can include among the sensor components 189 an accelerometer, a gyroscope, a magnetometer, and/or a tilt sensor, among other examples. At the end effectors 156a, 156b and/or at one or more other suitable locations, the robot 100 can include among the sensor components 189 a contact sensor and/or a force sensor, among other examples. In at least some cases, two or more different types of sensors are incorporated into a sensor assembly. For example, an accelerometer, a gyroscope, and a magnetometer can be incorporated into an inertial measurement unit (IMU) through which the robot 100 can determine acceleration, angular velocity, and orientation. The robot 100 can include an IMU within the torso 104, within the head 111, and/or at one or more other suitable locations.

At one, some, or all of the actuators of the robot 100 and/or at one or more other suitable locations, the robot 100 can include among the sensor components 189 sensors that measure properties of the corresponding joints. Such properties can include position, orientation (e.g., yaw, pitch, and roll), applied force (e.g., torque), elevation, mass, velocity, and acceleration, among other examples. The measurements of these properties can be direct or indirect. As an example of direct sensing, the robot 100 may sense a torque acting on a given joint via a torque sensor operably associated with the joint. As another example of direct sensing, the robot 100 may sense a position of a given joint via an encoder operably associated with the joint. Any joint described herein should be construed as potentially including a torque sensor, encoder, or other suitable mechanism for direct sensing. As an example of indirect sensing, the robot 100 may sense a position of a given one of the end effectors 122a, 122b or other component based on perception data corresponding to the component and other perception data corresponding to a reference. The robot 100 can include one or more sensors in a sensor system, such as a vision system, a LIDAR system, a stereoscopic camera system, a SONAR system, etc. In at least some cases, the robot 100 monitors itself and/or its environment in real-time or in near real-time. Moreover, the robot 100 may use acquired sensor data as a basis for decision-making via the computing components 178.

Components of the system 177 can be connected to one another and/or to other components of the robot 100 via suitable conductors, transmitters, receivers, circuitry, etc. While the system 177 configured as described above may be used to support operation of the robot 100, it should be appreciated that the robot 100 may be operated using devices of various types and configurations and that such devices may have various components and levels of responsibility. For example, the robot 100 may employ individual computer systems or controllers to manage discrete aspects of its operations, such as an individual computer system or controller to perform computer vision operations, a separate computer system or controller to perform power management, etc. In some cases, the robot 100 employs the system 177 to control physical aspects of the robot 100 according to one or more designated rules encoded in software. For example, these rules can include minimums and/or maximums, such as a maximum degree of rotation for a joint, a maximum speed at which a component is allowed to move, a maximum acceleration rate for one or more components, etc. The robot 100 may include any number of mechanical aspects and associated rules, which may be based on or otherwise configured in accordance with the purpose of and/or functions performed by the robot 100.

Software features of the robot 100 may take the form of computer-executable instructions, such as program modules executable by the computing components 178. Generally, program modules include routines, programs, objects, components, data structures, and/or the like configured to perform particular tasks or to implement particular abstract data types and may be encrypted. Furthermore, the functionality of the program modules may be combined or distributed as desired in various examples. Moreover, control scripts may be implemented in any suitable manner, such as in C/C++ or Python®. The functionality of the program modules may be combined or distributed in various embodiments, including cloud-based implementations, web applications, mobile applications for mobile devices, etc. Furthermore, certain aspects of the present technology can be embodied in a special purpose computer or data processor, such as application-specific integrated circuits (ASIC), digital signal processors (DSP), field-programmable gate arrays (FPGA), graphics processing units (GPU), many core processors, etc. specifically programmed, configured, or constructed to perform one or more computer-executable instructions. While aspects of the present technology, such as certain functions, may be described as being performed on a single device, these aspects, when suitable, can also be practiced in distributed computing environments where functions or modules are shared among different processing devices linked through a communications network such as a LAN, WAN, or the Internet. In a distributed computing environment, program modules and other components may be located in both local and remote memory storage and other devices, which may be in communication via one or more wired and/or wireless communication channels.

Aspects of the present technology may be stored or distributed on tangible computer-readable media, which can include volatile and/or non-volatile storage components, such as magnetically or optically readable computer media, hard-wired or preprogrammed chips (e.g., EEPROM semiconductor chips), nanotechnology memory, biological memory, or other computer-readable storage media. Alternatively, computer-implemented instructions, data structures, screen displays, and other data under aspects of the present technology may be distributed (encrypted or otherwise) over the Internet or over other networks (including wireless networks), on a propagated signal on a propagation medium (e.g., electromagnetic wave(s), sound wave(s), etc.) over a period of time, or they may be provided on any analog or digital network (packet switched, circuit switched, or other scheme). Furthermore, the term computer-readable storage medium does not encompass signals (e.g., propagating signals) or transitory media. One of ordinary skill in the art will recognize that various components of the robot 100 may communicate via any number of wired and/or wireless communication techniques and that elements of the robot 100 may be distributed rather than located in a single monolithic entity. Finally, electrical and computing aspects of robots in accordance with various embodiments of the present technology may operate in environments and/or according to processes other than the environments and processes described above.

Figure 5:
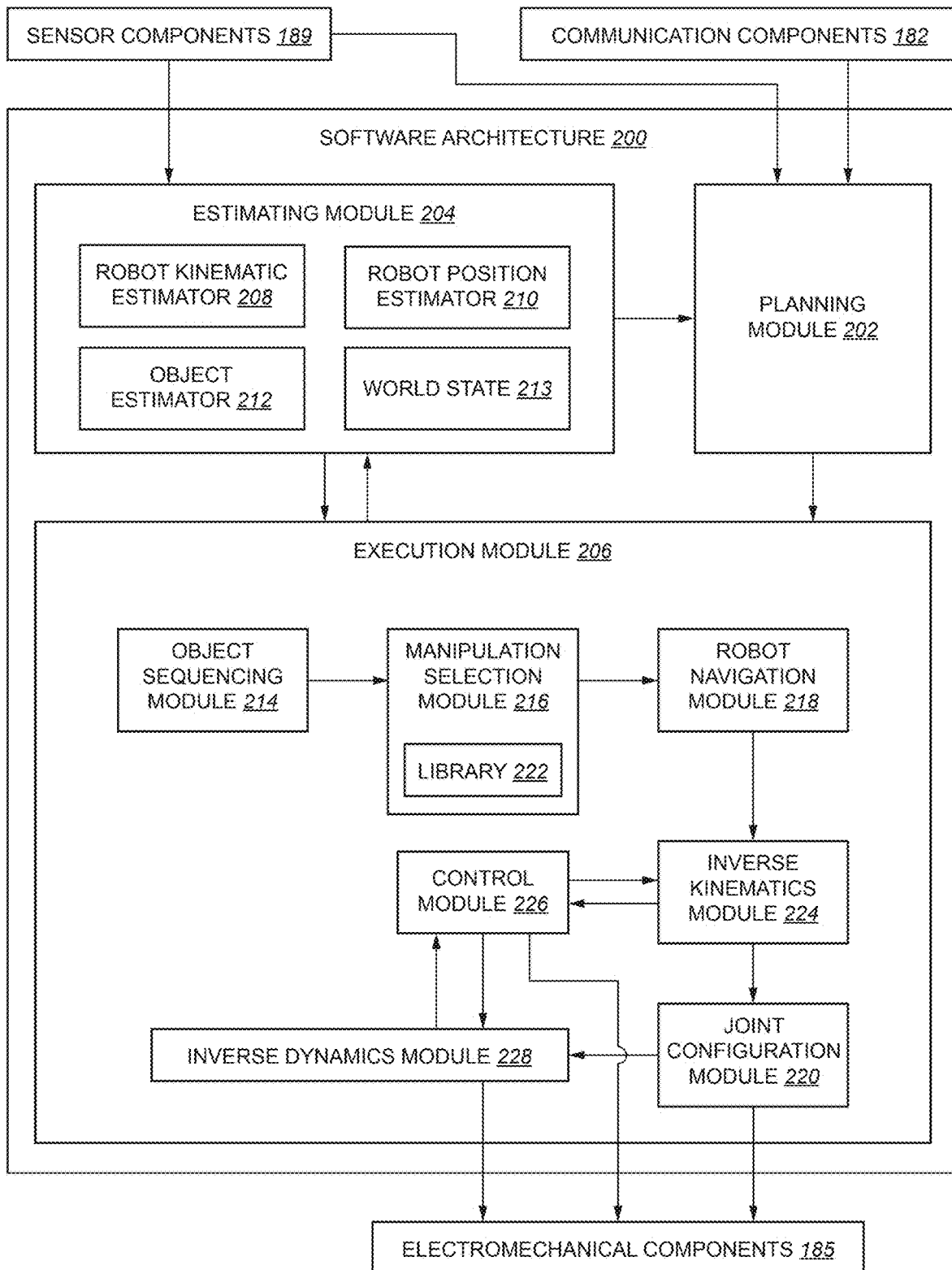
FIG. 5 is a block diagram corresponding to software architecture and associated portions of the system of FIG. 4.

FIG. 5 is a block diagram corresponding to a software architecture 200 and associated portions of the system 177. The software architecture 200 can be within the software features of the system 177. With reference to FIGS. 4 and 5 together, the software architecture 200 can include a planning module 202, an estimating module 204, and an execution module 206 operably associated with one other. The planning module 202 can be configured to relay or to generate a plan corresponding to an objective for the robot 100 (e.g., unload all objects on a shelf, retrieve an object from a first location and move the object to a second location, etc.). In at least some cases, the planning module 202 receives information from the communication components 182 and relays or generates a plan based at least partially on the received information. For example, the planning module 202 may receive a command from a user via the communication components 182 and relay the command as a plan. As another example, the planning module 202 may receive a command from a user via the communication components 182 and generate a plan related to the command. As yet another example, the planning module 202 may generate a plan without receiving a command from a user, such as at a predetermined time or in response to information about a current state of the robot 100 or the environment received via the sensor components 189.

The estimating module 204 can receive information from the sensor components 189 and can generate estimates in real time or in near real time to inform generating and/or executing a plan. The estimating module 204 can include a robot kinematic estimator 208, a robot position estimator 210, an object estimator 212, and a world state 213. The robot kinematic estimator 208 can generate an estimate of a current kinematic state of the robot 100 (e.g., balanced, off-balance, walking, standing, etc.) and estimates of positions of individual joints of the robot 100. The robot position estimator 210 can generate a current estimate of a position of the robot 100 within an environment. This position can be a set of coordinates and can be based on perception information, GPS information, and/or other information received or generated by the robot 100. Perception information potentially relevant to the position of the robot 100 includes, among other examples, information corresponding to distances between the robot 100 and landmarks in an environment and information corresponding to fiducial markings carried by or otherwise associated with the landmarks. This information can be detected, for example, via a three-dimensional sensor of the robot 100 and/or via a camera of the robot 100. Furthermore, information can move between components of the estimating module. For example, the world state 213 can receive information from the robot kinematic estimator 208, the robot position estimator 210, and the object estimator 212. In addition or alternatively, the object estimator 212 can receive information from the robot kinematic estimator 208 and the robot position estimator 210 directly.

The object estimator 212 can generate a current estimate of a position of a manipulatable object (e.g., a tote) within an environment. As with the position of the robot, the position of an object can be a set of coordinates and can be based on perception information, GPS information, and/or other information received or generated by the robot 100. Perception information potentially relevant to the position of an object includes, among other examples, information corresponding to distances between the object and the robot 100, distances between the object and landmarks in an environment, and information corresponding to fiducial markings carried by or otherwise associated with the object. This information can be detected, for example, via a three-dimensional sensor of the robot 100 and/or via a camera of the robot 100. In at least some cases, the object estimator 212 uses information (e.g., sensor poses) from the robot kinematic estimator 208 and/or the robot position estimator 210 to inform generation of object estimates. This can be useful, for example, when a fiducial or other landmark in an environment is not visible. Details of the object estimator 212 are further described below with reference to FIG. 6. In at least some cases, the object estimator 212 is configured to update the world state 213 with objects, support structure, and/or other information relevant to objects in an environment in which the robot 100 operates.

The execution module 206 can be configured to receive a plan from the planning module 202 and estimates from the estimating module 204. The execution module 206 can include an object sequencing module 214, a manipulation selection module 216, a robot navigation module 218, and a joint configuration module 220. The planning module 202 can be configured to send a plan to the object sequencing module 214, to the manipulation selection module 216, to the robot navigation module 218, or to the joint configuration module 220 based on attributes of the plan. For example, when a plan includes explicit instructions for positions of the electromechanical components 185, the planning module 202 can send the plan to the execution module 206 via the joint configuration module 220. As another example, when a plan does not involve manipulating an object, the planning module 202 can send the plan to the execution module 206 via the robot navigation module 218. As yet another example, when a plan concerns only one object and the object is remote to the robot 100, the planning module 202 can send the plan to the execution module 206 via the manipulation selection module 216. As a final example, when a plan concerns multiple objects remote to the robot 100, the planning module 202 can send the plan to the execution module 206 via the object sequencing module 214.

The object sequencing module 214 can receive one or more estimates from the estimating module 204 and can generate a sequence in which multiple objects are to be manipulated. For example, when the object sequencing module 214 receives a plan to unload a shelf, the object sequencing module 214 can query the estimating module 204 for current locations of objects on the shelf. The object sequencing module 214 can then assign the objects an order, convert the order into a queue, and pass the queue to the manipulation selection module 216. The manipulation selection module 216 can include a library 222 including two or more different motion sequences that can be used to manipulate an object. The manipulation selection module 216 can select a motion sequence for a given object based on information, such as information about the object and/or information about the environment. The robot navigation module 218 can generate targets for different parts of the robot 100 further to a plan or to a portion of a plan being executed. Examples of targets include positions of the feet 124a, 124b in the environment, positions of the end effectors 122a, 122b in the environment, etc. The robot navigation module 218 can update these targets continuously or near continuously based on information from the estimating module 204. The execution module 206 can further include an inverse kinematics module 224 that translates the targets from the robot navigation module 218 into joint configurations throughout the robot 100.

The execution module 206 can also include a control module 226 that receives joint configurations from the inverse kinematics module 224 and generates joint parameters (e.g., positions, velocities, accelerations, etc.) to be executed by the robot 100 to achieve these joint configurations. Through continuous or near-continuous communication with the inverse kinematics module 224, the control module 226 can modify the joint parameters to at least partially compensate for deviations as the robot 100 executes the joint configurations. The inverse kinematics module 224 can send other joint configurations not subject to active control to the joint configuration module 220. Similar to the control module 226, the joint configuration module 220 can generate joint parameters (e.g., positions, velocities, accelerations, etc.) to be executed by the robot 100 to achieve joint configurations received from the inverse kinematics module 224 or from the planning module 202.

Finally, the execution module 206 can include an inverse dynamics module 228 that receives joint parameters from the control module 226 and from the joint configuration module 220. The inverse dynamics module 228 can track a desired wrench of the robot 100 and its relationship with objects in the environment. In at least some cases, the inverse dynamics module 228 references a map of robot positions and wrenches to joint torques. Based at least partially on the tracking, the inverse dynamics module 228 can modify the joint parameters to achieve a desired result. For example, the inverse dynamics module 228 can modify the joint parameters to maintain contact between the end effectors 122a, 122b and an object as the robot 100 carries the object. The inverse dynamics module 228 can then send modified joint parameters to the electromechanical components 185 for execution. For configurations that do not involve a dynamic interaction with the environment, the control module 226 and the joint configuration module 220 can send joint parameters directly to the electromechanical components 185 for execution.

Figure 6:
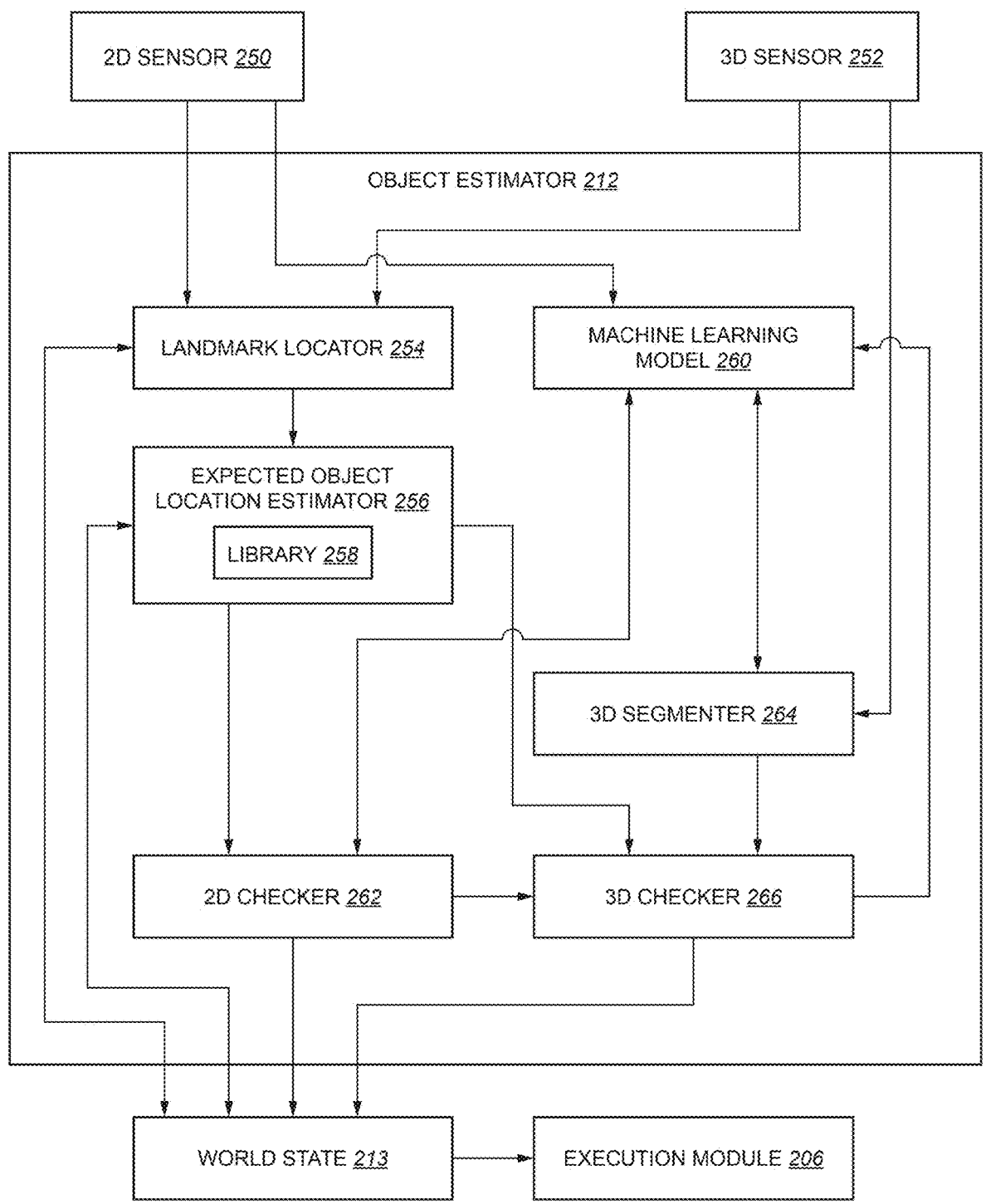
FIG. 6 is a block diagram corresponding to an object estimator of the software architecture of FIG. 5 and associated portions of the system of FIG. 4.

FIG. 6 is a block diagram corresponding to the object estimator 212 and associated portions of the system 177. As shown in FIG. 6, the system 177 can include a two-dimensional sensor 250 and a three-dimensional sensor 252 among the sensor components 189. The object estimator 212 can receive two-dimensional data (e.g., image data) and three-dimensional data (e.g., depth data) from the two-dimensional sensor 250 and the three-dimensional sensor 252, respectively. The object estimator 212 can include a landmark locator 254 configured to localize a landmark in an environment. For example, the landmark locator 254 can include AprilTag tracking software and/or simultaneous localization and mapping (SLAM) software. The object estimator 212 can further include an expected object location estimator 256 configured to determine an expected object location at least partially based on output from the landmark locator 254. The expected object location estimator 256 can include a library 258 containing structure data (e.g., CAD data) for one or more structures relevant to determining an expected object location. Examples of structure data include CAD models for support structures (e.g., racks, shelves, tables, etc.) and CAD models for objects to be detected (e.g., totes, boxes, crates, etc.).

The object estimator 212 can further include a machine learning model 260. In a particular example, the machine learning model 260 is Detectron2 (Facebook AI Research) with Mask R-CNN implementation. The object estimator 212 can also include a two-dimensional checker 262 configured to process output from the expected object location estimator 256 and the machine learning model 260. The two-dimensional checker 262 can include software configured to perform functions such as projecting expected object locations from the expected object location estimator 256 onto image data from the two-dimensional sensor 250, calculating bounding boxes for the projected expected object locations, and calculating intersections between areas of the bounding boxes and areas of putative object estimates from the machine learning model 260.

The two-dimensional checker 262 can be configured to work at least primarily with two-dimensional data from the two-dimensional sensor 250. In contrast, the object estimator 212 can include a three-dimensional segmenter 264 and a three-dimensional checker 266 configured to work at least primarily with three-dimensional data from the three-dimensional sensor 252. The three-dimensional segmenter 264 can be configured to segment the three-dimensional data into segments corresponding to the putative object estimates from the machine learning model 260. The three-dimensional checker 266 can be configured to perform functions such as generating derivatives (e.g., centroids) based on these segments and comparing the derivatives to expected object locations. Together or separately, the two-dimensional checker 262 and the three-dimensional checker 266 can be used to filter output from the machine learning model 260 and to eliminate most or all invalid and/or unproductive portions of the output. The object estimator 212 can update the world state 213 with the filtered output, which can then be made available to the execution module 206 for use in controlling the robot 100. The object estimator 212 can also use output from the two-dimensional checker 262 and/or the three-dimensional checker 266 to train the machine learning model 260.

Figure 7:
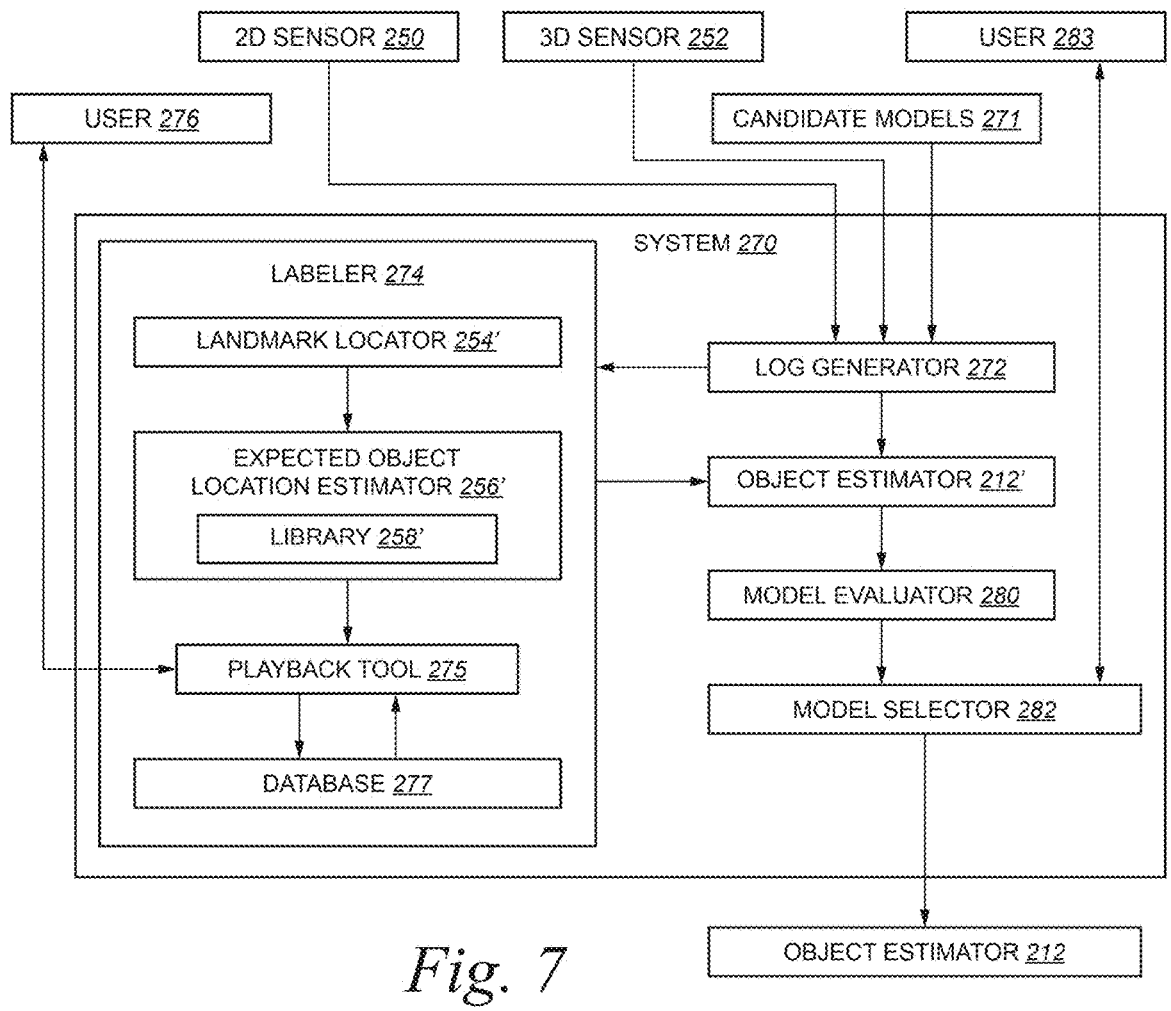
FIG. 7 is a block diagram corresponding to a system related to evaluating candidate machine learning models in accordance with at least some embodiments of the present technology.

FIG. 7 is a block diagram corresponding to a system 270 related to evaluating candidate machine learning models 271 in accordance with at least some embodiments of the present technology. FIG. 7 also shows how the system 270 can interact with the two-dimensional sensor 250, the three-dimensional sensor 252, and the object estimator 212. Certain components of the system 270 can be the same as or similar to corresponding components discussed above in connection with the software architecture 200. These components are assigned reference numbers matching the previously stated reference numbers, but with an appended apostrophe. Such components can have any of suitable features discussed elsewhere in this disclosure for the corresponding components and vice versa. In some cases, the system 270 and other systems disclosed herein use the same installations or instances of components of the software architecture 200. In other cases, the system 270 and other systems disclosed herein use different installations or instances of such components. The system 270 can be partially integrated with the software architecture 200, fully integrated with the software architecture 200, or entirely independent from the software architecture 200. With reference again to FIG. 7, the system 270 can include a log generator 272 that receives data from the two-dimensional sensor 250 and the three-dimensional sensor 252. This data can be gathered at timesteps of a session during which the robot 100 moves within an environment. The log generator 272 can assemble the gathered data in a useful format, such as one in which the data are organized in a relational database with corresponding information about type, source, time, etc.

The system 270 can further include a labeler 274 that receives logs from the log generator 272. The labeler 274 can be configured to associate data from the log generator 272 with labels corresponding to ground truth. Unlike conventional approaches to data labeling, the labeler 274 can leverage information about the environment in which the data were collected to facilitate the labeling. The labeler 274 can include a landmark locator 254' that processes the logs to identify and localize landmarks (e.g., fiducials) in the environment. In at least some cases, this processing includes image correction (e.g., demosaicing, white balancing, etc.) and/or image enhancement (e.g., contrast adjustment, denoising, sharpening, etc.). In these and other cases, the image processing can include image segmentation in which background image data is separated from targeted image data, such as using a thresholding technique and/or a segmentation algorithm. Landmark features (e.g., corners, edges, etc.) can then be extracted and entered into a pattern recognition algorithm that estimates a pose of the landmark based on the landmark features. In this or another suitable way, the landmark locator 254' can establish a ground truth reference plane for a located landmark. Once established, the reference plane can be tracked through images in which the landmark is not visible to the robot 100 via a known relationship between such images and other images in which the landmark is visible to the robot 100. Such a relationship may be determined, for example, at least partially based on output from actuator encoders of the robot 100. In at least some cases, tracking is bidirectional for enhanced accuracy.

The system 270 can further include an expected object location estimator 256'. The expected object location estimator 256' can generate expected object locations based at least partially on the ground truth reference planes from the landmark locator 254'. The expected object location estimator 256' can project the resulting expected object locations onto data in the logs. For example, the expected object location estimator 256' can determine a relationship between a sensor of the robot 100 and a localized landmark for a given image in a log and use that relationship to determine where expected object locations should appear in the image. The expected object location estimator 256' can include a library 258' that provides properties of the expected object locations and/or otherwise indicates how the expected object locations should appear in the image data.

The labeler 274 can further include a playback tool 275 that receives logs from the log generator 272 and expected object locations from the expected object location estimator 256'. The playback tool 275 can use these inputs and/or other information to generate images or other output to be presented to a user 276 via a graphical user interface. The labeler 274 can further include a database 277 in which the expected object locations are associated with ground truth information. For example, the database 277 can be a relational database in which individual expected object locations in the environment are associated with information indicating whether any object is present, whether a specific type of object is present, whether no object is present, etc. The labeler 274 can be configured to gather this information for the expected object locations from the user 276 and to update the database 277 so that the database 277 reflects a ground truth for the environment. Accordingly, the database 277 can have default or unassigned states for information corresponding to the expected object locations before such information is received from the user 276. The playback tool 275 can be configured to reference the database 277 in connection with displaying information from the logs to the user 276. This can facilitate verification that the database 277 reflects ground truth. For example, the user 276 of the playback tool 275 can view images corresponding to different respective timesteps of a log and confirm accurate propagation of ground truth information about expected object locations shown in the images.

In addition to labeling data, the system 270 can be configured to use the labeled data as ground truth to evaluate the candidate models 271. The system 270 can include an object estimator 212' that uses the candidate models 271 to generate estimates from the logs. Multiple candidate models 271 can be used in this manner serially or in parallel. Similarly, multiple logs can be provided to a given one of the candidate models 271 serially or in parallel. The object estimator 212' can compare the estimates to the expected object locations and to corresponding information from the database 277. Results of this comparison can indicate how closely each of the candidate models 271 corresponds to ground truth. Several examples of this process in the context of estimate filtering (rather than model evaluation) are described with reference to FIG. 6 above and with reference to FIGS. 11-27 below. Rather than filtering based on the expected object locations as discussed for the object estimator 212, the object estimator 212' can use the expected object locations and the information from the database 277 to identify errors in the estimates and, in at least some cases, to distinguish between various types of errors. Types of errors that can be distinguished based on the expected object locations and the information in the database 277 include false positive errors, false negative errors, and classification errors.

The system 270 can further include a model evaluator 280 that receives output from the object estimator 212'. In at least some cases, the model evaluator 280 generates performance measurements for the candidate models 271 based at least partially on this output. For example, a given model may have a false positive rate of 1.2 per 1,000 estimates and a false negative rate of 0.3 per 1,000 estimates. Another model may have a false positive rate of 0.9 per 1,000 estimates and a false negative rate of 0.5 per 1,000 estimates. The system 270 can further include a model selector 282 that selects a model for implementation. In some cases, the model selector 282 presents the candidate models 271 and corresponding performance values to a user 283 and receives a selection from the user 283. Alternatively or in addition, the model selector 282 can recommend one or more models based on criteria from the user 283. The user 283 can be the same as or different than the user 276. In other cases, the model selector 282 can select a model autonomously. For example, the system 270 may receive new candidate models 271 on an ongoing basis and may be configured to implement any new model that improves upon the performance of a previously implemented model. The model selector 282 can implement a model by sending the model to the object estimator 212. The object estimator 212 can then use the new model to generate estimates in the field.

Figure 8:
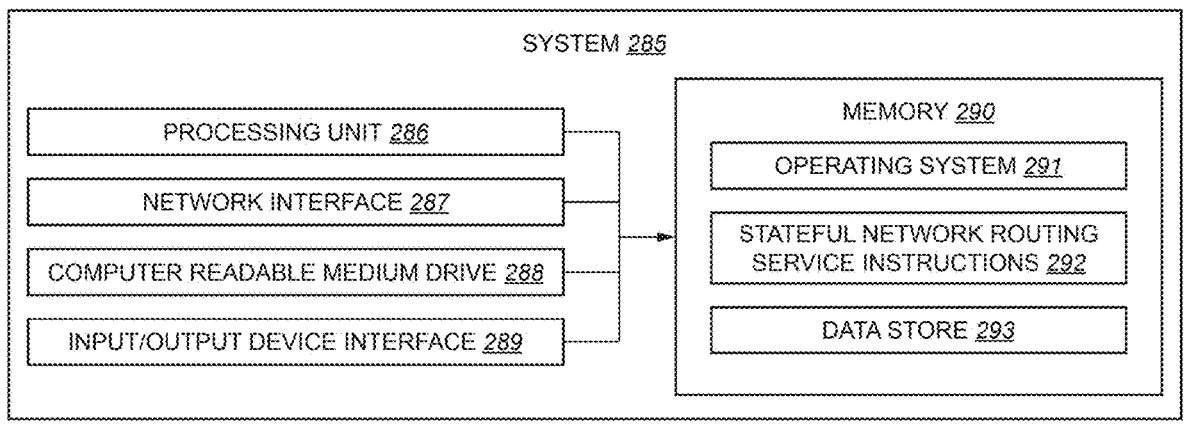
FIG. 8 is a block diagram corresponding to a system related to labeling vision data in accordance with at least some embodiments of the present technology.

FIG. 8 is a block diagram corresponding to a system 285 related to labeling vision data in accordance with at least some embodiment of the present technology. Suitable aspects of various embodiments of the present technology can be implemented via the system 285. Furthermore, suitable aspects of various embodiments of the present technology can be implemented in a distributed computing environment including the system 285 together with the system 177 and/or the system 270. In some cases, the system 270 is implemented entirely within the system 285. In these and other cases, the system 285 can be a personal computer, a desktop computer, a laptop computer, a mainframe computer, a handheld computer, a workstation, a network computer, a consumer device, an application server, a storage device, a telephone, or any other suitable type of device capable of electronically processing data. The system 285 can include one or more processing units 286 (e.g., a physical central processing unit), one or more network interfaces 287 (e.g., a network interface card), one or more computer readable media drive 288 (e.g., a high density disk, a solid state drive, a flash drive, and/or another type of drive containing persistent non-transitory computer-readable media), an input/output device interface 289 (e.g., an input/output gateway), and one or more computer-readable memory 290 (e.g., random access memory (RAM) and/or another type of volatile non-transitory computer-readable media). In some cases, the system 285 corresponds to a stateful network routing service.

The system 285 can be a uniprocessor system including one processing unit 286 or a multiprocessor system including several processing units 286 (e.g., two, four, eight, or another suitable number). The processing units 286 can be any suitable type of device capable of executing instructions. For example, the processing units 286 can be general-purpose or embedded processors implementing any of a variety of instruction set architectures. Through network communication devices (e.g., the network interface 287), the system 285 may communicate with other systems and/or components over a communications network (e.g. a LAN, a WAN, the Internet, etc.).

The input/output device interface 289 can coordinate traffic between the processing unit 286, the computer-readable memory 290, and any peripheral devices, including through the network interface 287 or other peripheral gateways. In at least some cases, the input/output device interface 289 performs any necessary protocol, timing, or other data transformations to convert data signals from one component (e.g., the computer-readable memory 290) into a format suitable for use by another component (e.g., the processing unit 286). Furthermore, the input/output device interface 289 may include support for devices attached through various types of peripheral buses, such as the Universal Serial Bus standard. In at least some cases, functions of the input/output device interface 289 are split into two or more separate components, such as a north bridge and a south bridge. In addition or alternatively, some or all functionality of the input/output device interface 289, such as gateway functionality to the computer-readable memory 290, can be incorporated directly into processing unit 286.

The network interface 287 can allow data exchange between the system 285 and other devices attached to a network, such as other computer systems. In addition, the network interface 287 may allow communication between the system 285 and various input/output devices and/or remote storage, such as data stores 293. Such input/output devices can include one or more display terminals, keyboards, keypads, touchpads, voice recognition devices, optical recognition devices, and/or any other devices suitable for entering or retrieving data. Multiple input/output devices may be present in the system 285 or may be distributed on various nodes of a distributed system that includes the system 285. Similar input/output devices can be separate from the system 285 and interact with one or more nodes of a distributed system that includes the system 285 through a wired or wireless connection, such as over the network interface 287. The network interface 287 can support one or more wireless networking protocols (e.g., Wi-Fi). In various embodiments, the network interface 287 may support communication via any suitable wired or wireless general data networks, such as other types of Ethernet networks. Additionally, the network interface 287 may support communication via telephony networks, digital fiber networks, storage area networks, and/or any other suitable type of network and/or protocol.

The processing unit 286 can receive information and instructions from other computing systems via the network interface 287. The network interface 287 can also store data directly to the computer-readable memory 290. The processing unit 286 can communicate to and receive communications from the computer-readable memory 290, execute instructions and process data in the computer-readable memory 290, etc. In at least some cases, the computer-readable memory 290 stores an operating system 291 that provides computer program instructions for use by the processing unit 286 in the general administration and operation of the system 285. Furthermore, the computer-readable memory 290 may include computer program instructions that the processing unit 286 executes in order to implement aspects of one or more embodiments of the present technology. For example, in a particular embodiment, the computer-readable memory 290 includes stateful network routing service instructions 292. As another example, the computer-readable memory 290 may include the data store 293. Furthermore various applications may be stored in the computer-readable memory 290.

Suitable software components disclosed herein can be stored in the computer-readable memory 290 and executable by the processing unit 286. In this respect, the term "executable" means a program file that is in a form that can ultimately be run by the processing unit 286. Examples of executable programs may be, for example, a compiled program that can be translated into machine code in a format that can be loaded into a random access portion of the computer-readable memory 290 and run by the processing unit 286, source code that may be expressed in proper format such as object code that is capable of being loaded into a random access portion of the computer-readable memory 290 and executed by the processing unit 286, source code that may be interpreted by another executable program to generate instructions in a random access portion of the computer-readable memory 290 to be executed by the processing unit 286, etc. An executable program may be stored in any portion or component of the computer-readable memory 290 including, for example, random access memory, read-only memory, hard drive, solid-state drive, flash drive, memory card, optical disc, or another suitable memory type.

Any suitable distributed system embodiments described herein, or any component thereof, may be implemented as one or more network-based services. For example, a compute cluster within a computing service may present computing and/or storage services and/or other types of services that employ any distributed computing systems described herein to clients as network-based services. In some embodiments, a network-based service may be implemented by a software and/or hardware system designed to support interoperable machine-to-machine interaction over a network. A network-based service may have a gateway described in a machine-processable format. Other systems may interact with the network-based service in a manner prescribed by the description of the network-based service's gateway. For example, the network-based service may define various operations that other systems may invoke, and may define a particular application programming interface (API) to which other systems may be expected to conform when requesting the various operations. An API refers to an interface and/or other communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

Examples of Filtered Object Detection and Related Methods

Figure 9:
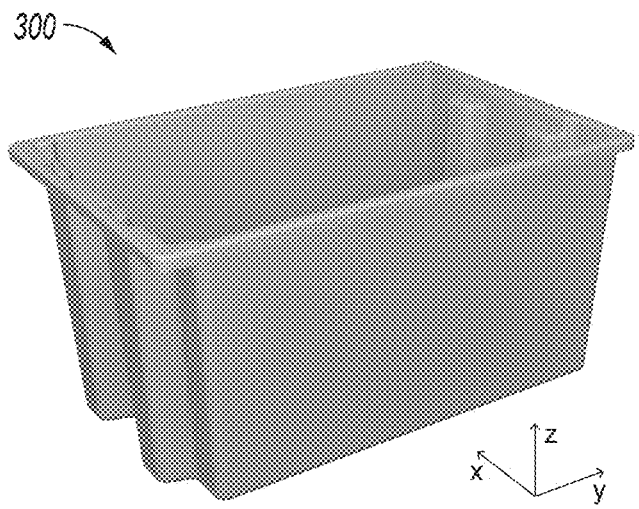
FIG. 9 is a perspective view of an object that the robot of FIGS. 1-3 is capable of manipulating.
Figure 10:
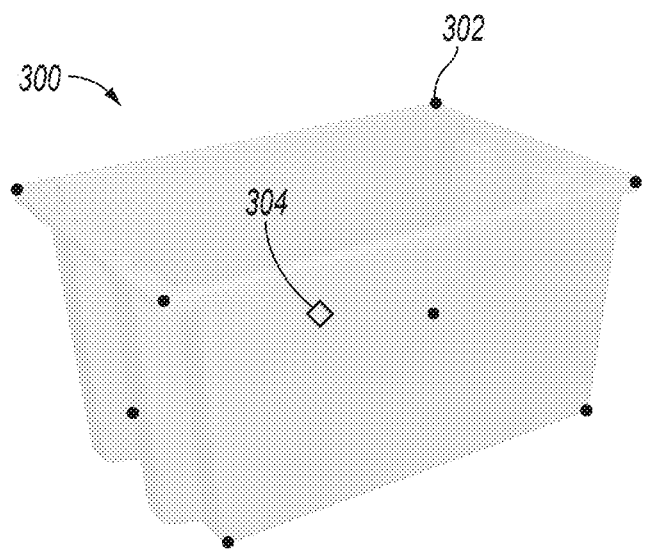
FIG. 10 is a perspective view of the object of FIG. 9 and representations of features of the object.

Methods in accordance with at least some embodiments of the present technology may be described in this section and elsewhere in this disclosure in the context of an object 300 as shown in FIGS. 9 and 10. With reference to FIGS. 9 and 10, the object 300 can be fungible. This is common, for example, among plastic totes used in modern distribution centers. These totes are often made from molds in large quantities such that very little variation exists from one tote to another. Reference herein to objects 300 contemplates the object 300 and other objects of the same or similar shape. The objects 300 can define shape features relevant to determining expected object locations. For example, the objects 300 can define corners 302 (shown as dots in FIG. 10). Other potentially useful shape features of the object 300 include edges and surfaces. The objects 300 can also define centroids 304 (shown as a diamond in FIG. 10). The centroids 304, for example, can be at the average width, average height, and average depth of the object 300, among other forms of this metric. The corners 302 and centroids 304 can individually correspond to respective sets of coordinates in a three-dimensional space. In the illustrated case, the objects 300 are totes defining openings through which they can be loaded and unloaded. In other cases, counterparts of the objects 300 can have another suitable form. For example, counterparts of the objects 300 can be boxes, unpackaged hardgoods, lidded totes, etc.

Figure 11:
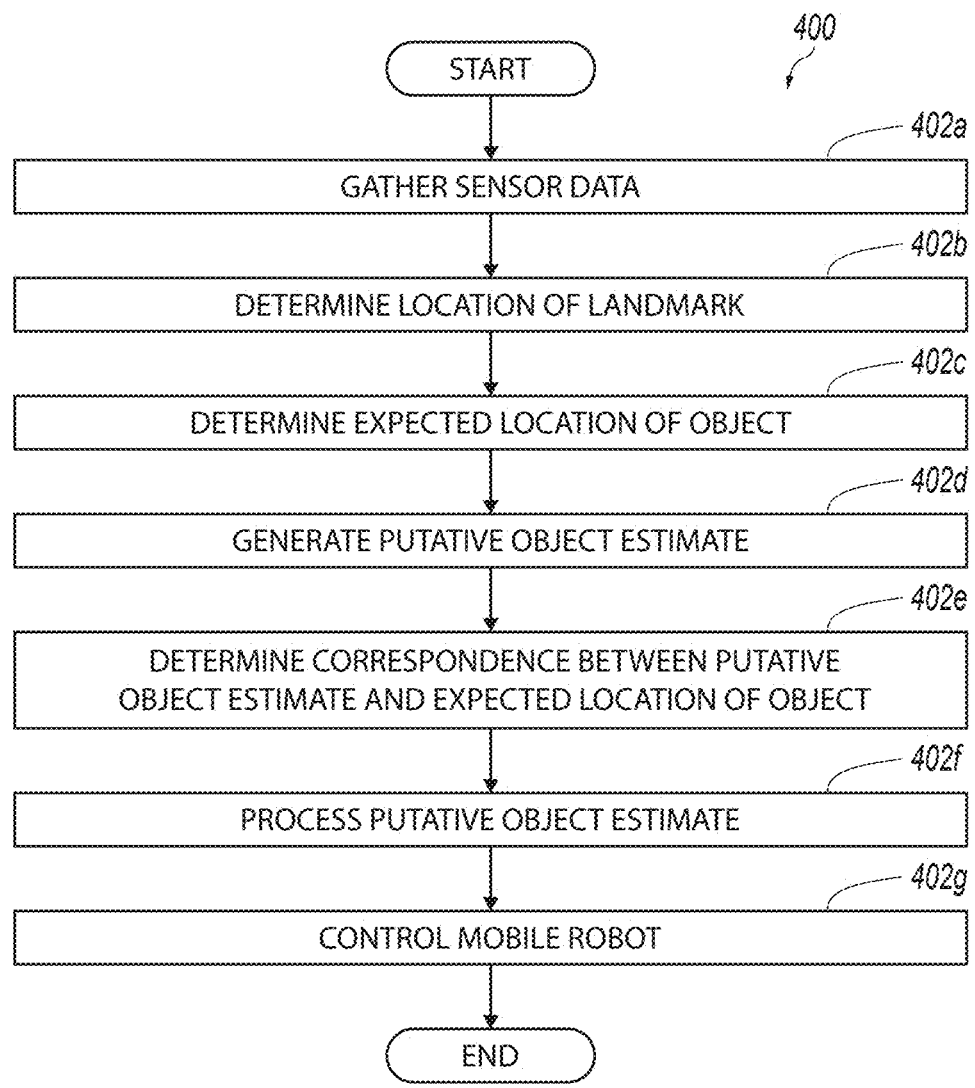
FIG. 11 is a block diagram corresponding to a method related to processing putative object estimates in accordance with at least some embodiments of the present technology.

FIG. 11 is a block diagram corresponding to a method 400 in accordance with at least some embodiments of the present technology. The diagram includes blocks 402a-402g corresponding to different respective portions of the method 400. The method 400 can include gathering sensor data (block 402a) corresponding to a working environment in which the robot 100 operates. In at least some cases, the sensor data includes two-dimensional data (e.g., image data) gathered by the two-dimensional sensor 250. In addition or alternatively, the sensor data can include three-dimensional data (e.g., depth data) gathered by the three-dimensional sensor 252. The three-dimensional data can be in the form of a point cloud (e.g., generated from a depth map). Other types and forms of sensor data are also possible. The sensor data can be gathered and processed in timesteps at a suitable frequency that balances adaptability and responsiveness with utilization of computing resources and/or other factors. For example, timesteps of sensor data can be gathered and processed at a frequency within a range from 2 Hertz to 20 Hertz, such as within a range from 3 Hertz to 10 Hertz. Operations described herein regarding processing sensor data can be executed on sensor data from one, some, or all timesteps in a time window. Furthermore, operations described herein may depend on agreement, averaging, and/or other processing of sensor data gathered at different timesteps (e.g., at successive or non-successive timesteps).

Figure 12:
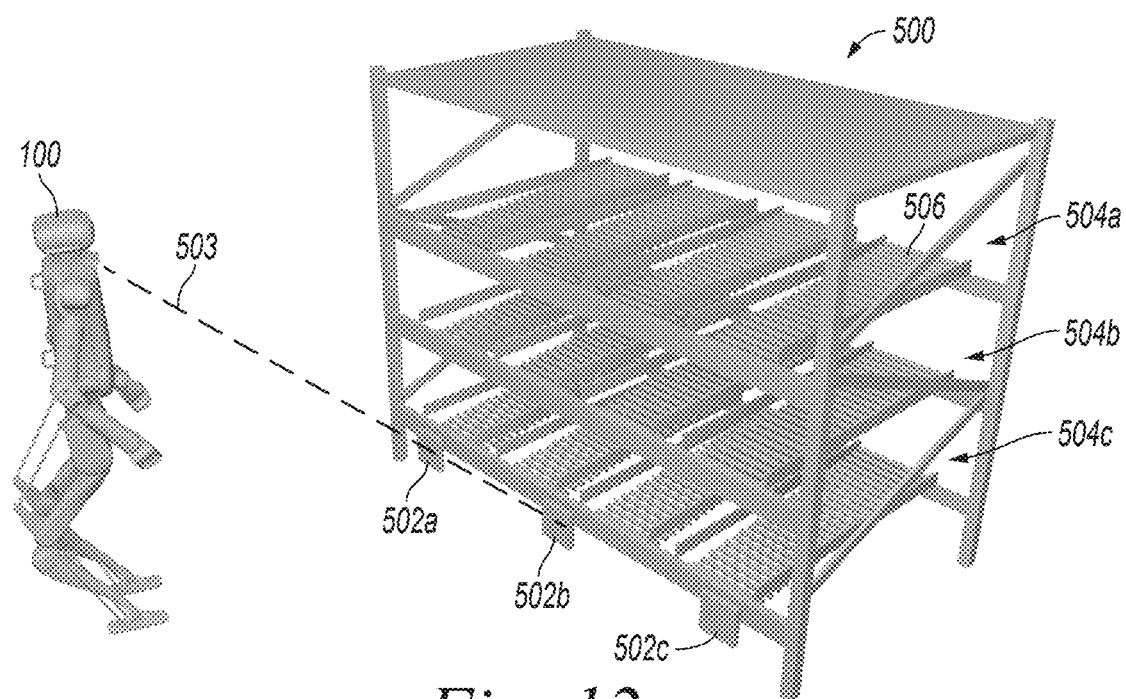
FIG. 12 is a perspective view of the robot of FIGS. 1-3 and a support structure at a time during an embodiment of the method of FIG. 11.
Figure 13:
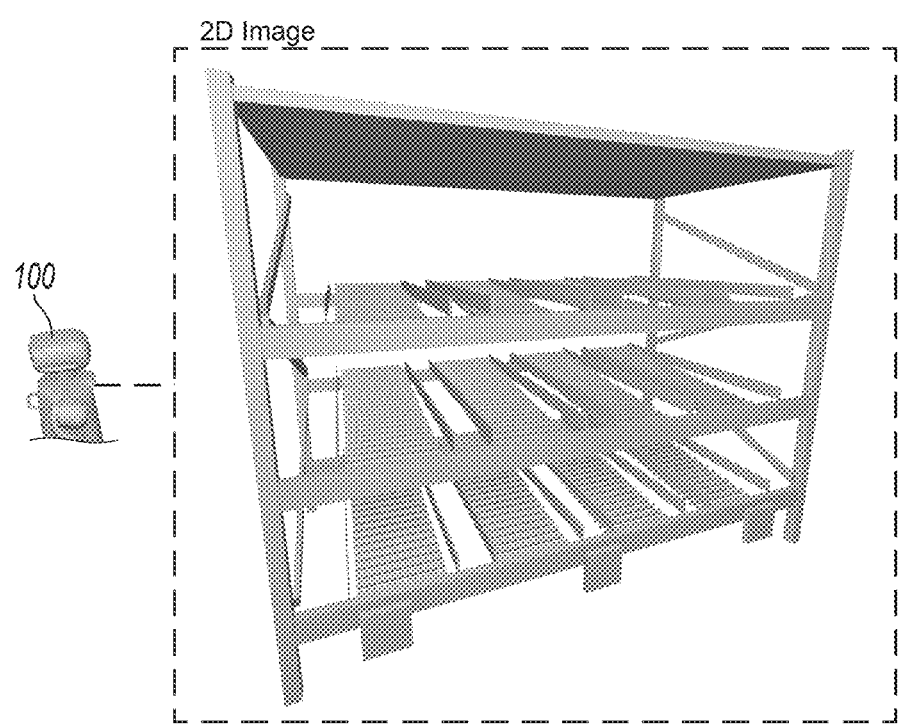
FIG. 13 is a representation of two-dimensional input to the robot of FIGS. 1-3 at the time corresponding to FIG. 12.
Figure 14:
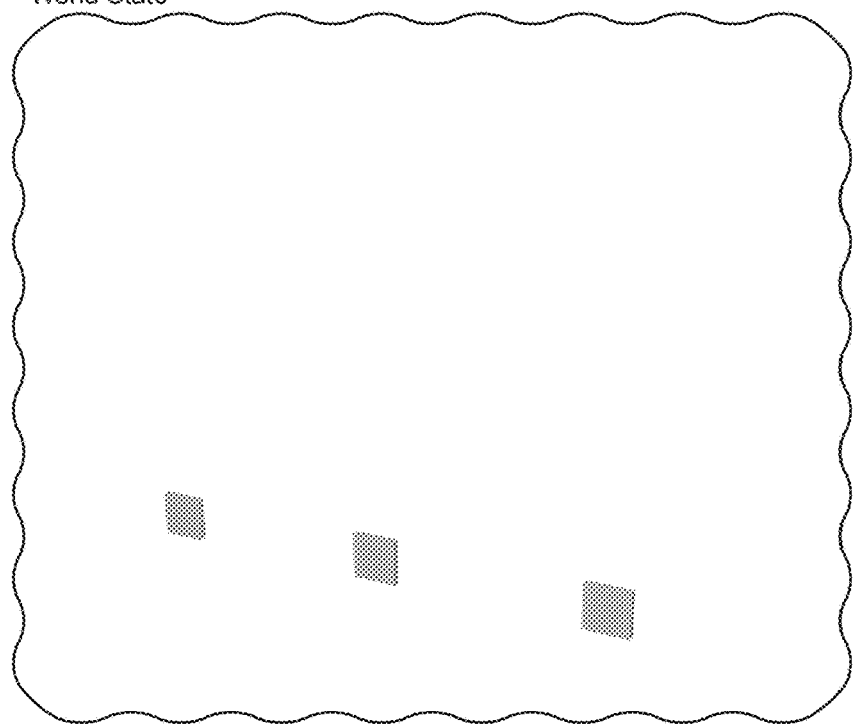
FIG. 14 is a representation of fiducials associated with the support structure of FIG. 12 in a world state of the software architecture of FIG. 5.

FIG. 12 is a perspective view of the robot 100 and a support structure 500 at a time during an embodiment of the method 400. FIG. 13 is a representation of two-dimensional input to the robot 100 at the time corresponding to FIG. 12. With reference to FIGS. 1-13 together, the method 400 can include determining a location of a landmark within the working environment (block 402b). This can be based at least partially on gathered sensor data (e.g., two-dimensional data and/or three-dimensional data). In at least some cases the landmark is spatially fixed relative to an expected object location. As shown in FIG. 12, the working environment can include fiducials 502 (individually identified as fiducials 502a-502c) carried by the support structure 500 (e.g., integrally connected to the support structure 500). The fiducials 502a-502c can be AprilTags or another type of structure that the robot 100 is able to localize with high accuracy. In FIG. 12, dashed line 503 indicates perception of the fiducial 502b. Given a known size, identification, and position on the support structure 500, the landmark locator 254 can use an image of the fiducial 502b to localize the fiducial 502b and the support structure 500 accurately in three dimensional space. The landmark can be one, some, or all of the fiducials 502a-502c. Furthermore, the landmark can be the support structure 500 itself and/or another structure in the working environment alone or together with one, some, or all of the fiducials 502a-502c. In these and other cases, localizing the landmark can be at least partially via SLAM (simultaneous localization and mapping).

The support structure 500 can include vertically distributed tiers 504 (individually identified as tiers 504a-504c). At the respective tiers 504a-504c, the support structure 500 can define bays 506 (one labeled in FIG. 12). At each of the bays 506, the support structure 500 can be configured to carry one or two of the objects 300. In the illustrated case, the support structure 500 is a rack configured to carry the objects 300 at respective positions in which movement of the objects 300 is constrained both laterally and vertically. For example, after a human or robot worker loads a given one of the objects 300 into a given one of the bays 506, structural features of the bay (e.g., the floor slope, the sidewall placements, etc.) can urge the object 300 toward a predetermined position. The predetermined position can correspond to an expected object location. In other cases, a counterpart of the support structure 500 can be configured to constrain objects in a similar manner, but have a different form. In still other cases, a counterpart of the support structure 500 can be configured to carry objects at respective positions in which movement of the objects is less constrained (e.g., only laterally or only vertically). In these and other cases, ranges or sets of expected object locations can be arranged according to the nature of the constraint. For example, when a counterpart of the support structure 500 is a conveyor with longitudinal rails, expected object locations can overlap one another longitudinally in a row between the rails.

Figure 15:
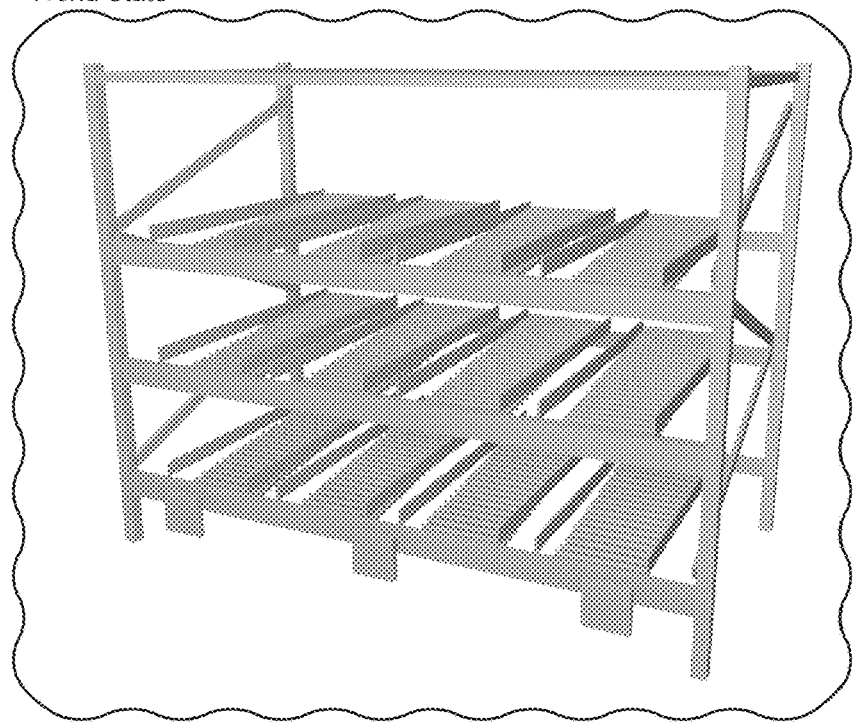
FIG. 15 is a representation of a model of the support structure of FIG. 12 in the world state of the software architecture of FIG. 5.
Figure 16:
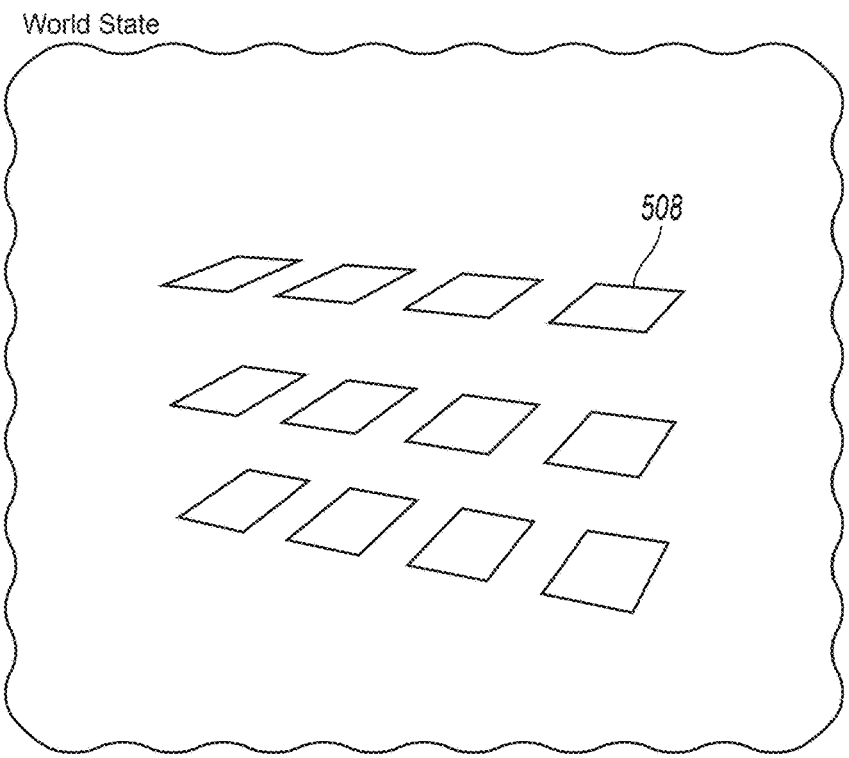
FIG. 16 is a representation of support patches corresponding to expected object locations in the world state of the software architecture of FIG. 5.

FIGS. 14-19 are representations of information in the world state 213. Together, these figures indicate a progression of information added to the world state 213 based on localization of the fiducials 502. With reference now to FIGS. 1-19 together, the landmark in the method 400 can encompass the fiducials 502 collectively. For example, the software architecture 200 (e.g., via the landmark locator 254) can localize the fiducials 502a-502c individually and then average the results. Based at least partially on this average, the software architecture 200 (e.g., via the expected object location estimator 256) can add a model of the support structure 500 to the world state 213 as shown in FIG. 15. The software architecture 200 (e.g., via the expected object location estimator 256) can access the model of the support structure 500 from the library 258 and register the model with a location of the fiducials 502 in the world state 213. Next, the software architecture 200 (e.g., via the landmark locator 254) can add support patches 508 to the world state 213 as shown in FIG. 16. The support patches 508 can correspond to floors of the individual bays 506 where the support structure 500 is configured to carry front rows of the objects 300. As discussed above, the support structure 500 can constrain the positions of the objects 300 such that dimensions of the support patches 508 correspond closely to individual footprints of the objects 300 when carried by the support structure 500. In other cases, a counterpart of the support structure 500 can constrain the positions of the objects 300 to a lesser extent. In these cases, counterparts of the support patches 508 can be much larger than the individual footprints of the objects 300.

With reference again to FIGS. 1-19, the method 400 can include determining expected object locations (block 402c). In at least some cases, the expected object locations are respective object-carrying locations of the support structure 500. Furthermore, these expected object locations can be based at least partially on the registered model of the support structure 500 in the world state 213 and/or on derivatives thereof (e.g., on the support patches 508). Alternatively, the expected object locations can be derived directly from localizing the fiducials 502. For example, adding the model of the support structure 500 and/or the support patches 508 to the world state 213 can be bypassed. Furthermore, the expected object locations can be based on object positions with no dependence on the support structure 500. For example, counterparts of the objects 300 carrying localization features (e.g., AprilTags) can be placed in expected object locations, localized via the robot 100 to add the expected object locations to the world state 213, and then removed. This process can be repeated if the environment changes (e.g., if a support structure is moved).

Figure 17:
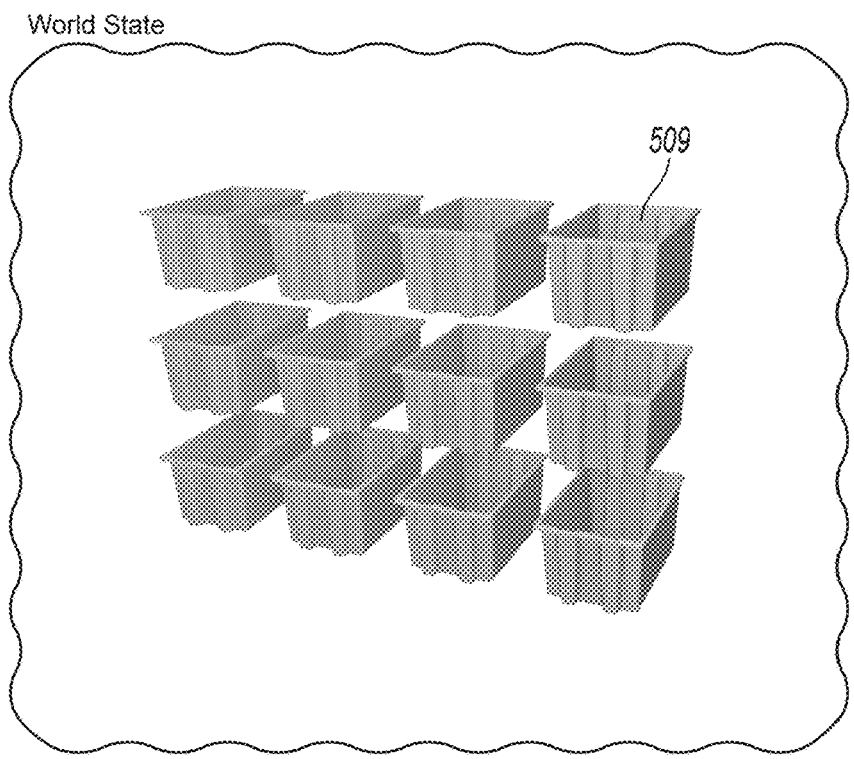
FIG. 17 is a representation of model copies corresponding to the expected object locations in the world state of the software architecture of FIG. 5.
Figure 18:
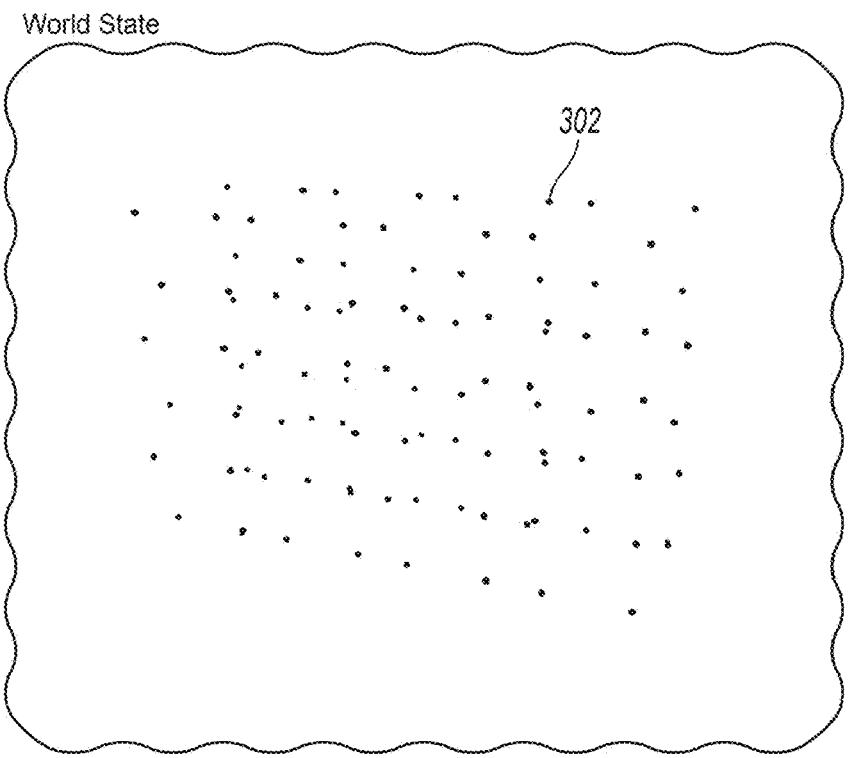
FIG. 18 is a representation of corners corresponding to the expected object locations in the world state of the software architecture of FIG. 5.
Figure 19:
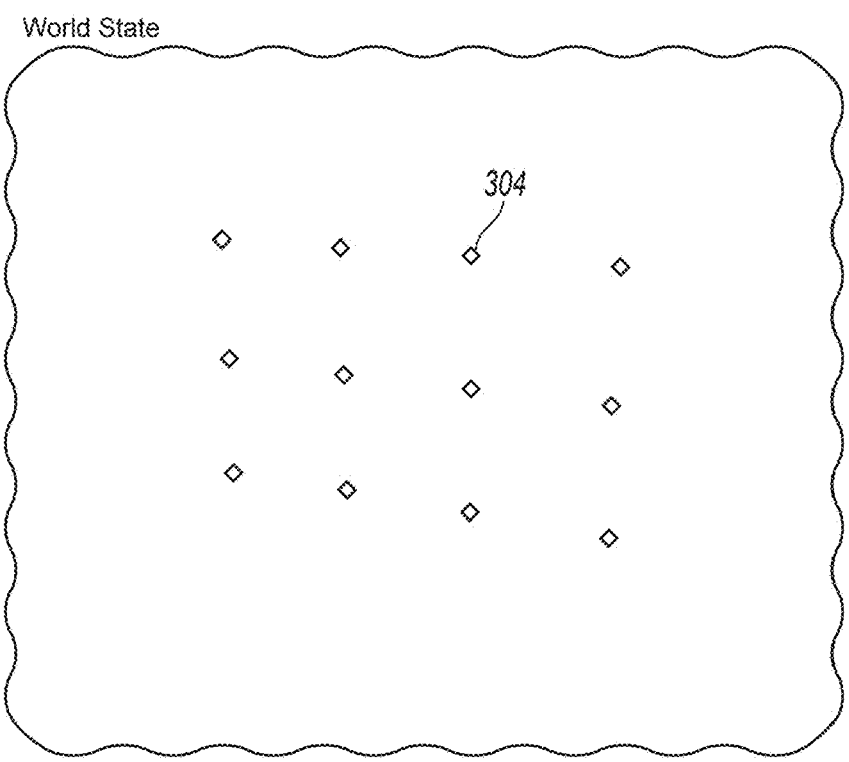
FIG. 19 is a representation of centroids corresponding to the expected object locations in the world state of the software architecture of FIG. 5.

The expected object locations can have a variety of suitable forms. In at least some cases, the software architecture 200 (e.g., via the expected object location estimator 256) adds copies 509 of a model of the object 300 to the world state 213 as shown in FIG. 17. The software architecture 200 (e.g., via the expected object location estimator 256) can access a model of the object 300 from the library 258 and register one or more copies of the model with the location of the fiducials 502, the location of the support structure 500, and/or the locations of the support patches 508. Thus, the expected object locations can be based at least partially on the location of the landmark, directly or indirectly. In at least some cases, determining the expected object locations includes aligning one or more shape features of the objects 300 (e.g., a corner, an edge, a surface, etc.) with a location of the support structure 500.

The method 400 can include determining a single expected object location or multiple expected object locations. In the latter case, the expected object locations can be non-overlapping or overlapping. For example, individual bays 506 of the support structure 500 can correspond to the respective object-carrying locations of the support structure 500 and to respective non-overlapping expected object locations. Where a counterpart of the support structure 500 is configured to carry the object 300 without significantly constraining the positions of the object 300 and in other cases, the software architecture 200 (e.g., via the expected object location estimator 256) can add overlapping copies of the model of the object 300 to the world state 213 Overlapping expected object locations can be useful, for example, when a counterpart of the support structure 500 is a conveyor, a table, a shelf, a countertop, etc. In these and other cases, objects carried by such a support structure may tend to be less constrained than objects carried by a rack-type support structure, such as the support structure 500. To be clear, however, the use of overlapping expected object locations can be useful whether or not objects at the expected object locations are highly constrained.

The software architecture 200 (e.g., via the expected object location estimator 256) can add the expected object locations to the world state 213 in a variety of forms. For example, the software architecture 200 (e.g., via the expected object location estimator 256) can add the model copies 509 shown in FIG. 17 and/or derivative information to the world state 213. Examples of derivative information include the corners 302 shown in FIG. 18, other shape features of the objects 300 (e.g., edges, surfaces, etc.), and the centroids 304 shown in FIG. 19. This information can exist in the world state 213 as sets of coordinates in a three-dimensional space or in another suitable form. In addition or alternatively, this information can be stored in another manner or generated in real time without being added to the world state 213, such as at every timestep. As yet another example, the information can be stored in the world state 213 or another location and updated, such as after a predetermined number of timesteps. This can be useful to account for small spatial changes in the environment that may occur over time.

Figure 20:
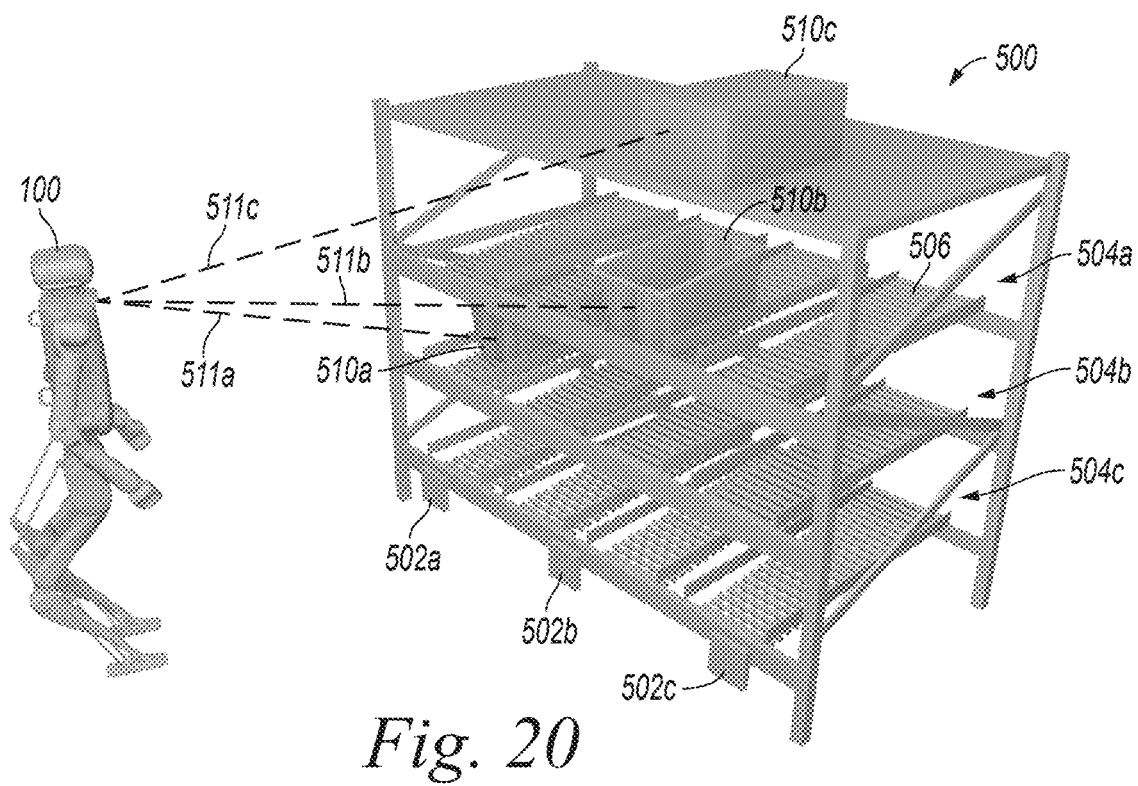
FIG. 20 is a perspective view of the robot of FIGS. 1-3, the support structure of FIG. 12, and several objects carried by the support structure at a time during an embodiment of the method of FIG. 11.
Figure 21:
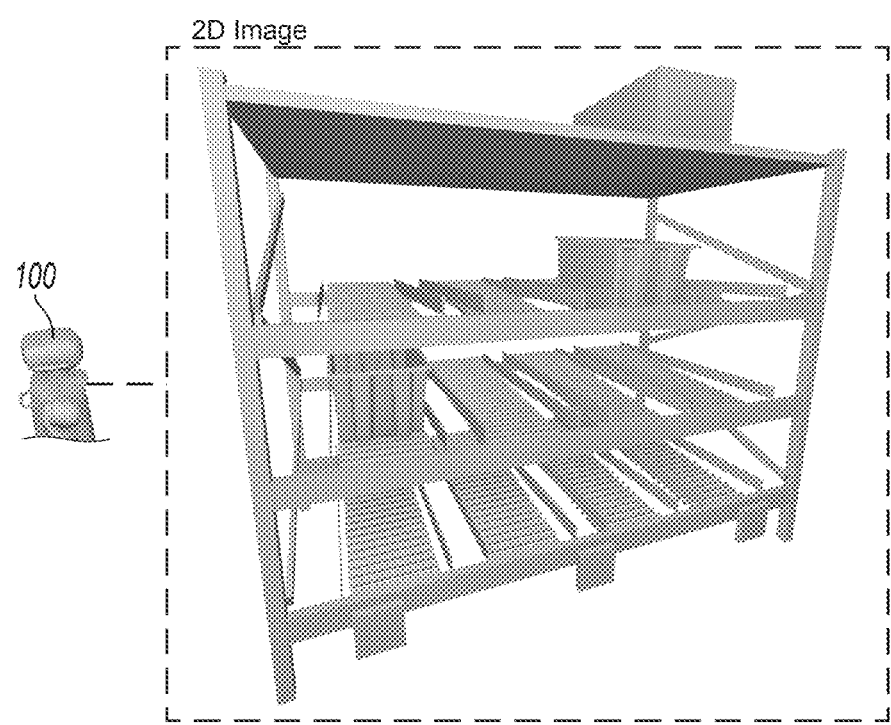
FIG. 21 is a representation of two-dimensional input to the robot of FIGS. 1-3 at the time corresponding to FIG. 20.
Figure 22:
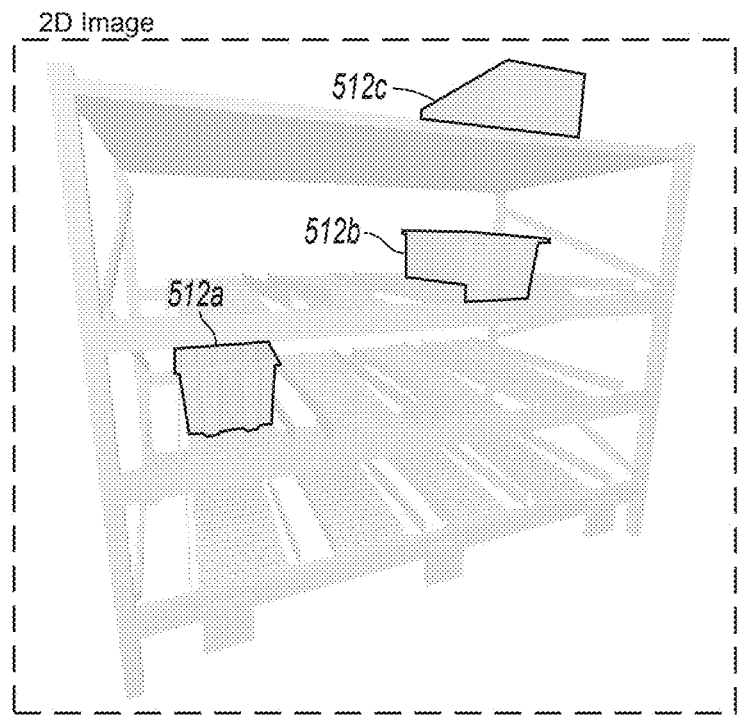
FIG. 22 is a representation of contours of putative object estimates corresponding to the objects of FIG. 20 overlying the two-dimensional input of FIG. 21 during an embodiment of the method of FIG. 11.
Figure 23:
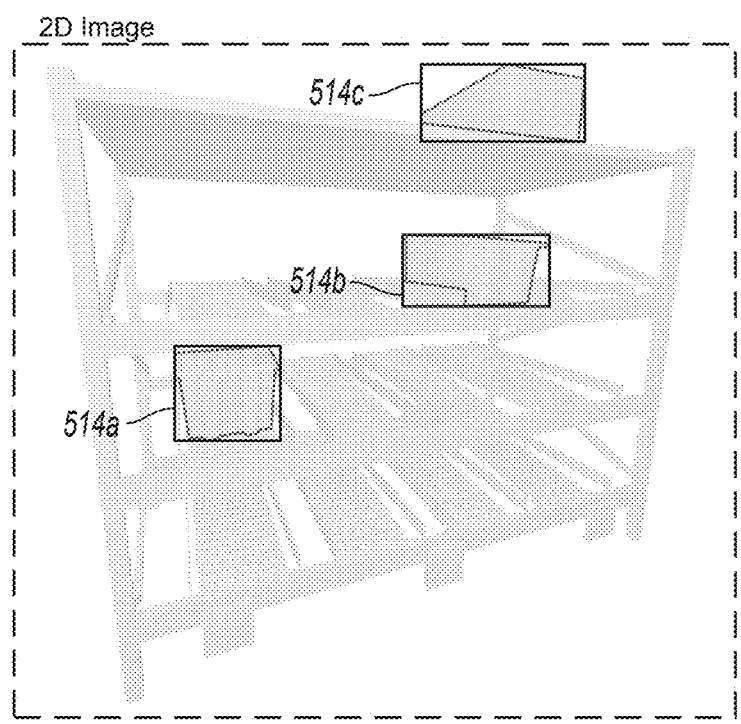
FIG. 23 is a representation of the contours of FIG. 22 and bounding shapes of the putative object estimates corresponding to the objects of FIG. 20 overlying the two-dimensional input of FIG. 21 during an embodiment of the method of FIG. 11.

The method 400 can further include generating a putative object estimate (block 402*d*). In at least some cases, generating the putative object estimates is based at least partially on the gathered sensor data, which can be the same or different than sensor data used to generate the expected object locations. FIG. 20 is a perspective view of the robot 100, the support structure 500, and several objects 510 (individually identified as objects 510*a*-510*c*) carried by the support structure 500 at a time during an embodiment of the method 400. In FIG. 20, dashed lines 511*a*-511*c* indicate two-dimensional perception of the objects 510*a*-510*c*. FIG. 21 is a representation of two-dimensional input to the robot 100 at the time corresponding to FIG. 20. With reference to FIGS. 1-21 together, the software architecture 200 (e.g., via the machine learning model 260) can generate the putative object estimates from the two-dimensional input. For example, the machine learning model 260 can receive an RGB image, process the image, estimate objects in the image, generate information corresponding to the estimated objects, and output the information. The output information can include bounding shapes (e.g., boxes), contours, key points corresponding to shape features (e.g., corners), etc. FIG. 22 is a representation of contours 512 (individually identified as contours 512*a*-512*c*) corresponding to putative object estimates for the objects 510*a*-510*c*, respectively, overlying the two-dimensional input of FIG. 21 during an embodiment of the method 400. Similarly, FIG. 23 is a representation of the contours 512 and bounding shapes 514 (individually identified as bounding shapes 512*a*-512*c*) of the putative object estimates overlying the two-dimensional input of FIG. 21 during an embodiment of the method 400. As shown in FIGS. 22 and 23, the software architecture 200 can generate the contours 512 and the bounding shapes 514 in a two-dimensional plane corresponding to the two-dimensional input (e.g., corresponding to an image plane of a camera of the robot 100).

Figure 24:
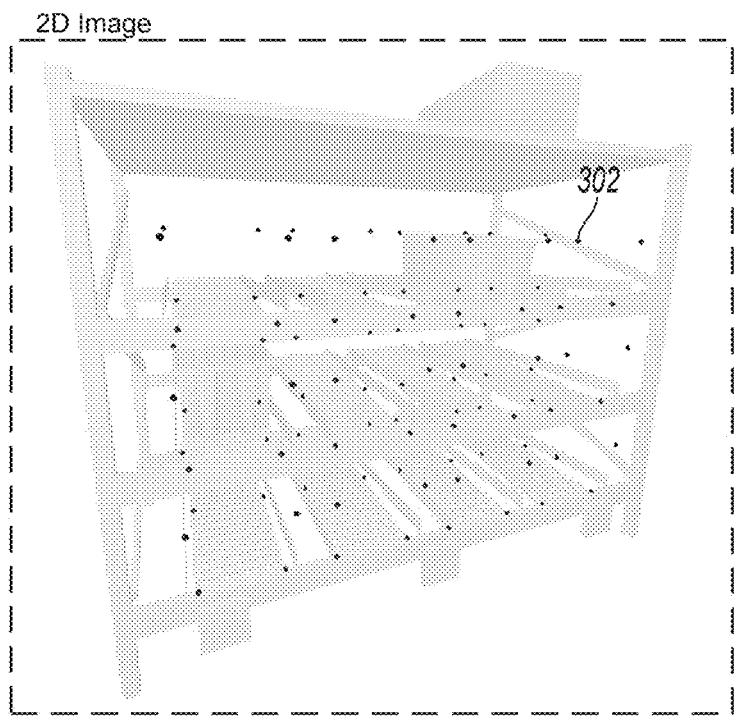
FIG. 24 is a representation of the corners of FIG. 18 projected onto the two-dimensional input of FIG. 21 during an embodiment of the method of FIG. 11.

The method 400 can further include determining correspondences between the putative object estimates and the expected object locations (block 402*e*). In at least some cases, this includes projecting information for the expected object locations from the world state 213 onto sensor data in a two-dimensional plane and/or in a three-dimensional space and comparing this projected information to corresponding information for the putative object estimates. Thus, determining the correspondences can be based at least partially on gathered sensor data (e.g., gathered two-dimensional data and/or three-dimensional data), which can be the same as or different than sensor data used for other purposes described herein. FIG. 24 is a representation of the corners 302 of the objects 300 projected onto the two-dimensional input of FIG. 21 during an embodiment of the method 400. Within the world state 213, the corners 302 can be organized into sets individually corresponding to different expected object locations. FIG. 24 is a representation of given sets of the corners 302 projected onto the two-dimensional input of FIG. 21 during an embodiment of the method 400. Projecting information from the world state 213 onto the two-dimensional input can include correlating respective reference frames of the world state 213, the two-dimensional sensor 250, and the expected object locations (e.g., via a reference frame for the support structure 500) with one another. In at least some cases, a relationship between a reference frame of the world state 213 and a reference frame of the two-dimensional sensor 250 is tracked via known movement of the robot 100 and/or via localization of the fiducials 502. This relationship can be used to correlate information in the world state 213 (e.g., coordinates of the corners 302) to the two-dimensional input based on a pinhole camera model.

Figure 25:
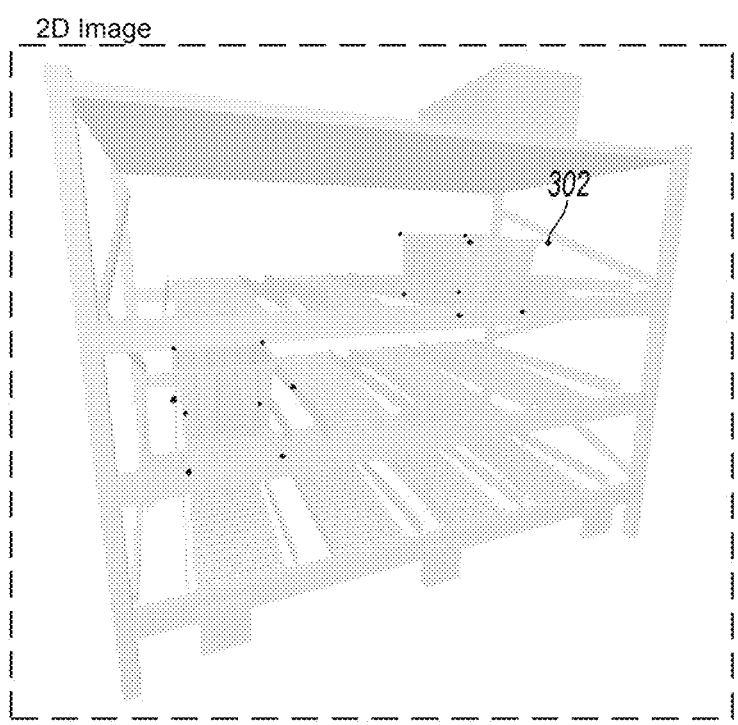
FIG. 25 is a representation of given sets of the corners of FIG. 18 projected onto the two-dimensional input of FIG. 21 during an embodiment of the method of FIG. 11.
Figure 26:
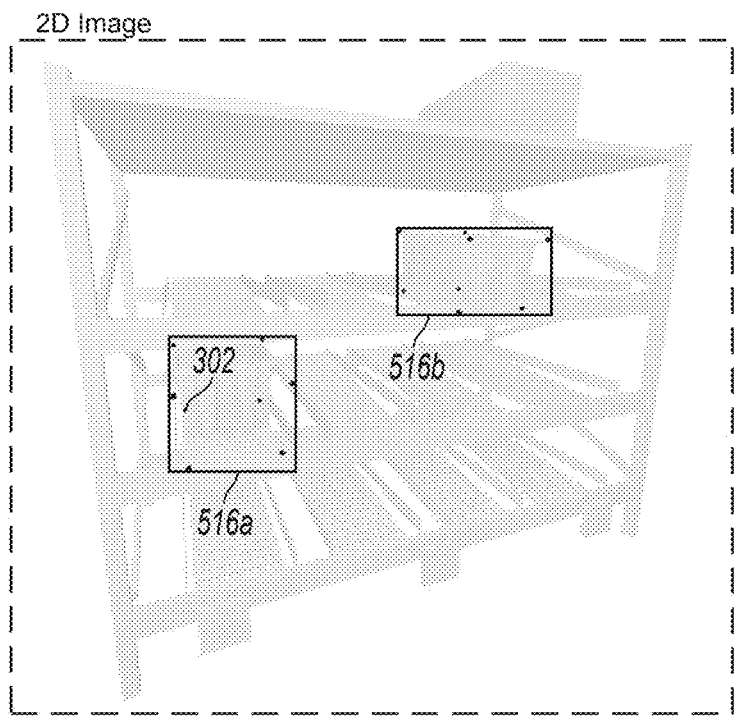
FIG. 26 is a representation of the given sets of corners of FIG. 25 and corresponding bounding shapes projected onto the two-dimensional input of FIG. 21 during an embodiment of the method of FIG. 11.

The given sets of corners 302 can correspond to the expected object locations nearest to the putative object estimates, such as nearest to the contours 512a-512c or nearest to the bounding shapes 514a-514c. In the illustrated example, the same expected object location is nearest to both of the contours 512b, 512c and to both of the bounding shapes 514b, 514c. FIG. 25 is a representation of given sets of the corners 302 projected onto the two-dimensional input of FIG. 21 during an embodiment of the method 400. The software architecture 200 (e.g., via the expected object location estimator 256 and/or the two-dimensional checker 262) can create bounding shapes (e.g., boxes) for any expected object locations to be compared to putative object estimates. FIG. 26 is a representation of the given sets of corners 302 shown in FIG. 25 and corresponding bounding shapes 516 (individually identified as bounding shapes 516a, 516b) projected onto the two-dimensional input of FIG. 21 during an embodiment of the method 400. The bounding shapes 516a, 516b can represent a maximum range between the corners 302 of a given set in the two-dimensional plane corresponding to two-dimensional input to the robot 100 (e.g., corresponding to an image plane of a camera of the robot 100).

Figure 27:
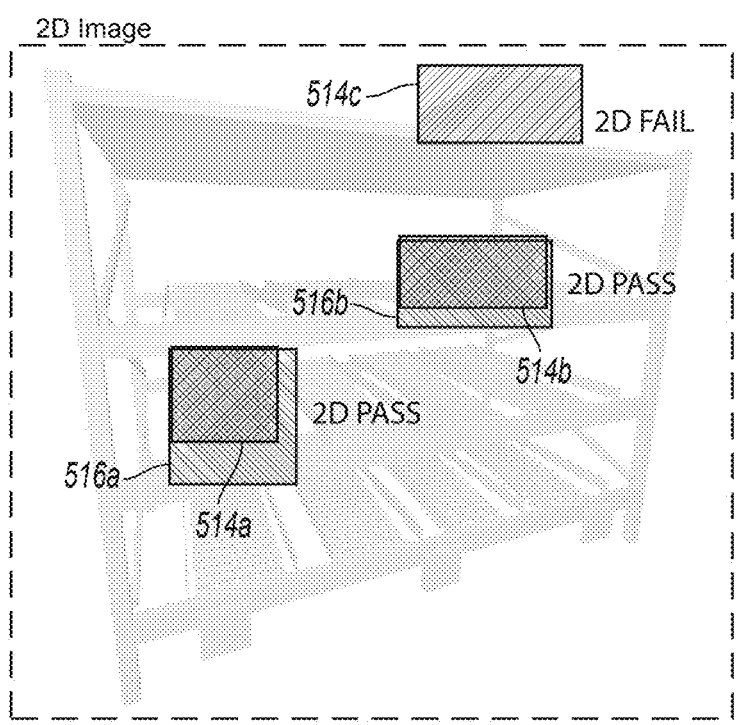
FIG. 27 is a representation of the bounding shapes of FIG. 23 overlying the two-dimensional input of FIG. 21, the bounding shapes of FIG. 26 projected onto the two-dimensional input of FIG. 21, and outputs of a two-dimensional checker of the software architecture of FIG. 5 during an embodiment of the method of FIG. 11.

FIG. 27 is a representation of the bounding shapes 514 overlying the two-dimensional input of FIG. 21 and the bounding shapes 516 projected onto the two-dimensional input of FIG. 21 during an embodiment of the method 400. In at least some cases, determining correspondence between a putative object estimate and a corresponding expected object location is based at least partially on comparing the putative object estimate and the expected object location in a two-dimensional plane. This comparison can include determining an intersection between the putative object estimate and the expected object location in the two-dimensional plane. The intersection can be an intersection between an area within a given one of the bounding shapes 514a-514c and an area within a corresponding one of the bounding shapes 516a, 516b. Areas within the bounding shapes 514a-514c and areas within the bounding shapes 516a, 516b are hatched in opposite directions in FIG. 27 for clarity of illustration. As shown in FIG. 27, the extent of intersection between the bounding shape 514a and the corresponding bounding shape 516a is high, as is the extent of intersection between the bounding shape 514b and the corresponding bounding shape 516b. The extent of intersection between the bounding shape 514c and the corresponding bounding shape 516b, however, is low.

The method 400 can further include processing the putative object estimates (block 402f). In at least some cases, this is based on correspondences between the putative object estimates and the expected object locations. FIG. 27 also shows outputs of the two-dimensional checker 262 during an embodiment of the method 400. Based on the intersections (or lack thereof), the two-dimensional checker 262 can pass the putative object estimates corresponding to the bounding shapes 514a, 514b for high correspondence with the nearest expected object locations. Similarly, the two-dimensional checker 262 can fail the putative object estimate corresponding to the bounding shape 514c for low correspondence with the nearest expected object location. In this case, differentiating between high correspondence and low correspondence between the putative object estimates and the nearest expected object locations is clear. In other cases, this differentiation can be subtle or misleading. One example of a useful approach to the comparison is based on an area of intersection and an area of union. For example, the two-dimensional checker 262 can determine a ratio of (a) an area of intersection between an area within a given one of the bounding shapes 514 and an area within a corresponding one of the bounding shapes 516 and (b) an area of union of the given one of the bounding shapes 514 and the area within the corresponding one of the bounding shapes 516. If this ratio is above a threshold (e.g., 0.5), the two-dimensional checker 262 can pass the putative object estimate corresponding to the given one of the bounding shapes 514 for high correspondence with the nearest expected object location. This approach, which can be a form of an intersection over union metric, can be useful because it tends to filter out unproductive intersections that can occur when putative object estimates are very large, such as when a putative object estimate is based on an object the robot 100 is carrying within a field of view of the two-dimensional sensor 250. Other approaches to determining this correspondence are also possible.

The goal of processing the putative object estimates can be to distinguish valid and productive putative object estimates from invalid and/or unproductive putative object estimates. As an example of invalidity, a given putative object estimate may correspond to an object that is not a correct type. In the illustrated example, the object 510c is a box rather than a tote. Objects of an incorrect type are less likely than objects of a correct type to be at an expected object location. Indeed, the object 510c is resting on top of the support structure 500 rather than in one of the bays 506. An object estimate, however, can be valid, but also unproductive. For example, the object 510a is a tote, but it is not positioned at a front portion of the support structure 500. As positioned, the object 510a may be inaccessible to the robot 100. The correspondence between the putative object estimate and the expected object location for the object 510a does not indicate this problem. Moreover, the two-dimensional checker 262 can incorrectly pass valid and invalid putative object estimates that happen to align with an expected object location in a field of view of the robot 100, but are nevertheless not at an expected object location in a three-dimensional space. This can occur, for example, with respect to an object the robot 100 (or another robot) carries in front of the support structure 500. For this and/or other reasons, it can be useful to supplement comparing the putative object estimates and the object-carrying locations in a two-dimensional plane with comparing the putative object estimates and the object-carrying locations in a three-dimensional space (e.g., after comparing the putative object estimates and the object-carrying locations in a two-dimensional plane). In still other cases, comparing the putative object estimates and the object-carrying locations can occur in a three-dimensional space only.

Figure 28:
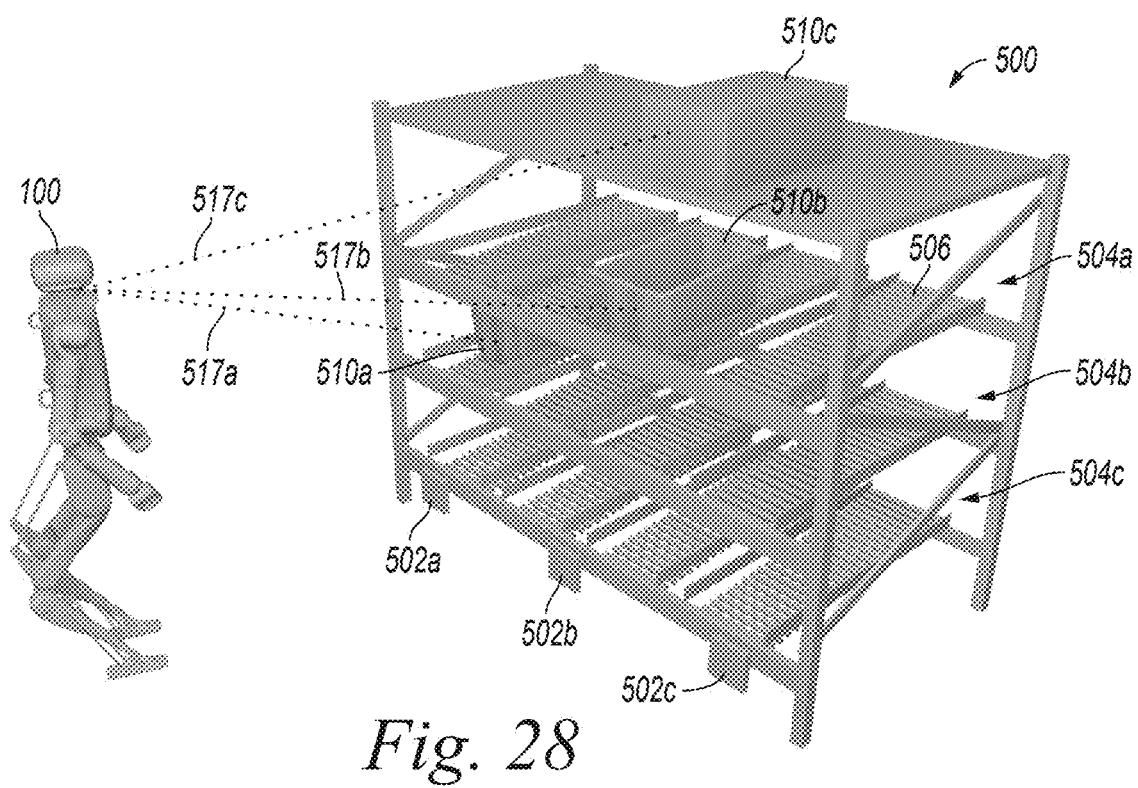
FIG. 28 is a perspective view of the robot of FIGS. 1-3, the support structure of FIG. 12, and the objects of FIG. 20 at a time during an embodiment of the method of FIG. 11.
Figure 29:
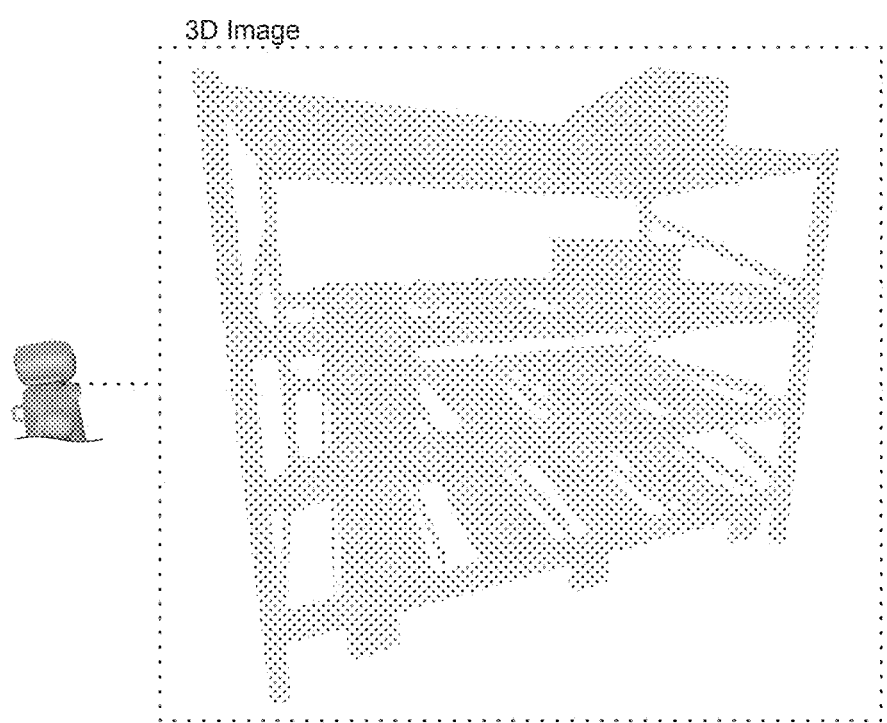
FIG. 29 is a representation of three-dimensional input to the robot of FIGS. 1-3 at the time corresponding to FIG. 28.

FIG. 28 is a perspective view of the robot 100, the support structure 500, and the objects 510a-510c at a time during an embodiment of the method 400. In FIG. 28, dotted lines 517a-517c indicate three-dimensional perception of the objects 510a-510c. FIG. 29 is a representation of three-dimensional input to the robot 100 at the time corresponding to FIG. 28. The three-dimensional input can be used to compare the putative object estimates and the expected object locations in a three-dimensional space. In at least some cases, the three-dimensional space defines a first dimension (x) parallel to an image plane of a camera of the robot 100, a second dimension (z) parallel to the image plane and perpendicular to the first dimension, and a third dimension (y) perpendicular to the image plane. Comparing the putative object estimates and the expected object locations can include determining an offset therebetween in a three-dimensional space. The offset can be a position offset, an orientation offset, and/or another suitable type of offset. As discussed below, it is sometimes useful to apply different tolerances to offset components in different respective dimensions. Accordingly, a coordinate frame of an offset can be relevant to analyzing the offset. In at least some cases, an offset is based on a coordinate frame oriented to an image plane of a camera of the robot 100, as mentioned above. Alternatively or in addition, an offset can be based on a coordinate frame oriented to an expected object location. Moreover, the coordinate frames for different expected object locations in a working environment can be the same or different.

Figure 30:
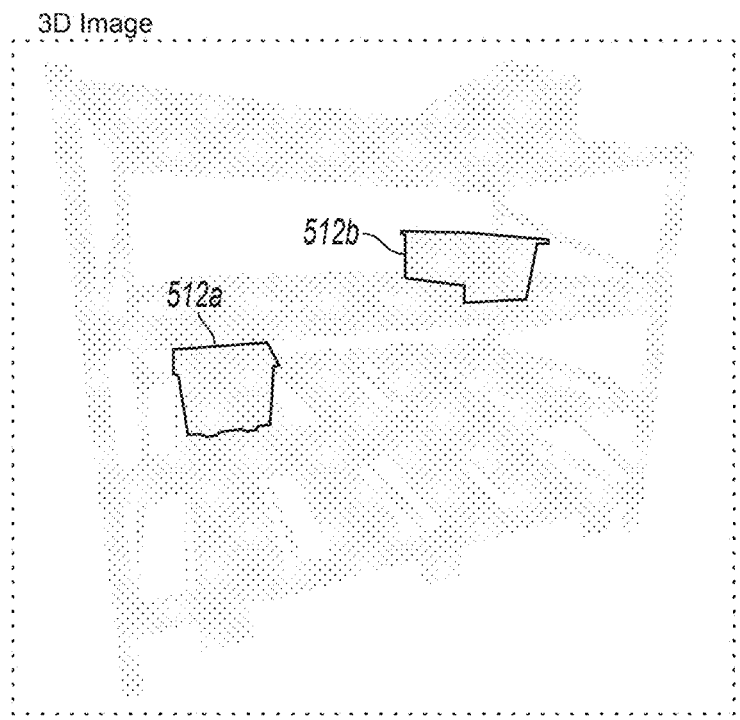
FIG. 30 is a representation of selected contours of FIG. 22 projected onto the three-dimensional input of FIG. 29 during an embodiment of the method of FIG. 11.
Figure 31:
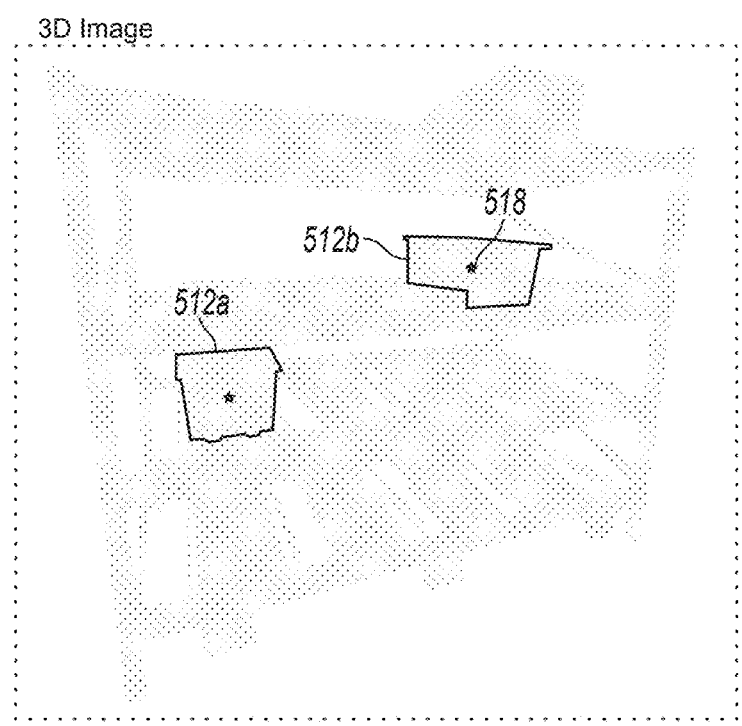
FIG. 31 is a representation of the selected contours of FIG. 22 and corresponding centroids projected onto the three-dimensional input of FIG. 29 during an embodiment of the method of FIG. 11.

FIGS. 30-35 illustrate one approach to determining position offsets for putative object estimates corresponding to the objects 510a, 510b, which passed a two-dimensional check. The method 400 can include projecting the putative object estimates onto three-dimensional input to the robot 100. This can include a process similar to the process described above for projecting information from the world state 213 onto two-dimensional input to the robot 100. For example, a relationship between a reference frame of the world state 213 and a reference frame of the three-dimensional sensor 252 can be tracked via known movement of the robot 100 and/or via localization of the fiducials 502. This relationship can be used to correlate information in the world state 213 (e.g., coordinates of the corners 302) to the three-dimensional input based on a pinhole camera model. FIG. 30 is a representation of the contours 512a, 512b projected onto the three-dimensional input of FIG. 29 during an embodiment of the method 400. In at least some cases, the software architecture 200 (e.g., via the three-dimensional segmenter 264) determines segments of the three-dimensional input corresponding to the contours 512a, 512b. These segments can define centroids 518. For example, a given one of the centroids 518 can have coordinates that are the median of all x values, the median of all y values, and the median of all z values within a given segment. FIG. 31 is a representation of the contours 512a, 512b and corresponding centroids 518 (shown as stars in FIG. 31) projected onto the three-dimensional input of FIG. 29 during an embodiment of the method 400. Given that the segments correspond mostly to outer surfaces of the objects 510a, 510b, the centroids 518 can be merely rough approximations of the positions of the objects 510a, 510b, yet sufficient to provide a useful filter in a three-dimensional space.

Figure 32:
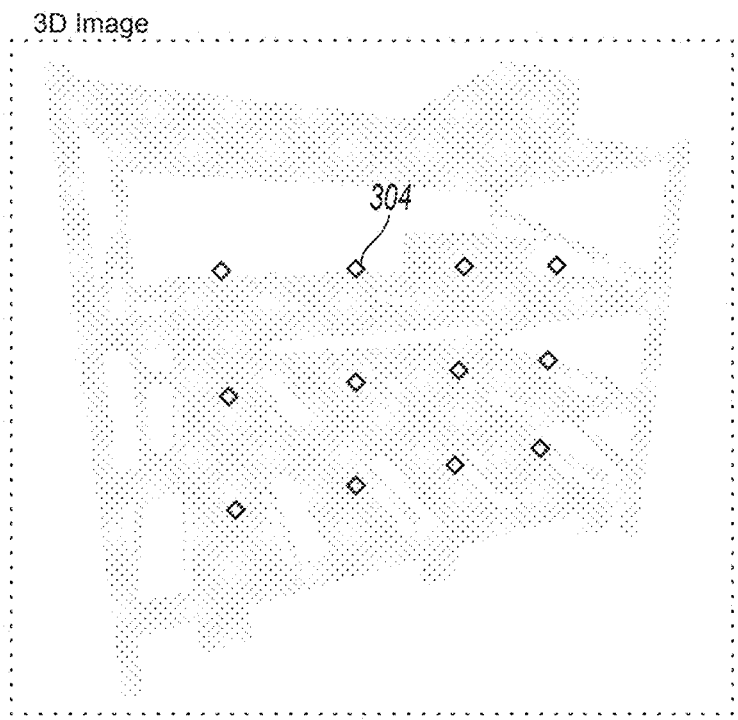
FIG. 32 is a representation of the centroids of FIG. 19 projected onto the three-dimensional input of FIG. 29 during an embodiment of the method of FIG. 11.
Figure 33:
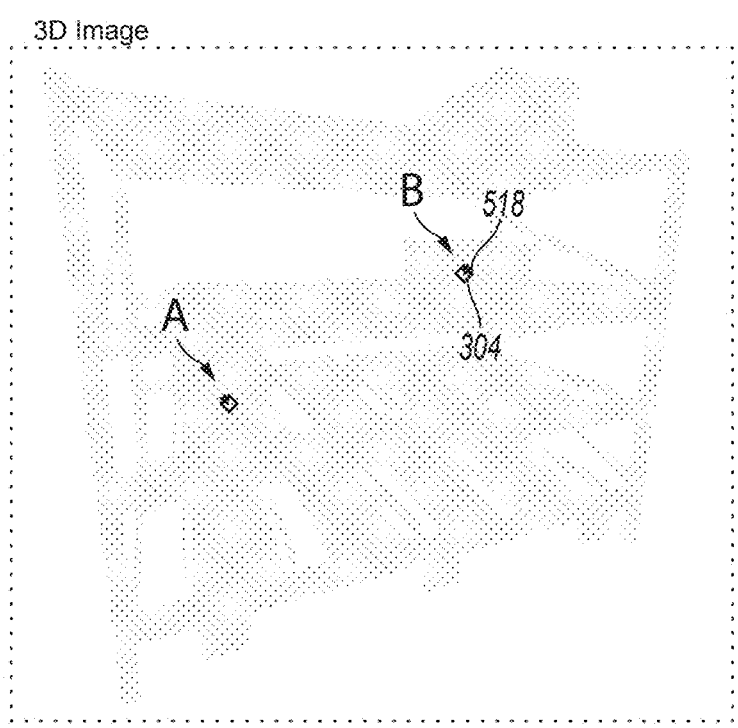
FIG. 33 is a representation of selected centroids of FIG. 19 and the centroids of FIG. 31 projected onto the three-dimensional input of FIG. 29 during an embodiment of the method of FIG. 11.

The offset for comparing a putative object estimate and an expected object location can be at least partially based on a position difference between a centroid of the putative object estimate and a centroid of the expected object location. Correspondingly, the method 400 can include projecting the centroids 304 onto three-dimensional input to the robot 100. FIG. 32 is a representation of the centroids 304 projected onto the three-dimensional input of FIG. 29 during an embodiment of the method 400. The software architecture 200 (e.g., via the three-dimensional checker 266) can identify the individual centroids 304 nearest to the individual centroids 518. FIG. 33 is a representation of the centroids 518 and the nearest centroids 304 projected onto the three-dimensional input of FIG. 29 during an embodiment of the method 400. As mentioned above, various differences between an expected object location and a putative object estimate can have greater or lesser value in distinguishing valid and productive estimates from invalid and/or unproductive estimates. In at least some cases, the software architecture 200 (e.g., via the three-dimensional checker 266) compares the individual centroids 518 to each one or to given ones of the centroids 304 in a manner that gives certain positional differences more weight than others. A position offset between a given one of the centroids 518 and a given one of the centroids 304 can be a weighted offset in which a difference in one dimension (x, y, or z) has a different weight than a difference in another dimension. For example, a difference in a dimension (x or z) parallel to a field of view of the two-dimensional sensor 250 and/or of the three-dimensional sensor 252 can have greater weight than a difference in a dimension (y) perpendicular to these dimensions.

Figure 34:
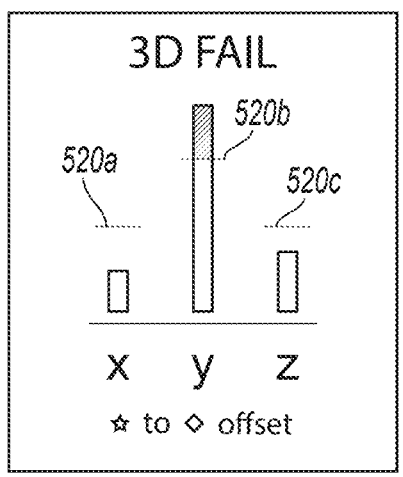
FIG. 34 is a chart showing respective offsets in three dimensions between a centroid of FIG. 19 and a centroid of FIG. 31 at region A in FIG. 33 and a corresponding output of a three-dimensional checker of the software architecture of FIG. 5 during an embodiment of the method of FIG. 11.
Figure 35:
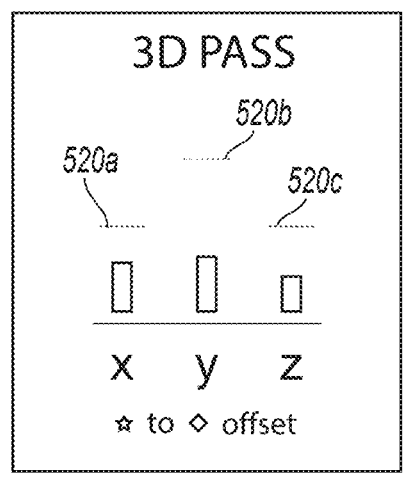
FIG. 35 is a chart showing respective offsets in three dimensions between a centroid of FIG. 19 and a centroid of FIG. 31 at region B in FIG. 33 and a corresponding output of a three-dimensional checker of the software architecture of FIG. 5 during an embodiment of the method of FIG. 11.

FIG. 34 is a chart showing respective offsets in three dimensions between the centroid 518 and the centroid 304 at region A in FIG. 33 and a corresponding output of the three-dimensional checker 266 during an embodiment of the method 400. FIG. 35 is a chart showing the same for the centroid 518 and the centroid 304 at region B in FIG. 33. FIGS. 34 and 35 also show outputs from the three-dimensional checker 266 for the putative object estimates corresponding to the centroids 518 at regions A and B of FIG. 33, respectively. As shown in FIGS. 34 and 35, the offsets can have different thresholds 520 (individually identified as thresholds 520a-520c) in different dimensions (x, y, z). In at least some cases, exceeding the threshold 520a-520c in any given dimension can cause the three-dimensional checker 266 to fail the corresponding putative object estimate. In the illustrated example, the putative object estimate corresponding to the object 510a fails and the putative object estimate corresponding to the object 510b passes. Approaches to adjusting for the effect of occlusion on the centroids 518 are also possible in addition to or instead of decoupling offsets in different dimensions. For example, when the robot 100 is likely to see only a front surface of an object, the three-dimensional checker 266 can adjust a centroid of three-dimensional data for a putative object estimate of the object to be farther from the robot 100 by half of the object's known depth. The direction in which the three-dimensional checker 266 moves a centroid in these and other cases can be based at least partially on a surface normal and/or another normal corresponding to the orientation of an object. For example, a centroid can be moved in a direction parallel to the normal of a front surface of an object.

Some other approaches to comparing a putative object estimate and an expected object location in a three-dimensional space involve determining an orientation offset instead of or in addition to determining a position offset. For example, determining the expected object locations can include determining normals for the expected object locations in a three-dimensional space. As with the corners 302 and the centroids 304, the normals can be derivatives of object models. Correspondingly, generating the putative object estimates can include generating normals for the putative object estimates in the three-dimensional space. For example, the three-dimensional input can include data corresponding to surfaces of the objects 300 (e.g., front surfaces) that tend to be unobstructed when the objects 300 are at the expected object locations. The software architecture 200 (e.g., via the three-dimensional checker 266) can recognize these surfaces and calculate corresponding normals. The software architecture 200 (e.g., via the three-dimensional checker 266) can then determine orientation offsets (e.g., as angles) based at least partially on orientation differences between the normals of the putative object estimates and the normals of the expected object locations. If an orientation offset is below a threshold, the software architecture 200 (e.g., via the three-dimensional checker 266) can pass the corresponding putative object estimate. This can be effective because, like position, orientations for valid and productive estimates may tend to match orientations for expected object locations. In some cases, occlusion in the three-dimensional input may be less problematic in the context of determining orientation offsets than in the context of determining position offsets. In other cases, occlusion in the three-dimensional input may be less problematic in the context of determining position offsets than in the context of determining orientation offsets. For this and/or other reasons, three-dimensional checks based on position and orientation can be used together (e.g., simultaneously, with orientation as a check on position, or with position as a check on orientation) to improve the performance of the three-dimensional checker 266.

Processing the putative object estimates can further include updating the world state 213 at least partially based on output from the object estimator 212. For example, when correspondence between a putative object estimate and an expected object location (e.g., any expected object location) is low, the software architecture 200 (e.g., via the object estimator 212) can exclude a model and/or other information corresponding to the putative object estimate from the world state 213. In contrast, when correspondence between a putative object estimate and an expected object location (e.g., any expected object location) is high, the software architecture 200 (e.g., via the object estimator 212) can include a model and/or other information corresponding to the putative object estimate in the world state 213. In the illustrated example, the two-dimensional checker 262 identified low correspondence between the putative object estimate corresponding to the object 510c and the expected object locations (FIG. 27). Also in the illustrated example, the three-dimensional checker 266 identified low correspondence between the putative object estimate corresponding to the object 510a and the expected object locations (FIG. 34). The objects 510a, 510c, therefore, can be excluded from the world state 213. The object 510b, which corresponds to a putative object estimate that the two-dimensional checker 262 and the three-dimensional checker 266 passed can be added to the world state 213.

Figure 36:
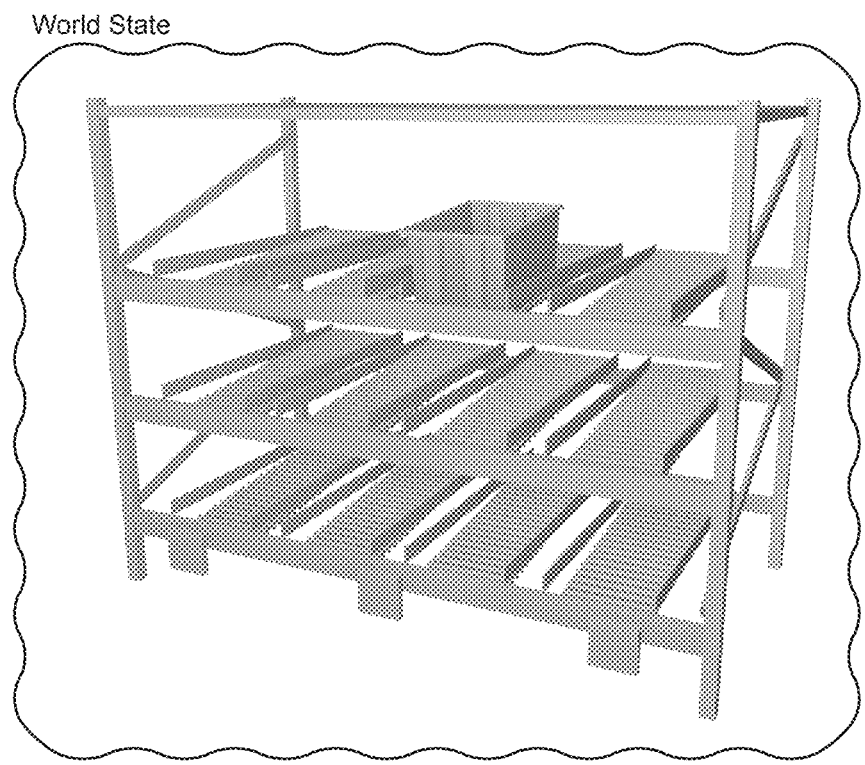
FIG. 36 is a representation of the support structure of FIG. 12 and one of the objects of FIG. 20 in the world state of the software architecture of FIG. 5.

FIG. 36 is a representation of the support structure 500 and the object 510b in the world state 213. The world state 213, therefore, does not correspond to reality (FIGS. 20 and 28) because it excludes the objects 510a, 510c. This discrepancy, however, can be useful because the objects 510a, 510c are not objects targeted for manipulation. The object 510a is not properly positioned for manipulation. The object 510c is not properly positioned for manipulation and is not a targeted type of object (i.e., it is a box rather than a tote). The software architecture 200 can update the world state 213 at every timestep or only at some timesteps. Furthermore, an update may depend on a condition, such as agreement between the results at two, three, four, etc. successive timesteps. In at least some cases, updating the world state 213 involves setting expected object locations to either valid or invalid. For example, in the world state 213 of FIG. 36, the expected object location corresponding to the object 510b can be set to valid whereas all other expected object locations can be set to invalid. To reduce demand for computing resources and/or for other reasons, the expected object locations can be maintained in the world state 213 as proxies for objects to be manipulated.

Figure 37:
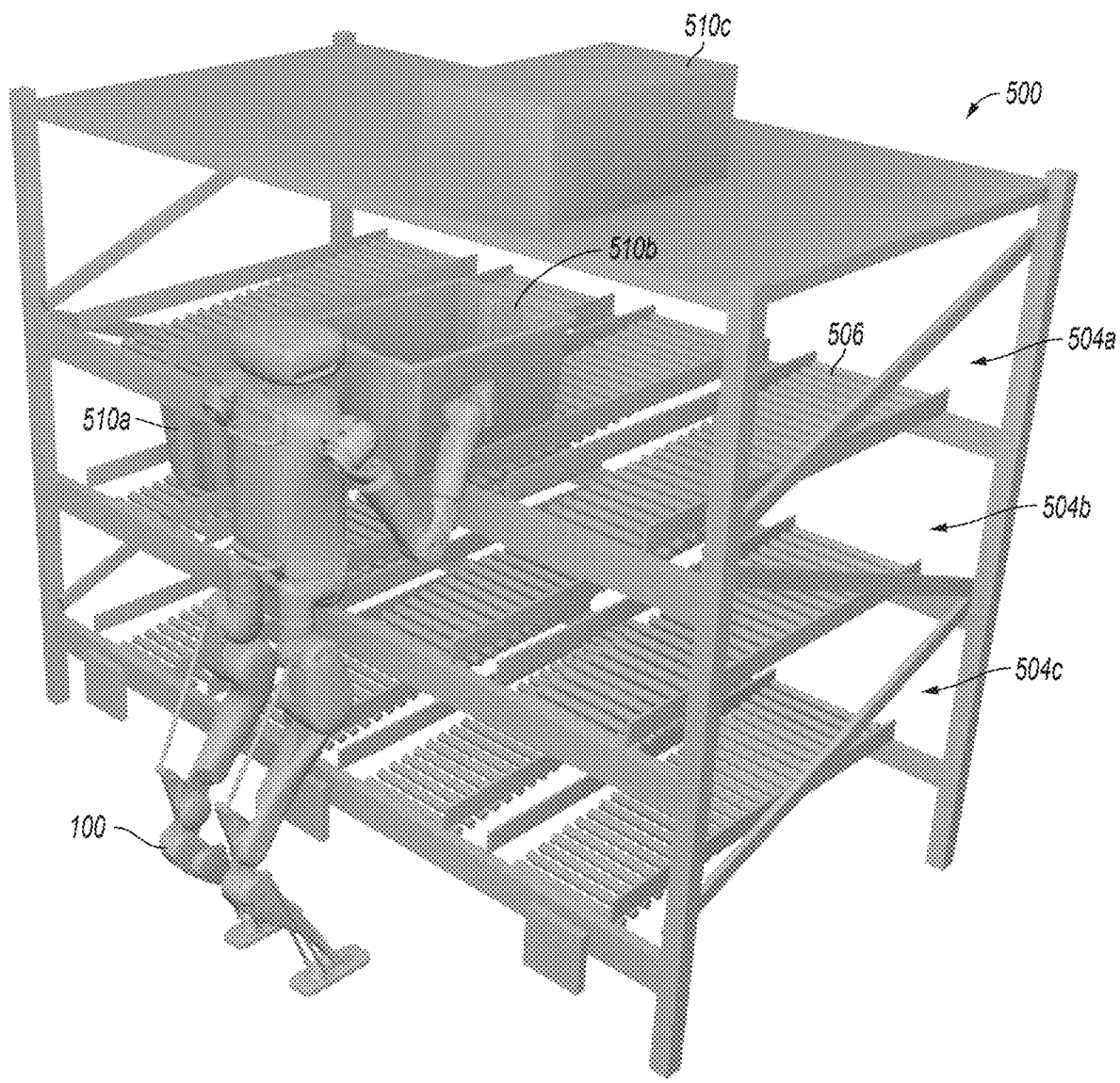
FIG. 37 is a perspective view of the robot of FIGS. 1-3 retrieving the object of FIG. 36 from the support structure of FIG. 12 in accordance with at least some embodiments of the present technology.

The method 400 can further include controlling the robot 100 (block 402g) based at least partially on a result of processing the putative object estimate, such as an updated version of the world state 213. When comparing a putative object estimate and an expected object location indicates that the putative object estimate is valid and productive, the method 400 can include controlling a pose of the robot 100 to retrieve an object at the expected object location. By way of illustration, FIG. 37 is a perspective view of the robot 100 retrieving the object 510b from the support structure 500 after object estimator 212 has determined that the putative object estimate corresponding to the object 510b is valid and productive. After retrieving an object from an expected object location, the method 400 can include removing a model or other information corresponding to the expected object location from the world state 213. For example, the expected object location corresponding to the object 510b can be set to invalid after the robot 100 retrieves the object 510b.

In at least some cases, comparing putative object estimates and expected object locations can be used in an autonomous or near-autonomous process for improving object detection accuracy. For example, when the robot 100 is initially deployed in a working environment, the machine learning model 260 may be poorly tuned to variables of the working environment (e.g., lighting particularities, extraneous object types, etc.). As the robot 100 operates in the new working environment, output from the three-dimensional checker 266 and/or other results from the object estimator 212 can be provided to a machine learning algorithm. This output can serve a function similar to that of human-annotated training examples. Especially when the machine learning algorithm receives results from multiple robots, the performance of the models it generates may improve quickly with little or no need for human involvement or the use of unreliable simulated training examples. As the autonomous or near-autonomous training progresses, the thresholds used to distinguish between valid and productive putative object estimates and invalid and/or unproductive object estimates can be tightened. Examples of these thresholds include the intersection-over-union threshold of the two-dimensional checker 262 and the offset thresholds 520 of the three-dimensional checker 266. Furthermore, expected object locations and related features of the present technology can be useful in the context of non-autonomous training and in the context of comparing the performance of multiple machine learning models in a new environment. Thus, expected object locations and related features of the present technology can be implemented with autonomous training (e.g., unsupervised learning), non-autonomous training (e.g., supervised learning), and model evaluation, among other examples. These and other examples of implementations are discussed below.

Although only a single type of object is shown in the figures, it should be understood that aspects of various embodiments of the present technology can be implemented for multiple types of objects simultaneously. Different types of objects can have the same or different expected locations in a working environment. For example, an embodiment of the method 400 can include generating a different putative object estimate for a different type of object and determining a different expected object location for the different type of object. The embodiment can further include determining a different correspondence between the different putative object estimate and the different expected object location and processing the different putative object estimate based at least partially on the different correspondence. Finally, the embodiment can include controlling the robot 100 based at least partially on a result of processing the different putative object estimate.

Expected object locations for different types of objects can be overlapping or non-overlapping. Furthermore, certain expected object locations in a working environment may be incompatible with containing non-corresponding object types. In an example, an expected object location for a tote may be at a storage bay of a rack in a working environment while an expected object location of a push bar of a door in the working environment is at a different location elevated and adjacent to a surface of the door. The door surface in this example is incompatible with carrying a tote. Accordingly, aspects of a working environment (e.g., a location of a rack, a location of a door, etc.) can be used to filter out nonsensical putative object estimates and thereby improve both object detection and object discrimination. Among other applications, this can be useful to facilitate differentiating between different types of objects to be retrieved. For example, expected object locations for small boxes may be at a shelf too small to carry totes. Filtering out putative object estimates of totes at the shelf as failing to correspond to expected object locations for the totes can facilitate detecting the small boxes. Inappropriate implementation of a robot process for retrieving a tote at the shelf can thereby be avoided.

Figure 38:
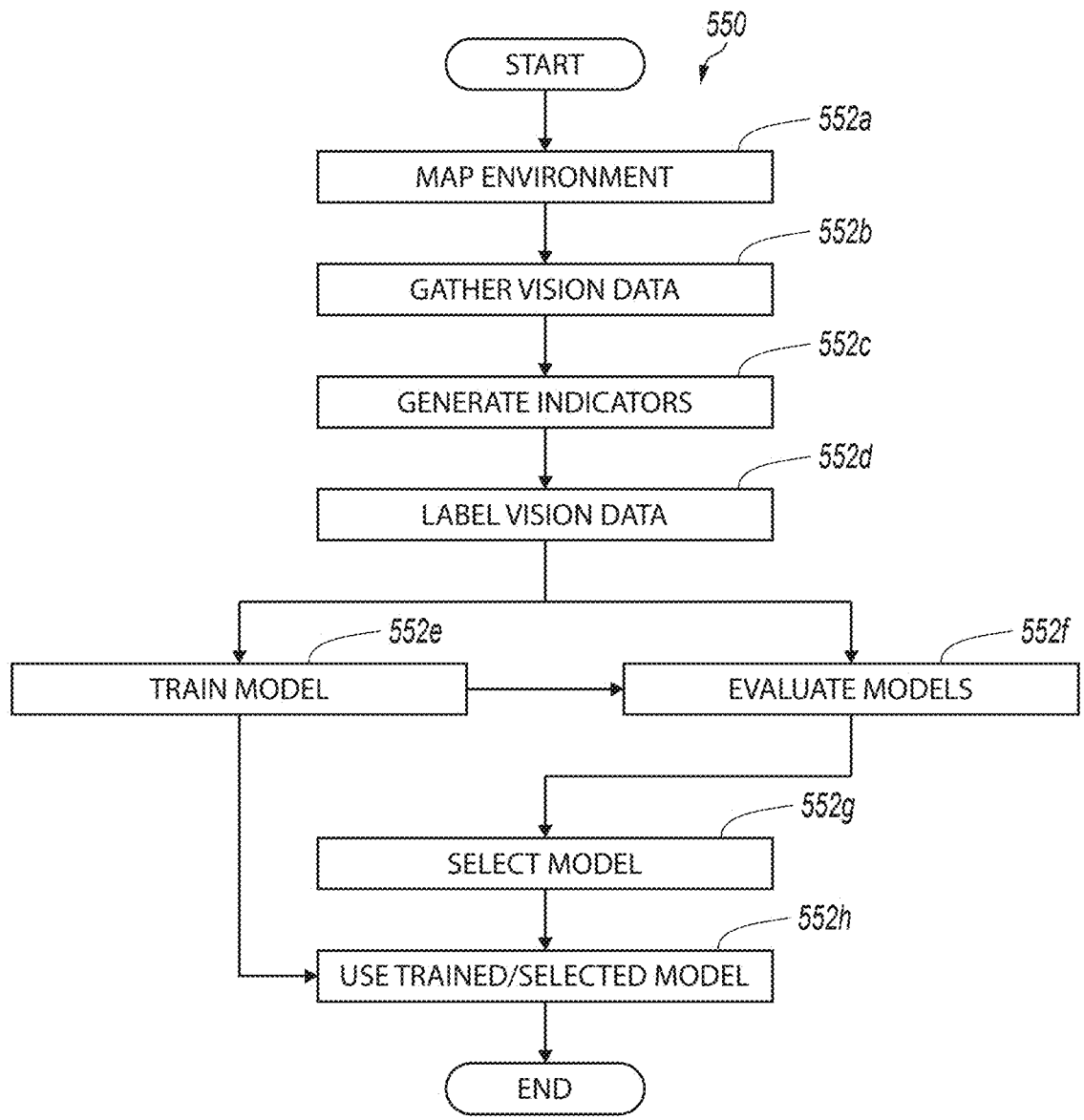
FIG. 38 is a block diagram corresponding to a method related to training machine learning algorithms and/or evaluating machine learning models in accordance with at least some embodiments of the present technology.
Figure 39:
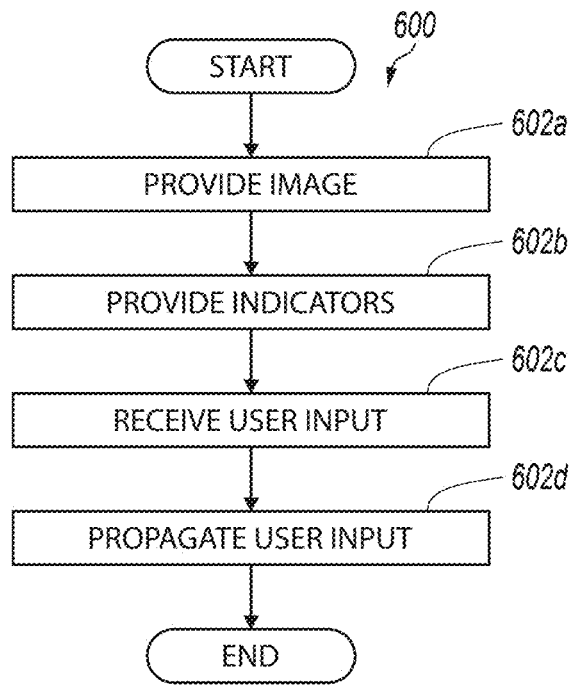
FIG. 39 is a block diagram corresponding to a method related to labeling vision data in accordance with at least some embodiments of the present technology.
Figure 40:
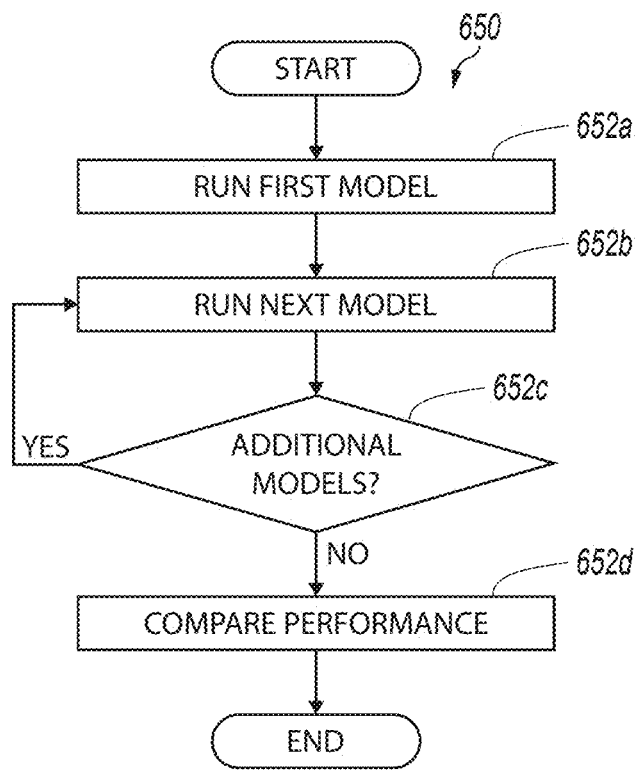
FIG. 40 is a block diagram corresponding to a method related to evaluating machine learning models in accordance with at least some embodiments of the present technology.

Examples of Training Machine Learning Algorithms and Evaluating Machine Learning Models FIG. 38 is a block diagram corresponding to a method 550 related to training machine learning algorithms and/or evaluating machine learning models for object detection in accordance with at least some embodiments of the present technology. The diagram includes blocks 552a-552h corresponding to different respective portions of the method 550. FIG. 39 is a block diagram corresponding to a method 600 related to labeling vision data in accordance with at least some embodiments of the present technology. The diagram includes blocks 602a-602d corresponding to different respective portions of the method 600. FIG. 40 is a block diagram corresponding to a method 650 related to evaluating machine learning models in accordance with at least some embodiments of the present technology. The diagram includes blocks 652a-652d corresponding to different respective portions of the method 650. FIGS. 38-40 are discussed together with reference to FIGS. 41-66, which illustrate various aspects of the methods 550, 600, 650 and other aspects of various embodiments of the present technology. As with the method 400 (FIG. 11), examples of the methods 550, 600, 650 are provided at least primarily in the context of the robot 100 (FIGS. 1-3), objects matching the object 300 (FIGS. 9 and 10), and the support structure 500 (FIG. 12).

Figure 41:
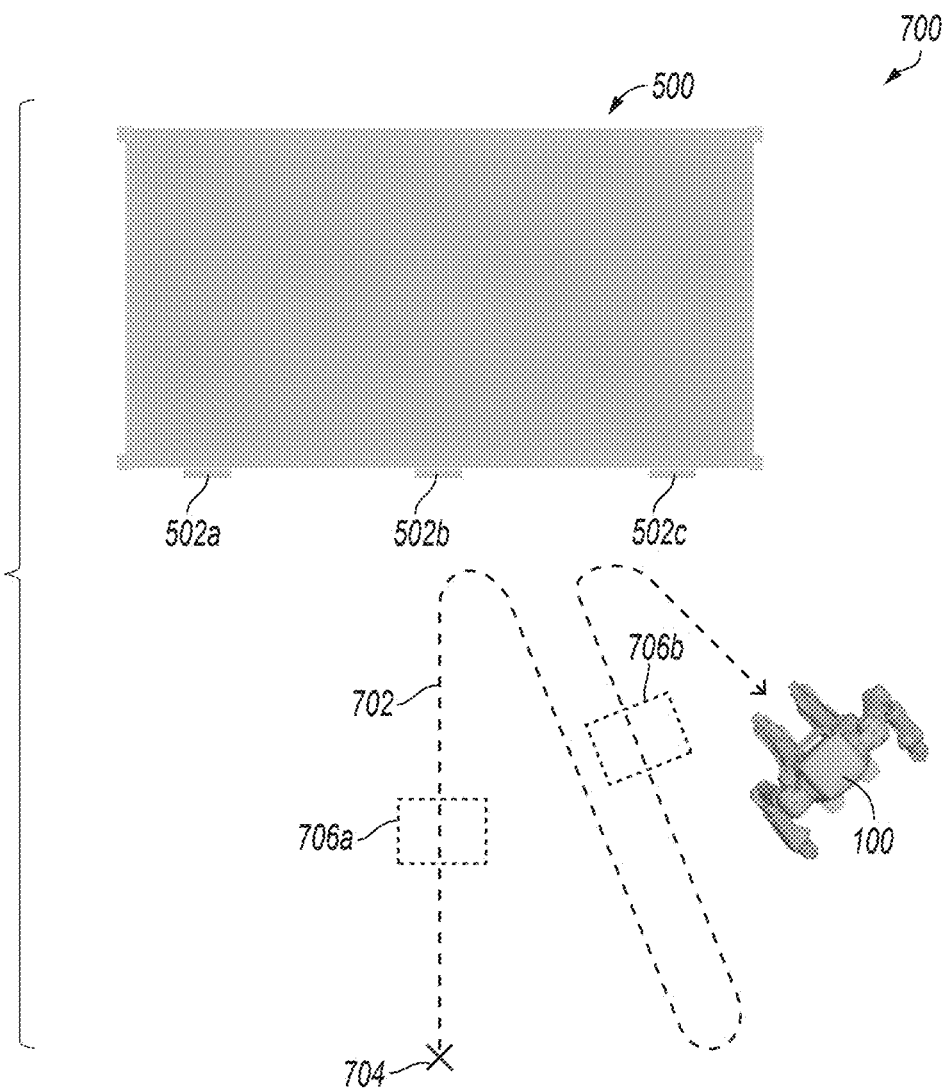
FIG. 41 is a top plan view of the robot of FIGS. 1-3, the support structure of FIG. 12, and a path of the robot while the robot collects vision data during an embodiment of the method of FIG. 38.

With reference first to FIGS. 38 and 41, the method 550 can include mapping an environment 700 (block 552a). This can include any suitable operation discussed above in connection with FIGS. 11-19 and corresponding portions of the method 400. In at least some cases, mapping the environment 700 includes determining a location of a landmark (e.g., any or all of the fiducials 502a-502c) and determining expected object locations based at least partially on the location of the landmark. The method 550 can further include gathering vision data (block 552b) in the environment 700. Mapping the environment 700 and gathering vision data can occur at different times or at the same time. Furthermore, mapping the environment 700 can be omitted, such as when a relationship between a landmark and expected object locations is already known. In at least some cases, gathering vision data occurs in one or more sessions during which the robot 100 moves within the environment 700. FIG. 41 illustrates a portion of a path 702 along which the robot 100 moves during a session. The path 702 can begin at a starting point 704. Along the path 702, the robot 100 can temporarily be in positions corresponding to boxes 706 (individually identified as boxes 706a and 706b). The boxes 706 correspond to arbitrary positions along the path 702 and are discussed below.

It should be understood that the robot 100 is merely an example of one type of device that can be used to collect vision data. Alternative devices for collecting vision data are also possible. For example, a human can carry a vision sensor around an environment to collect vision data. Such a vision sensor can be handheld, head-mounted (e.g., to match a field of view of the human), or carried by the human in another suitable manner. As another example, a mapping robot (e.g., a simple wheeled robot) can carry a vision sensor around an environment to collect vision data. In these and other cases, a remote operator can control movement of the mapping robot and/or an orientation of the vision sensor relative to the mapping robot to facilitate the collection of vision data. Moreover, a vision sensor carried by a human, by a mapping robot, etc. can have features (e.g., resolution, height, color properties, field of view, etc.) corresponding to features of a vision sensor of the robot 100 or of another robot that will be working in the environment being mapped. This can cause corresponding labeled vision data to be more relevant to training a machine learning algorithm and/or to evaluating machine learning models to be implemented for object detection in the environment.

The gathered vision data can include two-dimensional data (e.g., image data) gathered by the two-dimensional sensor 250. In addition or alternatively, the gathered vision data can include three-dimensional data (e.g., depth data) gathered by the three-dimensional sensor 252. The three-dimensional data can be in the form of a point cloud (e.g., generated from a depth map). Other types and forms of gathered vision data are also possible. The vision data can be gathered in timesteps at a suitable frequency, such as a frequency within a range from 2 Hertz to 20 Hertz, such as within a range from 3 Hertz to 10 Hertz. In at least some cases, the method 550 includes controlling the robot 100 during a session such that, for at least one timestep, the robot 100 gathers vision data for all expected object locations in the environment 700 simultaneously. Furthermore, this timestep can be at or near the beginning of a session. This can be useful, for example, to reduce the number of timesteps a human reviews while labeling the vision data. In these and other cases, the method 550 can include controlling the robot 100 to scan the environment 700 (e.g., turning the robot 100 in place while collecting vision data) at or near the beginning of a session.

For individual sessions, ground-truth information about objects of interest in the environment 700 can be static. For example, any objects at expected object locations (e.g., carried by the support structure 500) can be stationary and objects not at expected object locations can be excluded from the environment 700 during any given session. In at least some cases, the method 550 includes controlling the environment 700 to create diversity between sessions. For example, in one session, all of the bays 506 of the support structure 500 may be occupied with objects, in another session, all of the bays 506 may be unoccupied, and in another session, a selection of the bays 506 may be occupied with objects. Moreover, in multiple sessions in which selections of the bays 506 are occupied, the occupied bays 506 may be arranged in various patterns (e.g., alternating, single row, single column, alternating row, alternating column, etc.) or random. Increasing the diversity of object arrangements in different sessions can be useful to increase the diversity of vision data collected. More diverse vision data, in turn, can be more effective than less diverse vision data for training machine learning algorithms and evaluating machine learning models in a new environment. The path 702 can be the same or different between the sessions and likewise can have a predetermined pattern or be random for any given session.

Transitioning from one session to another can be user initiated (e.g., in response to a user command) or automatic. In the latter case, the method 550 can include receiving an indication of a change in the occupancy state of one or more expected object locations and ending a session at least partially in response to receiving this indication. In addition or alternatively, a session can end after a predetermined time (e.g., 3 minutes, 5 minutes, etc.) has elapsed even if no change in occupancy state is detected. Relatedly, collecting vision data need not occur only when the environment 700 is highly controlled. Changes in occupancy state can be identified via sensors of the robot 100 (e.g., via perception) or other sensors in the environment 700 (e.g., via pressure plates or other sensors of the support structure 500). In at least some cases, when a change in occupancy state is detected, vision data for a period immediately before the change is automatically removed or otherwise omitted from a log corresponding to a session ending with the detection. This can be useful, for example, to avoid including potentially misleading object-related information in the log. Furthermore, ground-truth information about objects of interest in the environment 700 can be updated in real time or near-real time within a session, such as in response to known interaction with the robot 100.

Figure 42:
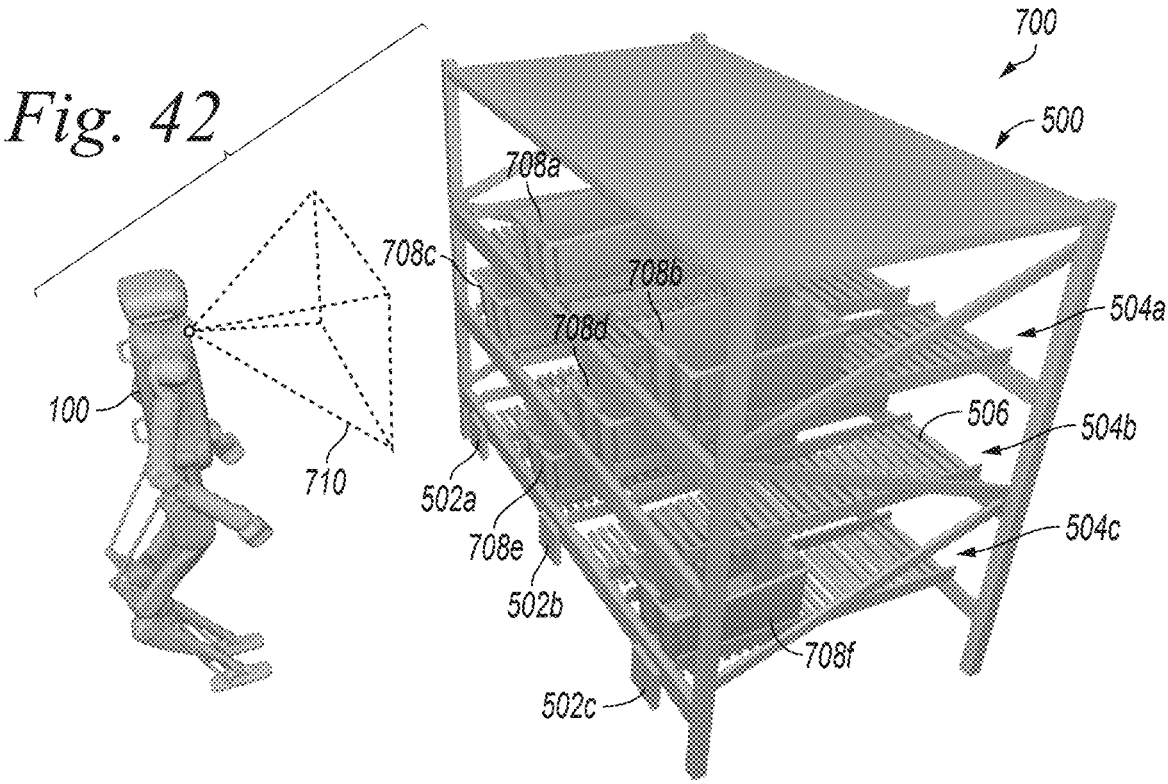
FIGS. 42 and 43 are perspective views of the robot of FIGS. 1-3, the support structure of FIG. 12, several objects carried by the support structure, and first and second fields of view of first and second cameras, respectively, of the robot at a time during an embodiment of the method of FIG. 38.
Figure 43:
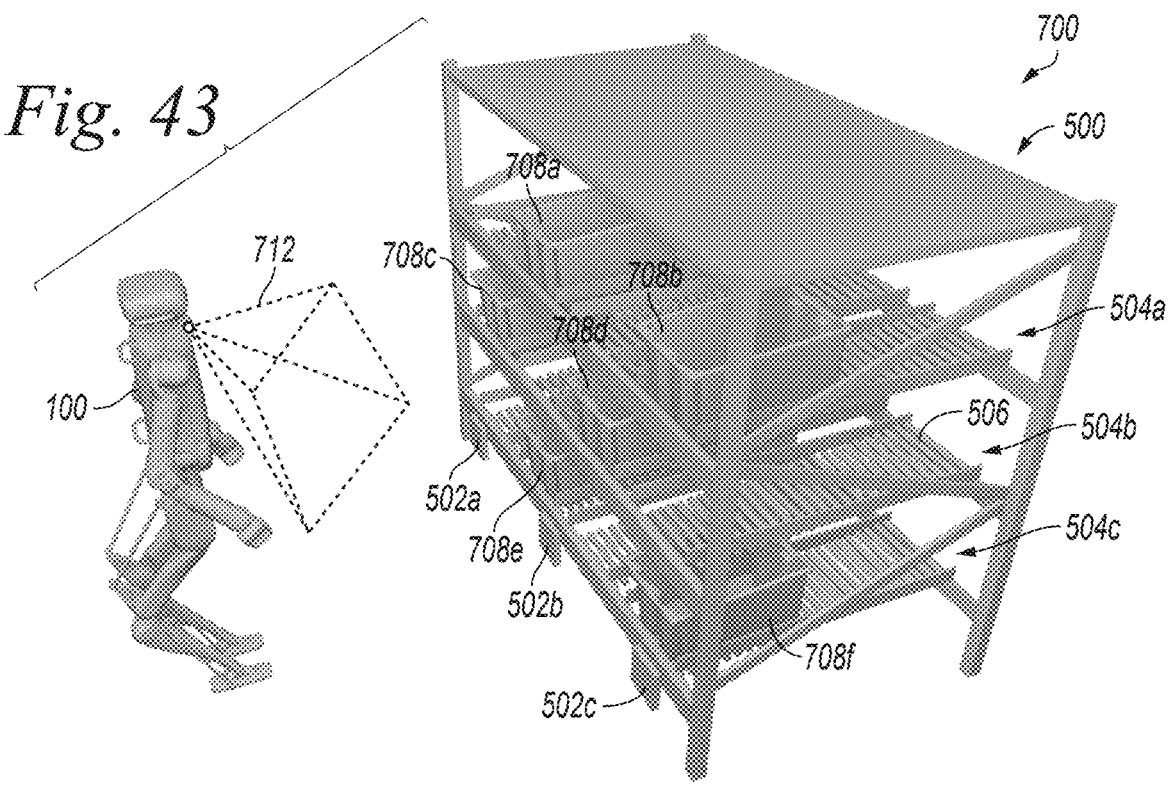
Figure 44:
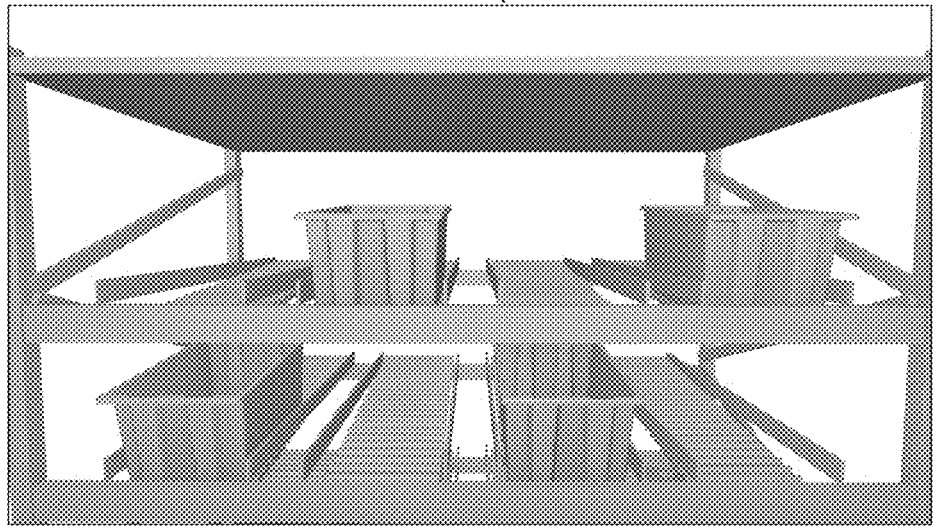
FIGS. 44 and 45 are representations of two-dimensional input to the robot of FIGS. 1-3 via the first and second fields of view of FIGS. 42 and 43, respectively, at the time corresponding to FIGS. 42 and 43.
Figure 45:
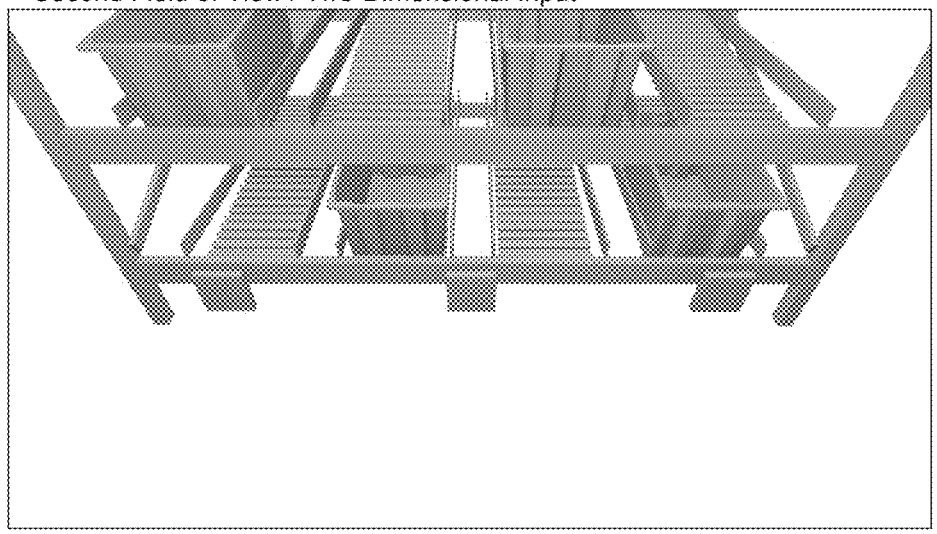

FIGS. 42 and 43 are perspective views of a portion of the environment 700 during vision data collection in the method 550 when the robot 100 is at a position corresponding to box 706a in FIG. 41. In the session corresponding to FIGS. 42 and 43, the occupancy status of the bays 506 of the support structure 500 alternates horizontally and vertically. In particular, the support structure 500 carries objects 708 (individually identified as objects 708a-708f) in a checkerboard pattern. FIG. 42 also shows a first field of view 710 of a camera at the elongate sensor bay 117b. Similarly, FIG. 43 also shows a second field of view 712 of a camera at the elongate sensor bay 117a. FIGS. 44 and 45 are representations of two-dimensional input to the robot 100 via the first and second fields of view 710, 712, respectively. As shown in FIGS. 44 and 45, vision data corresponding to the first and second fields of view 710, 712 can collectively form an image in which all bays 506 of the support structure 500 are visible.

Figure 46:
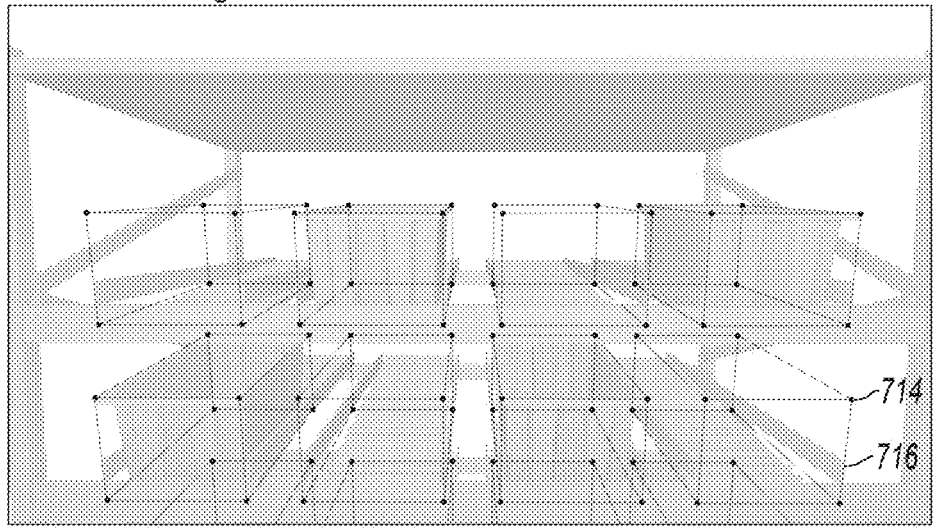
FIGS. 46 and 47 are representations of corners and edges corresponding to the expected object locations in the world state of the software architecture of FIG. 5 projected onto the two-dimensional input of FIGS. 44 and 45, respectively, during an embodiment of the method of FIG. 38.
Figure 47:
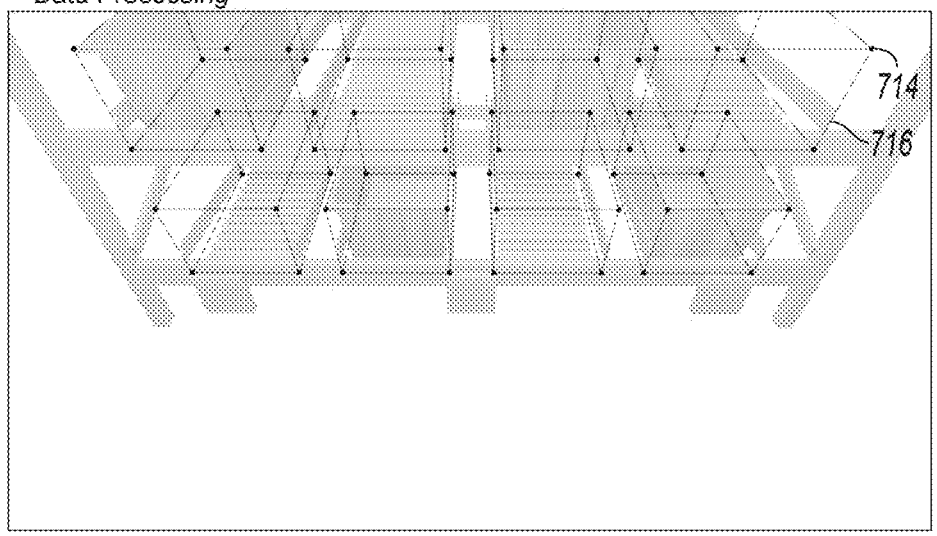

The method 550 can further include generating indicators for gathered vision data corresponding to the expected object locations shown therein (block 552c). This can occur by a process the same as or similar to the process described above for generating the corners 302 and the centroids 304 shown in FIGS. 18 and 19, respectively. FIGS. 46-49 illustrate another example of a relevant process. In particular, FIGS. 46 and 47 are representations of corners 714 (one labeled) and edges 716 (one labeled) corresponding to expected object locations in the world state 213 projected onto the two-dimensional input of FIGS. 44 and 45, respectively. As discussed above in the context of the method 400 and FIG. 24, this can include calculating a pose of the corresponding two-dimensional sensor 250 (e.g., a camera at the sensor bay 117b for the vision data of FIG. 46) at a time when the vision data was collected and determining an offset between this pose and a reference frame of the world state 213. Exact locations of the corners 714 and edges 716 in the reference frame of the world state 213 can be known. Accordingly, the corners 714 and edges 716 can be projected onto the vision data accurately based on the offset. The pose of the corresponding two-dimensional sensor 250 can be determined from a landmark. In some cases, the landmark is visible via the sensor collecting the vision data such that the pose of that sensor can be determined directly. In other cases, the landmark is visible via a different sensor such that the pose of the sensor collecting the vision data can be determined indirectly based on a pose of the sensor detecting the landmark and a known structural relationship between the two sensors. In still other cases, the pose of the sensor collecting the vision data can be determined by tracking movements of the robot 100 after calibrating to a landmark. This can be the case, for example, when a landmark is not within the field of view of any sensor of the robot 100.

Figure 48:
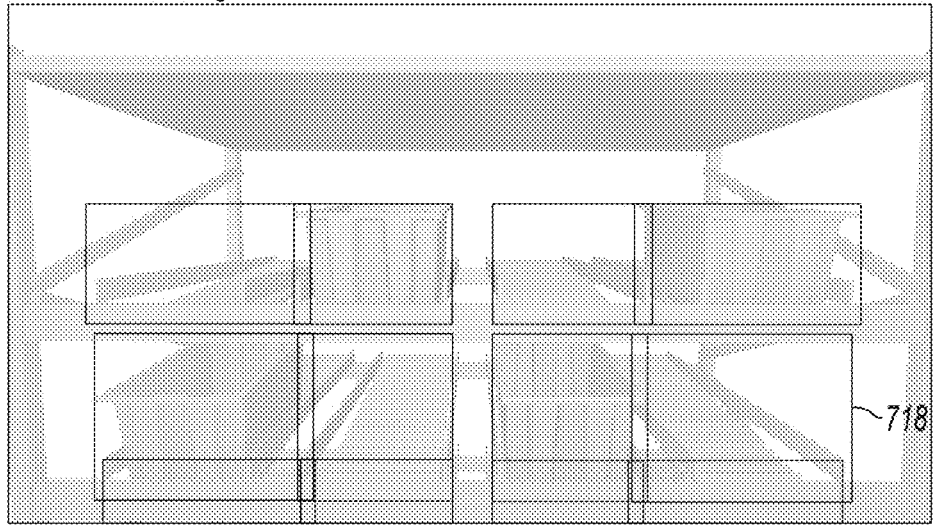
FIGS. 48 and 49 are representations of bounding shapes corresponding to the expected object locations of FIGS. 48 and 49, respectively, projected onto the two-dimensional input of FIGS. 44 and 45, respectively, during an embodiment of the method of FIG. 38.
Figure 49:
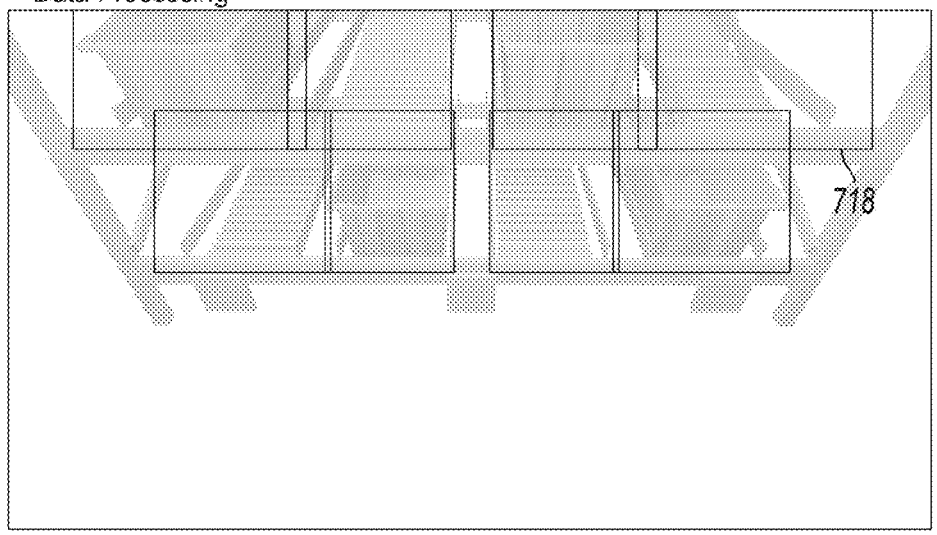

In at least some cases, the indicators are bounding shapes corresponding to the expected object locations or are derived from such bounding shapes. FIGS. 48 and 49 are representations of bounding shapes 718 (one labeled) projected onto the two-dimensional input of FIGS. 44 and 45, respectively. Generating a given one of the bounding shapes 718 can include, for corners 714 of a given expected object location, identifying the corners 714 at minimum and maximum values in a vertical dimension, generating horizontal lines at these corners 714, identifying corners 714 at minimum and maximum values in a horizontal dimension, and generating vertical lines at these corners 714 to form a box. Other approaches to generating indicators corresponding to the expected object locations are also possible. For example, instead of bounding shapes, the indicators can be centroids similar to the centroids 304 discussed above in the context of the method 400. Other possible indicators include expected object contours, edges, corners, surfaces, etc.

The method 550 can further include labeling vision data (block 552d). In at least some cases, this follows the process shown in FIG. 39 for the method 600. The method 600 can include providing an image (block 602a) and providing indicators (block 602b) operably associated with the image. The image and the indicators can be provided to a user via a graphical user interface, such as a graphical user interface of the system 285. The user can be a human tasked with labeling the vision data so that it reflects ground truth. The image can depict the environment 700 and can be unitary, composite, single-part, multi-part, or have another suitable form. The indicators, as discussed above, can correspond to expected object locations within the environment 700 and can have various suitable forms. For example, the indicators can be bounding shapes or quasi-bounding shapes (i.e., shapes that suggest, but do not define shape boundaries) at different respective portions of an image showing expected object locations.

The method 600 can further include receiving user input (block 602c) based at least partially on the image provided to the user. The user input can be received as point-and-click input, typed input, drag-and-drop input, semantic input, or another suitable form of input. In at least some cases, the method 600 includes receiving first user input for a first expected object location and receiving second user input for a second expected object location. The first and second user input can indicate user identified states of first and second expected object locations, respectively. The user identified state can be an occupancy state, a presence of an object, an absence of an object, an identity of an object, etc. The expected object locations can correspond to the bays 506 or to any other suitable portions of the environment 700. Receiving the user input can follow labeling by the user. The labeling can occur at least partially via interaction with the indicators. FIGS. 50-53 illustrate an example of such interaction. In particular, FIG. 50 is a representation of a user interface displaying the bounding shapes 718 projected onto the two-dimensional input of FIG. 44 after a user selects a first set of the bounding shapes 718.

In some cases, a user labels the vision data by selecting the indicators corresponding to expected object locations containing objects. The selection can be by clicking a cursor 750. For example, a user can position the cursor over a first bounding shape 718 to be selected, click the bounding shape 718, move the cursor in the direction of arrows 752 (one labeled) to additional bounding shape 718, and click the additional bounding shapes until all bounding shapes corresponding to expected object locations containing objects are selected. In at least some cases, the selected indicators graphically indicate their selection state. For example, the method 600 can include changing a given one of the indicators from a first appearance to a second appearance at least partially in response to receiving the user input. In a particular example, the first and second appearances are different levels of fill. As shown in FIG. 50, the selected bounding shapes 718 can be filled (e.g., with color, pattern, etc.) while the non-selected bounding shapes remain unfilled. Other indications of selection state are also possible, such as color change, highlighting, opacity change, movement, etc.

FIG. 51 shows a table 754 corresponding to the database 277 (FIG. 7) after the selections shown in FIG. 50. As shown in FIG. 51, the database 277 can include names for all expected object locations in the environment 700 (shown as "Bay 1," Bay 2", etc. numbered left-to-right and then top-to-bottom in the illustrated case) and indications of the occupancy status of the expected object locations (shown as "Vacant" or "Occupied" in the illustrated case). Before labeling begins, the indications of occupancy status can be in a default state. In the illustrated example, the default state indicates an absence of an object at an expected object location. In the other cases, the default state can indicate a presence of an object at an expected object location. In still other cases, the default state can indicate neither a presence nor an absence of an object at an expected object location. Such a default state, for example, can be labeled "Unassigned." In these and other cases, a user may be required to select a status for all expected object locations before progressing through vision data or otherwise completing the labeling of a log. Labeling by a user can change information in the database 277. For example, FIG. 51 shows Bays 2, 4, 5 and 7 as "Occupied" reflecting the selections of FIG. 50.

The image provided to a user during the labeling process can correspond to vision data collected by a vision sensor of the robot 100 at a given timestep of a plurality of timesteps within a session. As discussed above, respective occupancy states of the expected object locations can be unchanged during the session. The vision data can be included in a log corresponding to the session. In at least some cases, a user can switch between more than one view for the same timestep. In these and other cases, such switching may be necessary for the user to see all expected object locations to be labeled for the timestep. For example, it may be the case that no view individually includes all of the expected object locations in the environment 700, but that the views collectively include most or all of the expected object locations. Furthermore, it may be the case that neither of two views individually includes all of the expected object locations in the environment 700, but that the two views collectively include more expected object locations than either of the views individually. As an example, FIG. 52 is a representation of the user interface displaying the bounding shapes 718 projected onto the two-dimensional input of FIG. 45 after the selections of FIG. 50 and before any additional selections. In this case, FIG. 50 represents a first view corresponding to vision data collected by a vision sensor system of the robot 100 via a first optical receiver and FIG. 52 represents a second view corresponding to vision data collected by the vision sensor system via a second optical receiver at the same timestep. The first and second optical receivers in this case have different respective fields of view as illustrated by the first and second fields of view 710, 712 in FIGS. 42 and 43, respectively.

The method 600 can include providing the second view to the user after providing the first view to the user. Alternatively, the method 600 can include providing the first and second views to the user in the opposite order or simultaneously. Furthermore, the method 600 can include providing the second view to the user after receiving user input (e.g., in the form of selections of occupied expected object locations). Alternatively, the method 600 can include providing a subsequent view before receiving user input. When a subsequent view is provided after receiving user input, the received user input can be propagated to the subsequent view. Accordingly, the method 600 can include propagating the user input (block 602*d*). For example, the method 600 can include referencing the database 277 in connection with generating the view shown in FIG. 52. The bounding shapes 718 corresponding to the expected object locations previously selected via the view shown in FIG. 50 are shown selected in FIG. 52 before receiving any additional user input. FIG. 53 is a representation of the user interface after the user selects additional bounding shapes 718 that were not shown (or at least not shown clearly) in the view of FIG. 50. As with the selections in the view of FIG. 50, the selections in the view of FIG. 53 can cause the database 277 to change. As shown in FIG. 54, the database 277 after the selections of both FIGS. 50 and 53 can show Bays 2, 4, 5, 7, 10 and 12 as "Occupied."

Propagating user input can occur between views at the same timestep and/or between images corresponding to different timesteps within a session. FIGS. 55-59 illustrate an example of the latter. FIG. 55 is a perspective view of the robot 100, the support structure 500, the objects 708, and the first field of view 710 when the robot 100 is at a position corresponding to box 706*b* in FIG. 41. When the robot 100 is in this position, the vision sensor through which vision data is collected can have a different position within the environment 700 than when the robot 100 is in the position corresponding to box 706*a* in FIG. 41. Thus, the method 550 can include collecting vision data when the vision sensor has different positions in the environment 700. In addition or alternatively, the method 550 can include collecting vision data when the vision sensor has different orientations. The method 550 can further include associating additional vision data (e.g., collected by the vision sensor at additional timesteps of a plurality of timesteps within a session) with a user identified state of an expected object location at least partially in response to receiving user input. This association can include controlling the database 277, generating a dataset corresponding to the database 277, controlling the appearance of indicators shown in additional views at the same timestep, controlling the appearance of indicators shown in additional images at different timesteps, and/or other types of association. Furthermore, propagating user input can occur based on time, such as when the status of an expected object location changes during a session. In such cases, a labeled status of the expected object location can be propagated forward and not backward in time. Corresponding, the database 277 can associate user identified states with respective time information (e.g., timestamps).

Figure 56:
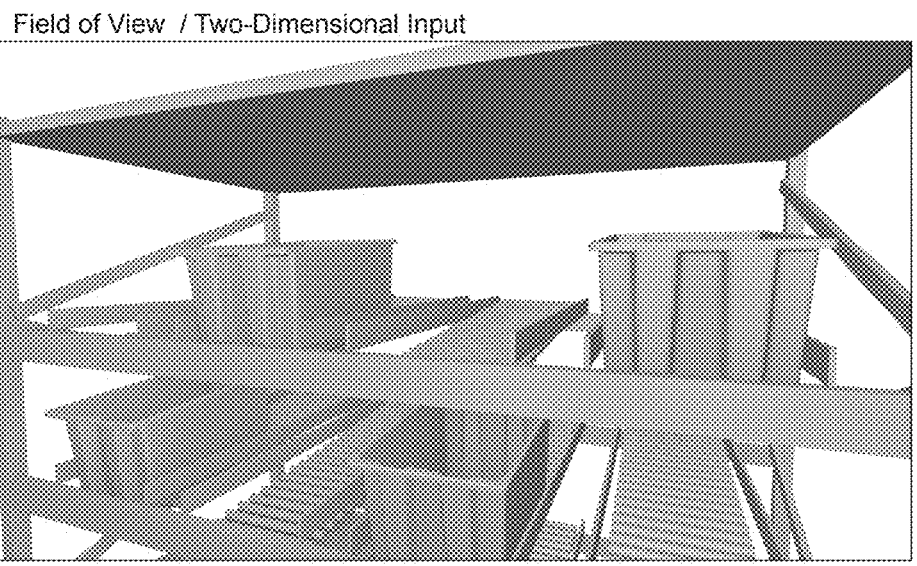
FIG. 56 is a representation of two-dimensional input to the robot of FIGS. 1-3 via the first field of view of FIG. 55 at the time corresponding to FIG. 55.
Figure 57:
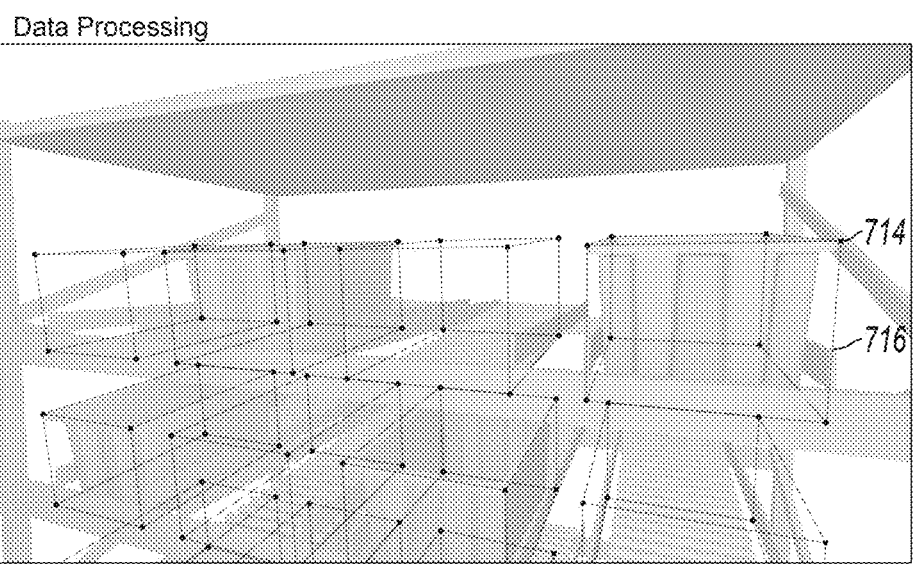
FIG. 57 is a representation of corners and edges corresponding to the expected object locations in the world state of the software architecture of FIG. 5 projected onto the two-dimensional input of FIG. 56 during an embodiment of the method of FIG. 38.
Figure 58:
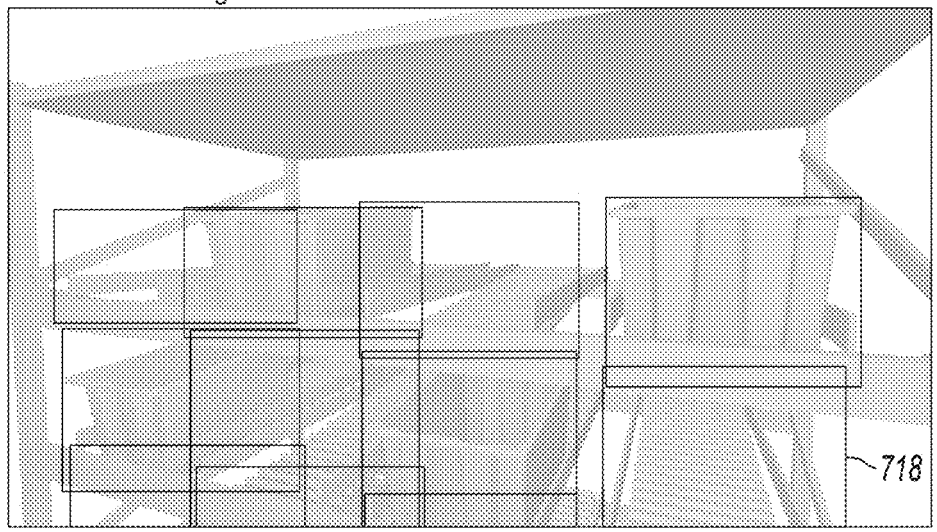
FIG. 58 is a representation of bounding shapes corresponding to the expected object locations of FIG. 57 projected onto the two-dimensional input of FIG. 56 during an embodiment of the method of FIG. 38.
Figure 59:
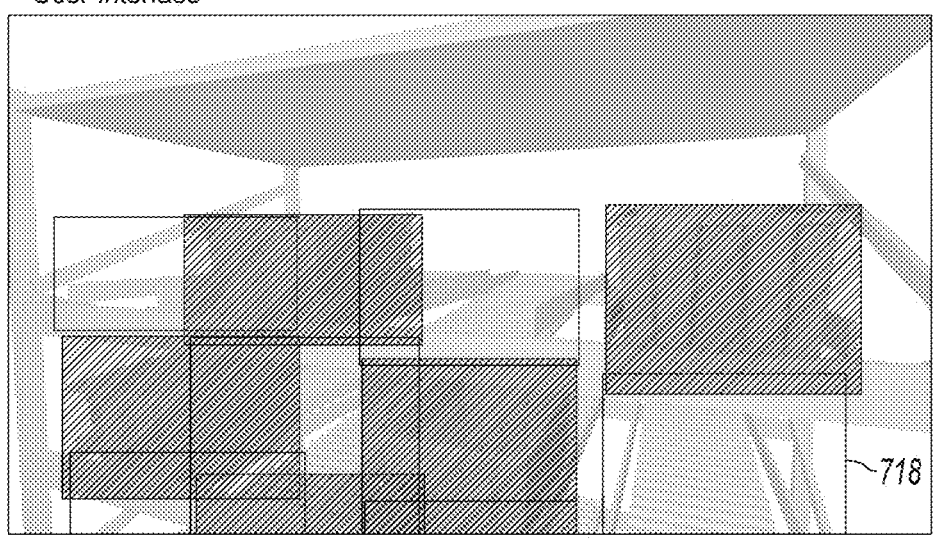
FIG. 59 is a representation of the user interface of FIG. 50 displaying the bounding shapes of FIG. 58 projected onto the two-dimensional input of FIG. 56 after propagation of the user selections of FIGS. 50 and 53 during an embodiment of the method of FIG. 38.

FIG. 56 is a representation of two-dimensional input to the robot 100 via the first field of view 710 at the time corresponding to FIG. 55. FIG. 57 is a representation of corners 714 and edges 716 corresponding to expected object locations in the world state 213 projected onto the two-dimensional input of FIG. 56. FIG. 58 is a representation of the bounding shapes 718 of FIG. 57 projected onto the two-dimensional input of FIG. 56. Finally, FIG. 59 is a representation of the user interface displaying the bounding shapes 718 of FIG. 58 projected onto the two-dimensional input of FIG. 56 after propagation of the selections of FIGS. 50 and 53. As with generating the view of FIG. 52, the method 600 can include referencing the database 277 in connection with generating the view shown in FIG. 59. The bounding shapes 718 corresponding to the expected object locations previously selected via the views shown in FIGS. 50 and 53, therefore, are shown selected in the view of FIG. 59 before receiving any additional user input. In at least some cases, a user may switch between images at several different timesteps of a session and/or between views at the same timesteps and assess propagation of previously provided user input until the user is satisfied that the database 277 reflects ground truth. When this is the case, vision data for the entire session and log may be adequately verified for correlation to ground truth in only a small fraction of the time that would otherwise be required for the user to individually label objects in every image of every timestep of the session and log.

Figure 60:
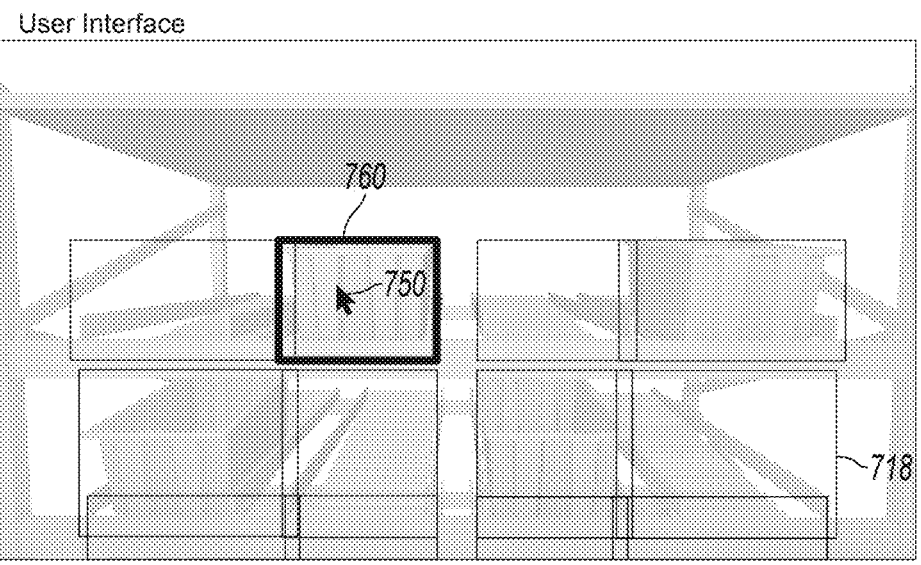
FIG. 60 is a representation of a user interface, bounding shapes, and two-dimensional input similar to those of FIG. 50 along with a transient effect during an embodiment of the method of FIG. 38.
Figure 61:
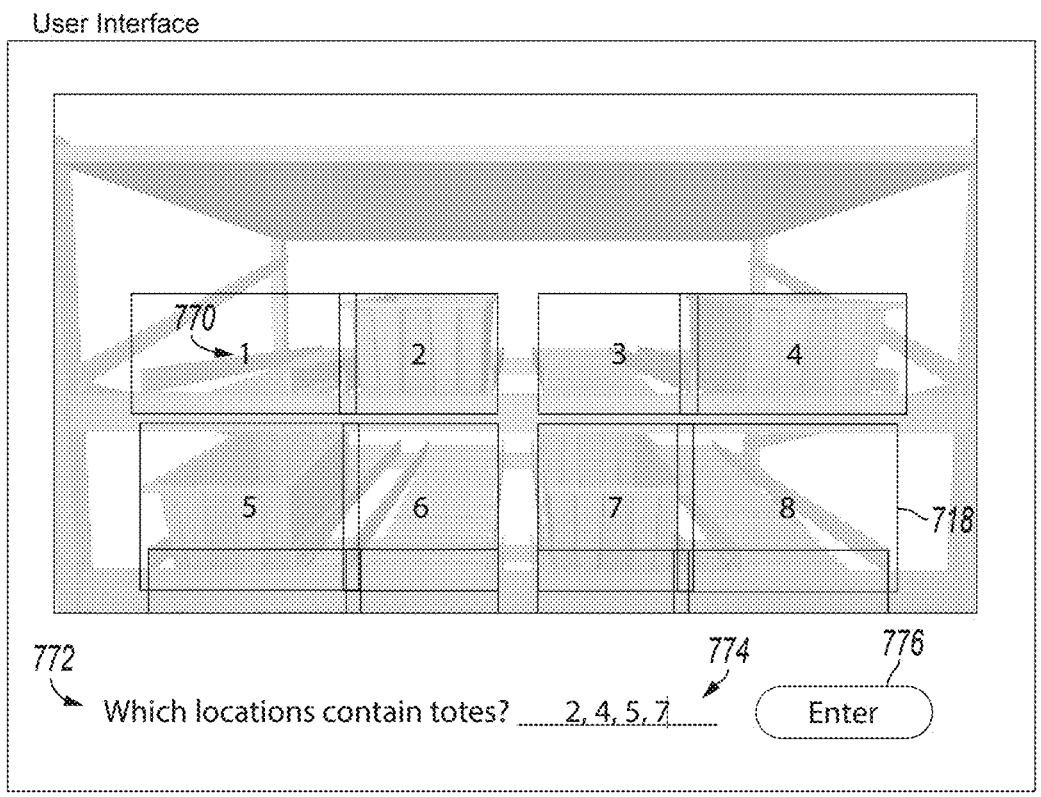
FIG. 61 is a representation of a user interface, bounding shapes, and two-dimensional input similar to those of FIG. 50 along with bounding shape numbering and features related to textual submission of labeling information during an embodiment of the method of FIG. 38.

The user interface shown in FIGS. 50-53 and 59 is merely one example. Numerous other user interfaces and modifications to the illustrated user interface are possible. FIGS. 60-66 illustrate several such examples. In particular, FIG. 60 is a representation of a user interface, bounding shapes 718, and two-dimensional input similar to those of FIG. 50 along with a transient effect 760. The method 600 can include providing the transient effect 760 to a user via the graphical user interface. The transient effect 760 can temporarily highlight a portion of an image corresponding to an expected object location while the cursor 750 is over that portion of the image. In at least some cases, the transient effect 760 is a mouseover effect and/or a tooltip. The transient effect 760 can be provided before receiving the user input and can be useful to aid the user in differentiating between the indicators, such as in differentiating between overlapping bounding shapes 718. As shown in FIG. 61, the user input is not limited to point-and-click input. FIG. 61 is a representation of a user interface, bounding shapes 718, and two-dimensional input similar to those of FIG. 50 along with bounding shape numbers 770 (one labeled) and features related to textual submission of labeling information. In particular, FIG. 61 shows a prompt 772, a text field 774 for entering text in response to the prompt 772, and a button 776 for submitting the entered text.

Figures 62, 63:
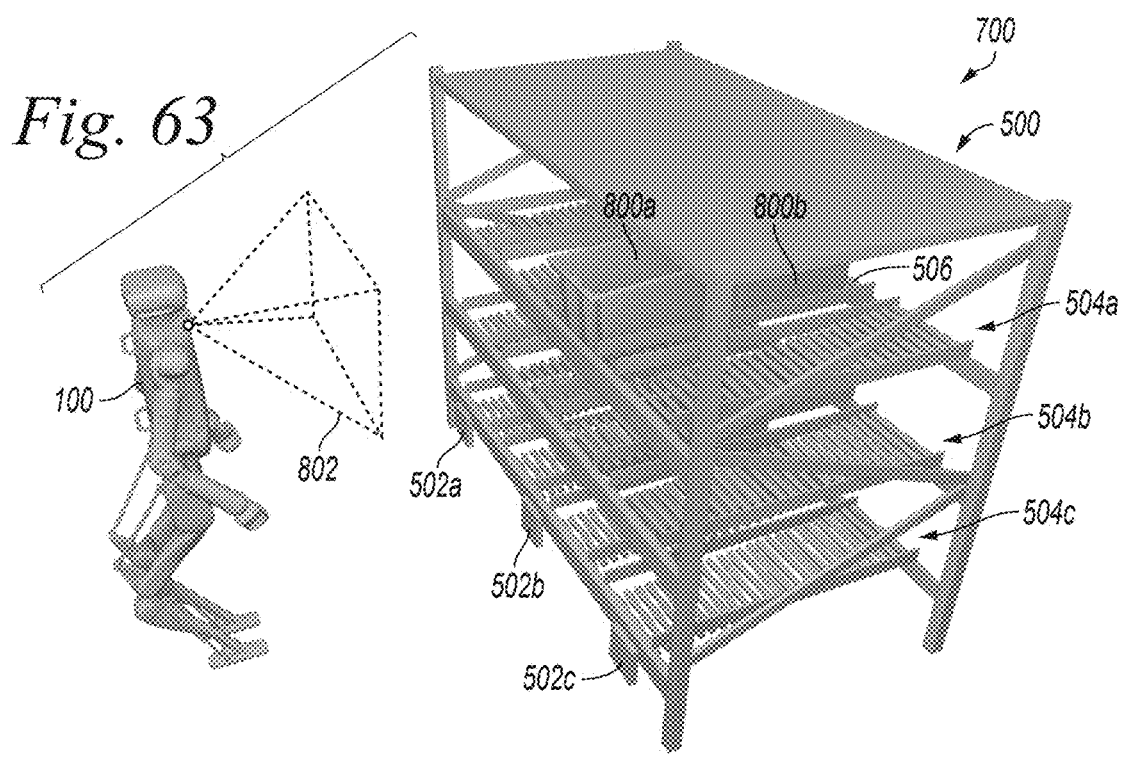
FIG. 62 is a representation of a user interface, bounding shapes, and two-dimensional input similar to those of FIG. 50, but with portions of the two-dimensional input corresponding to the bounding shapes spaced apart from one another and presented with features related to checkbox submission of labeling information during an embodiment of the method of FIG. 38.
FIG. 63 is a perspective view of the robot of FIGS. 1-3, the support structure of FIG. 12, several objects carried by the support structure, and a field of view of a camera of the robot at a time during an embodiment of the method of FIG. 38.

As shown in FIG. 62, the indicators can separate the vision data rather than overlie it. FIG. 62 is a representation of a user interface, bounding shapes 718, and two-dimensional input similar to those of FIG. 50, but with portions of the two-dimensional input corresponding to the bounding shapes 718 spaced apart from one another and presented with features related to checkbox submission of labeling information. In particular, FIG. 62 shows portions of the two-dimensional input corresponding to the bounding shapes 718 presented within frames 780 (one labeled) in connection with checkboxes 782 (one labeled). The frames 780 can at least partially isolate respective portions of the image from other portions of the image. These portions can then be provided to a user simultaneously or non-simultaneously. Furthermore, image portions can be associated with one another to facilitate labeling. For example, multiple image portions corresponding to a given expected object location at different timesteps can be presented to a user together or sequenced to acclimate the user to particularities of that expected object location. Alternatively, image portions can be presented in another suitable manner or even randomly. These and other alternative approaches to gathering user input for labeling vision data can operate similarly to the approach shown in FIGS. 50-53 and 59. Among other things, these approaches can include propagating user input to vision data within and among timesteps and can result in dynamic updating of the database 277.

With reference again to FIG. 38, the method 550 can further include training a machine learning algorithm (block 552e) and/or evaluating machine learning models (block 552f). Training a machine learning algorithm can include providing labeled vision data to a machine learning algorithm in a suitable form and receiving a machine learning model that is at least partially based on the labeled vision data. Evaluating machine learning models can follow the process shown in FIG. 40 for the method 650. The method 650 can include running a first model on vision data in a log (block 652a), running a second model on the same vision data (block 652b), and running any additional models on the same vision data in response to determining that additional models are available (block 652c). The method 650 can further include comparing the performance of the evaluated models (block 652d). In at least some cases, the evaluated models include a model trained on vision data labeled in accordance with an embodiment of the present technology. In these and other cases, comparing the performance of the models can include determining expected object locations corresponding to putative object estimates generated by the models by a process the same as or similar to the process described above for the method 400 with reference to FIGS. 20-35. For example, determining this correspondence can include comparing the putative object estimates and the expected object locations in a two-dimensional plane and then in a three-dimensional space. Comparing the performance can further include determining correspondences between the putative object estimates at the user identified states of the corresponding expected object locations. The method 600 can further include generating one or more performance measurements for the models at least partially based on this correspondence.

The method 550 can further include selecting a model (block 552g). In at least some cases, the selection is based at least partially on a difference in the correspondences between the models and the labeled vision data. For example, a first model may generate a putative object estimate that matches a user identified state of a corresponding expected object location and a second model may generate a putative object estimate that does not match a user identified state of a corresponding expected object location. The first model may be favored for selection over the second model. Furthermore, as discussed above in connection with FIG. 7, the correspondence can distinguish between different types of errors, such as false positive errors, false negative errors, and classification errors. Moreover, these types of errors can be further categorized by the corresponding type of object when more than one type of object is targeted for detection. Selecting a model can include accounting for such differences. For example, when a robot 100 is likely to be damaged by attempting to interact with an object that is not present, a model with a low false positive rate for that object may be favored. As another example, when the presence of an object in an environment is dangerous, a model with a low false negative rate for that object may be favored. Once a suitable model has been selected, the method 550 can include using that model to control the robot 100 (block 402g) and/or another robot (e.g., a fleet of robots) in the environment 700 and/or in another environment with at least some similarity to the environment 700.

Figure 64:
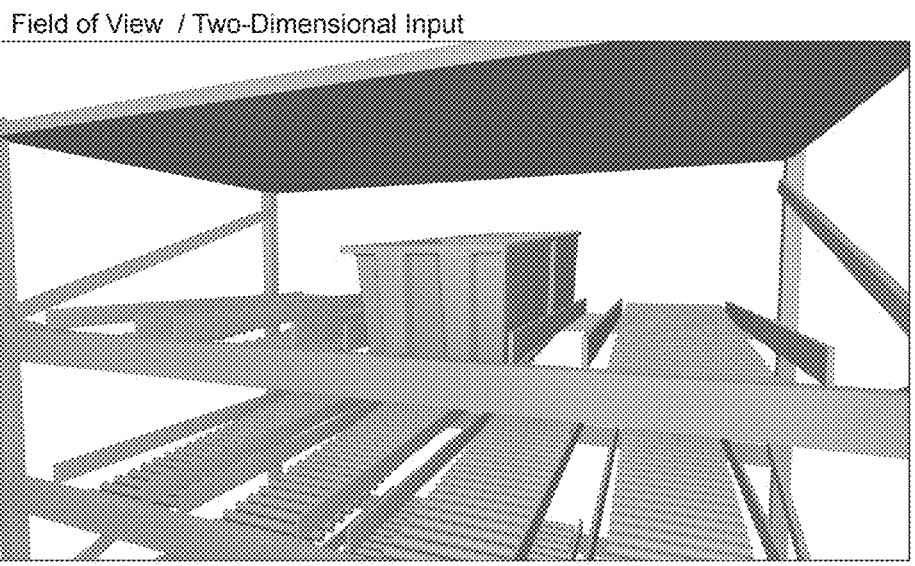
FIG. 64 is a representation of two-dimensional input to the robot of FIGS. 1-3 via the field of view and the camera of FIG. 63 at a time during an embodiment of the method of FIG. 38.
Figure 65:
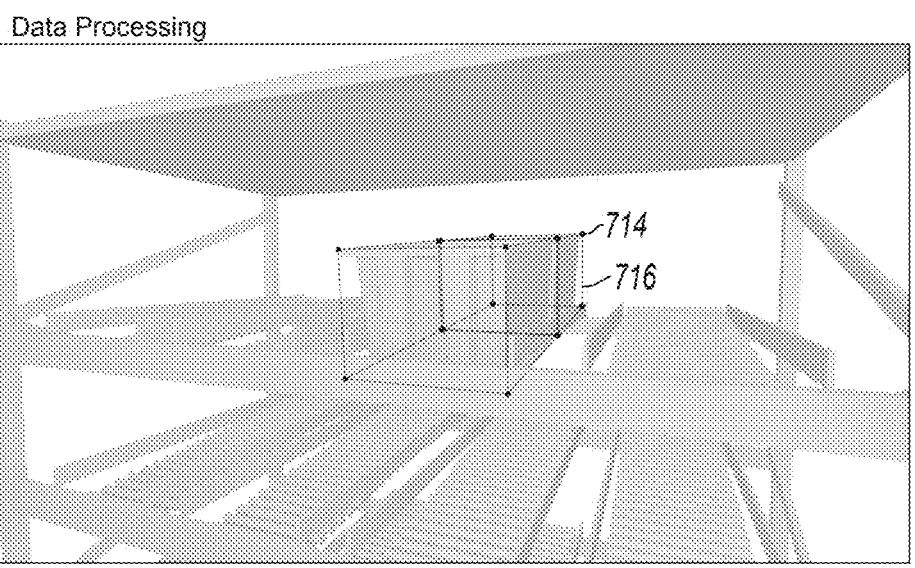
FIG. 65 is a representation of corners and edges corresponding to two expected object locations in the world state of the software architecture of FIG. 5 projected onto the two-dimensional input of FIG. 64 during an embodiment of the method of FIG. 38.
Figure 66:
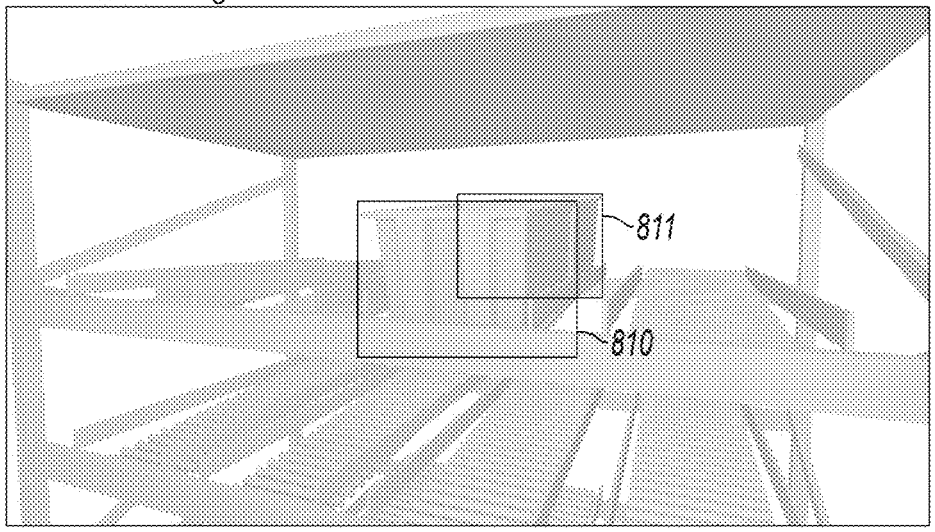
FIG. 66 is a representation of two bounding shapes corresponding to the expected object locations of FIG. 65 projected onto the two-dimensional input of FIG. 64 during an embodiment of the method of FIG. 38.
Figure 67:
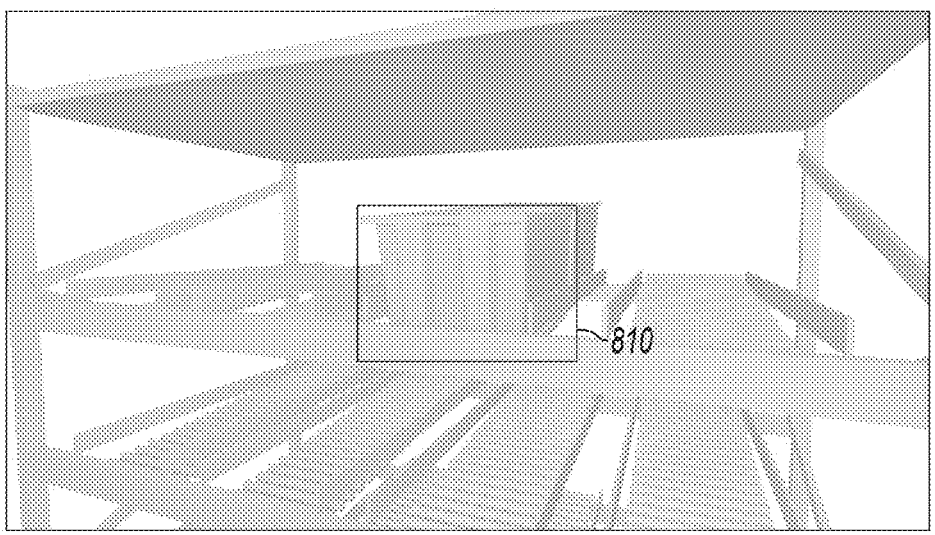
FIG. 67 is a representation of the user interface of FIG. 50 displaying one of the two bounding shapes of FIG. 66 projected onto the two-dimensional input of FIG. 64 during an embodiment of the method of FIG. 38.

FIG. 63 is a perspective view of the robot 100, the support structure 500, two objects 800 (individually identified as objects 800a and 800b) at the same bay 506, and a field of view 802 the same as or similar to the first field of view 710 discussed above in the context of FIG. 42. FIG. 64 is a representation of two-dimensional input to the robot 100 via the field of view 802. In this case, as in many others, one object may tend to obscure another. This issue may be more or less pronounced depending on the angle of the field of view as well as how crowded the environment is with expected object locations. In at least some cases, the playback tool 275 filters or otherwise modifies indicators displayed to the user 276 to at least partially mitigate the potentially confusing presentation of overlapping expected object locations. FIGS. 65-69 illustrate examples of this mitigation. In particular, FIG. 65 is a representation of corners 714 and edges 716 corresponding to expected object locations for the objects 800a, 800b. Similarly, FIG. 66 is a representation of bounding shapes 810, 811 for the objects 800a, 800b, respectively. FIG. 67 is a representation of the user interface displaying only the bounding shape 810 corresponding to the object 800a. The bounding shape 811 corresponding to the object 800b, in contrast, is omitted.

As mentioned above, excessive overlapping of expected object locations in the same view can be confusing to the user 276. For example, if the bounding shapes 810, 811 are displayed together (as shown in FIG. 66), the user 276 may not realize that the expected object location corresponding to the object 800b is mostly obscured. To address this problem and/or for other reasons, methods in accordance with at least some embodiments of the present technology include using three-dimensional information to filter out, deemphasize (e.g., lighten, dash, etc.), or otherwise modify the presentation of an indicator and/or vision data corresponding to a background expected object location when the background expected object location is heavily obscured by a foreground expected object location. The approach to this can be similar to the approach discussed above for comparing a putative object estimate and an expected object location in three-dimensional space to determine if the putative object estimate is valid. The approach to triggering a filtering out or modification of an indicator corresponding to a background expected object location can be at least partially based on a degree to which the indicator is obscured by an indicator corresponding to a foreground expected object location.

In the illustrated example, the system 270 can first determine that the bounding boxes 810, 811 corresponding to the objects 800a, 800b overlap more than a threshold level. The threshold, for example, can be an area over union, a simple percentage of obstruction, or another suitable metric. Once triggered, the system 270 can compare the expected object locations corresponding to the objects 800a, 800b in a three-dimensional space to determine which is in the foreground and which is in the background. For example, the system 270 can compare centroids or other suitable three-dimensional attributes of the expected object locations in a manner similar to that discussed above in the context of FIG. 33 for comparing a centroid of a putative object estimate with a centroid of an expected object location. In the case of comparing a centroid of an expected object location with a centroid of another expected object location, however, both centroids can be derived from one or more known object models. Based on this comparison, the system 270 can determine that the bounding box 811 corresponding to the object 800b is both excessively obscured and in the background. Accordingly, as shown in FIG. 67, the system 270 can omit the bounding box 811 from the user interface.

Figure 68:
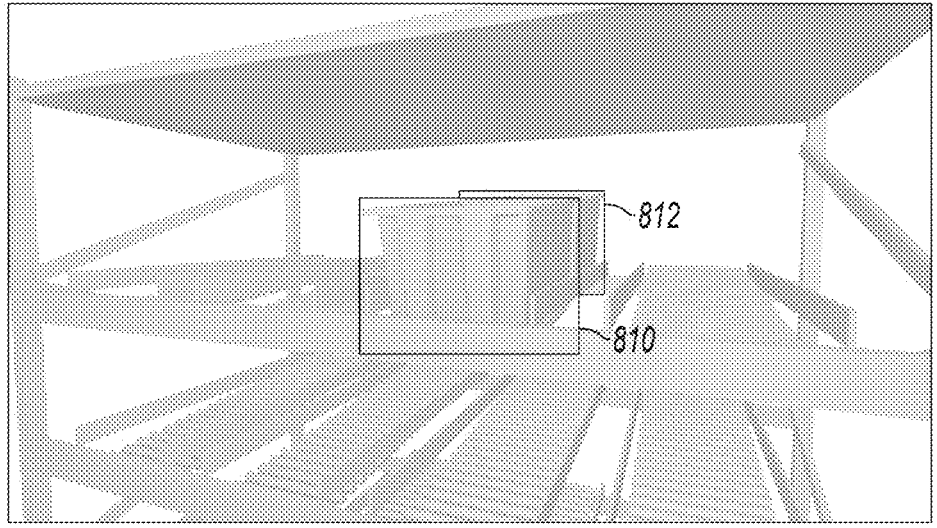
FIG. 68 is a representation of the user interface of FIG. 50 displaying a first of the two bounding shapes of FIG. 66 and a modified form of the second of the two bounding shapes of FIG. 66 projected onto the two-dimensional input of FIG. 64 during an embodiment of the method of FIG. 38.
Figure 69:
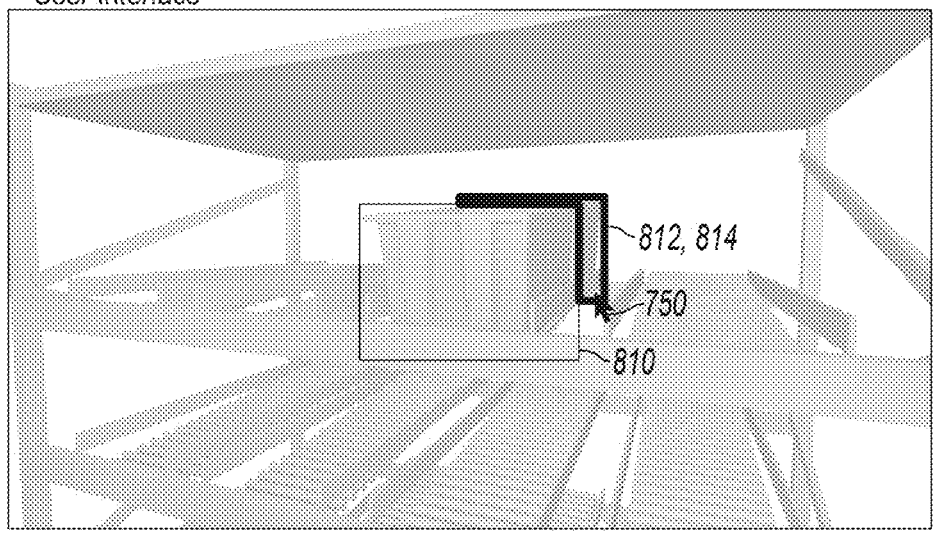
FIG. 69 is a representation similar to FIG. 68 showing a transient effect during an embodiment of the method of FIG. 38.

As shown in FIG. 68, the system 270 can alternatively include the bounding box 810 corresponding to the object 800a in the user interface and further include a bounding box 812 that is a modified form of the bounding box 811. The bounding box 812 can match the bounding box 811, but with a portion intersecting the bounding box 810 omitted. As shown in FIG. 69, the user interface can provide a transient effect 814 similar to the transient effect 760 discussed above in the context of FIG. 60 to facilitate differentiating the bounding box 812 from the bounding box 810. In addition or alternatively, the system 270 can cause the bounding box 812 or another bounding box obscured more than a threshold level to be non-selectable by the user 276. Other forms of modifying an indicator corresponding to a background expected object location are also possible. Furthermore, although FIGS. 63-69 for simplicity illustrate only one pair of objects, other objects and corresponding expected object locations are typically present. The system 270 can evaluate all such expected object locations. Moreover, the evaluation can be independent for every timestep. Thus, an indicator for a background object may be omitted and/or be non-selectable in one view and then reappear and/or become selectable in another view when the background object is less obscured.

As discussed above, eliminating or modifying indicators corresponding to occluded expected object locations can be useful to clarify presentation of these indicators to a user. In addition or alternatively, accounting for occlusion of an expected object location by another expected object location and/or by another known structure in an environment (e.g., by a rack or other support structure) can be useful to enhance a process of training a machine learning algorithm and/or evaluating machine learning models. For example, once a user has indicated that an expected object location contains an object based on the user's review of vision data collected via a vision sensor while the vision sensor has a given pose, additional vision data collected via the vision sensor while the vision sensor has other poses can be associated with this indication. In the additional vision data, however, different levels and/or types of occlusion are likely to be present. Thus, segments of the additional vision data corresponding to the expected object location identified as containing an object may include vision data depicting other objects, structures, etc. that occlude the relevant object. This can be problematic at least because it causes a potential inconsistency between additional vision data corresponding to an expected object location and a corresponding estimate from a machine learning model. For example, the process discussed above with reference to FIGS. 11-35 makes use of contours 512 (FIG. 22) from a machine learning model and corresponding bounding shapes 514 (FIG. 23). The machine learning model in this case does not create estimates for object portions that are not visible due to occlusion. Accordingly, the contours 512 and bounding shapes 514 account for occlusion. Correlating the contours 512 and bounding shapes 514 to expected object locations that do not account for occlusion, therefore, is suboptimal and can impair processes for training a machine learning algorithm and/or evaluating machine learning models. The depth comparison process described in the context of FIGS. 28-35 may compensate for this deficiency in some cases and/or to some degree, but is not a complete solution.

Figure 70:
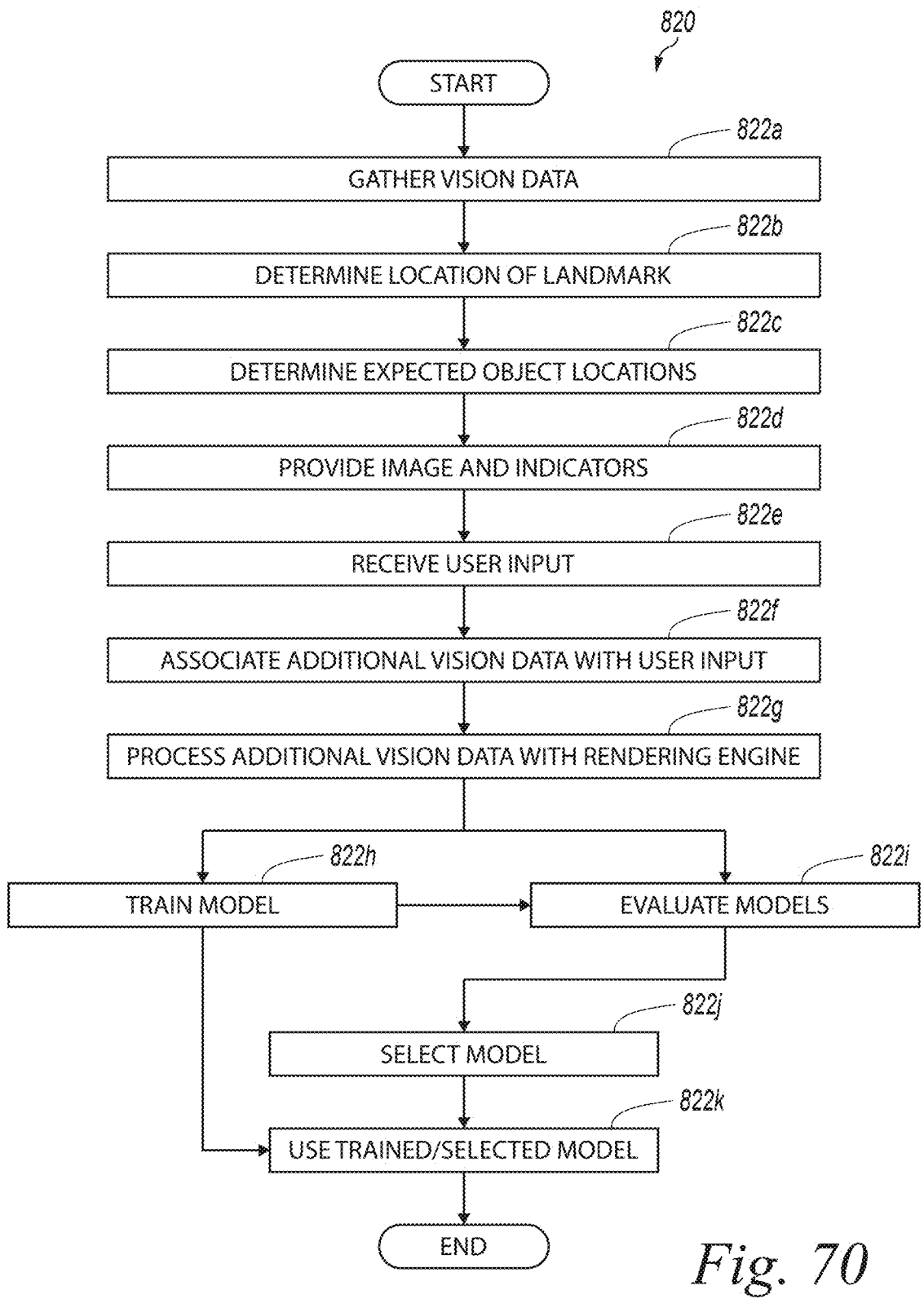
FIG. 70 is a block diagram corresponding to a method related to training machine learning algorithms and/or evaluating machine learning models in accordance with at least some embodiments of the present technology.
Figure 71:
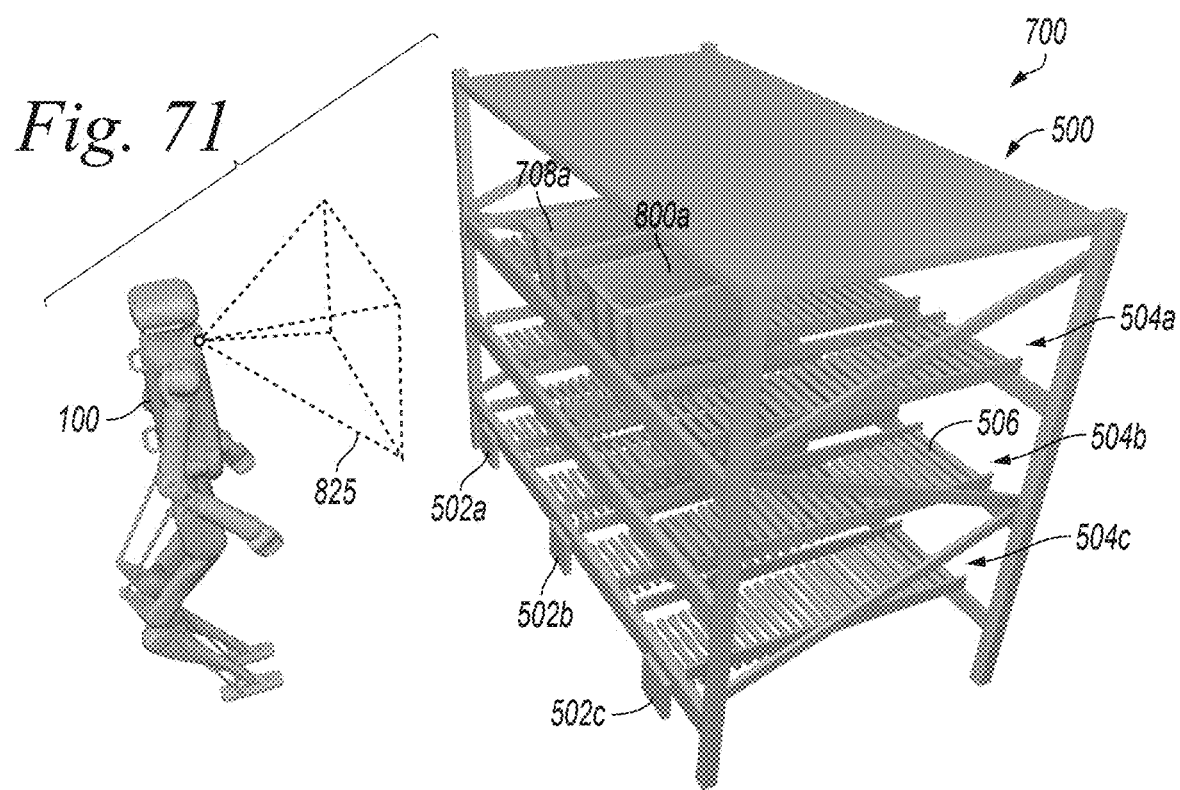
FIG. 71 is a perspective view of the robot of FIGS. 1-3, the support structure of FIG. 12, several objects carried by the support structure, and a field of view of a camera of the robot at a time during an embodiment of the method of FIG. 70.
Figure 72:
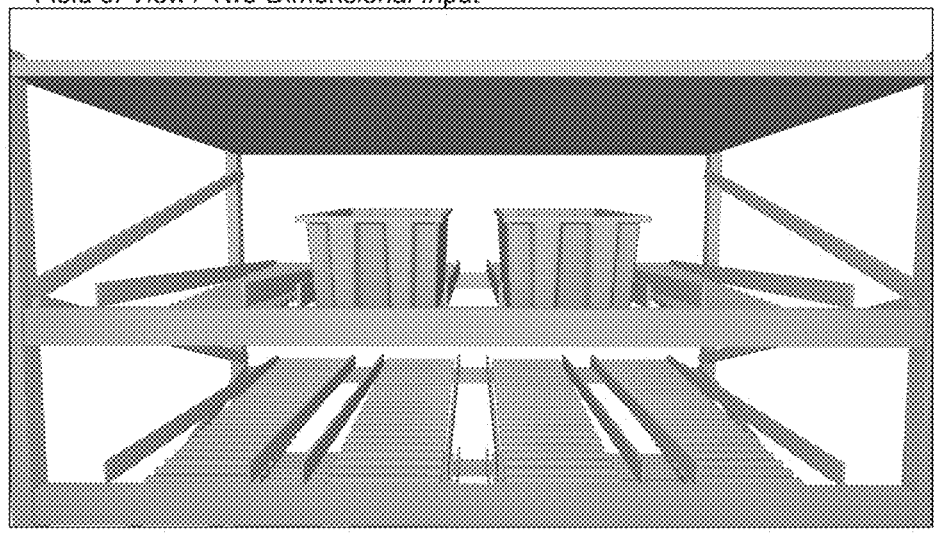
FIGS. 72 and 73 are representations of two-dimensional input to the robot of FIGS. 1-3 via the field of view of FIG. 71 at different respective times during an embodiment of the method of FIG. 70.
Figure 73:
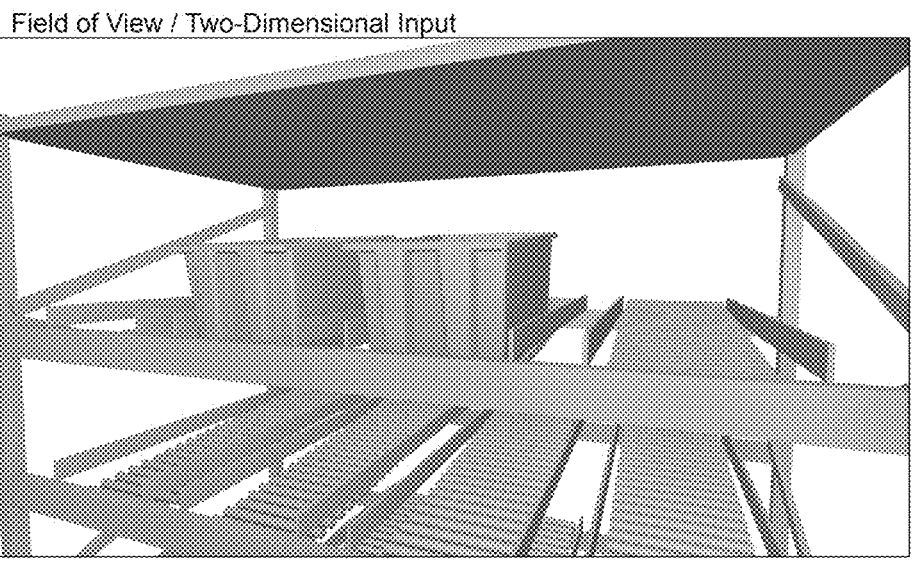

FIG. 70 is a block diagram corresponding to another method 820 related to training machine learning algorithms and/or evaluating machine learning models in accordance with at least some embodiments of the present technology. The diagram includes blocks 822a-822k corresponding to different respective portions of the method 820. FIG. 71 is a perspective view of the robot 100, the support structure 500, the objects 708a, 800a, and a field of view 825 at a time during an embodiment of the method 820. The field of view 825 can be the same as or similar to the first field of view 710 and the field of view 802 discussed above in the context of FIGS. 42 and 63, respectively. FIGS. 72 and 73 are representations of two-dimensional input to the robot 100 via the field of view 825 at different respective times during an embodiment of the method 820. In at least some cases, the method 820 includes generating vision data segments that account for occlusion and using these segments for training a machine learning algorithm and/or for evaluating machine learning models. As shown in FIG. 70, the method 820 can include gathering vision data (block 822a), determining the location of a landmark (block 822b), and determining expected object locations (block 822c). These portions of the method 820 can include any suitable operations discussed above in connection with FIGS. 11-19 and corresponding portions of the method 400. The expected object locations can include first and second expected object locations corresponding to the objects 800a, 708a, respectively. Furthermore, the first and second expected object locations can correspond to different respective bays 506 of the support structure 500.

The method 820 can further include providing an image and indicators corresponding, respectively, to the gathered vision data and the expected object locations shown therein (block 822d). The method 820 can also include receiving user input based at least partially on the provided image (block 822e). These portions of the method 820 can include any suitable operations discussed above in connection with FIGS. 38-69 and corresponding portions of the method 550. Providing the image and the indicators can be via a suitable graphical user interface. The image can correspond to the vision data collected when a vision sensor of the robot 100 is positioned such that the field of view 825 corresponds to FIGS. 71 and 72. The user 276 can generate the user input via interaction (e.g., point-and-click interaction) with the indicators. Furthermore, the user input can include first and second user inputs indicating the presence of the objects 800a, 708a at the first and second expected object locations, respectively. As shown in FIG. 72, the objects 800a, 708a do not occlude one another in the field of view 825 when the vision sensor has a pose corresponding to FIGS. 71 and 72.

The method 820 can further include associating additional vision data with the received user input (block 822f). This can include any suitable operations discussed above in connection with FIGS. 38-69 and corresponding portions of the method 550. In an example, the vision sensor can have a pose corresponding to FIG. 73 when the robot 100 collects the additional vision data. As shown in FIG. 73, the object 800a significantly occludes the object 708a in the field of view 825 when the vision sensor has this pose. Moreover, a front rail (not labeled) of the support structure 500 occludes lower front portions of the objects 800a, 708a. The robot 100 can collect the vision data corresponding to the image that the user 276 views to generate the user input at a different time than a time at which the robot 100 collects the additional vision data to be associated with this user input. These times can be different timesteps within the same session during which respective occupancy states of the first and second expected object locations are unchanged. The vision sensor through which the vision data are collected can have different poses at the different respective timesteps of the session. In at least some cases, the method 820 further includes controlling the robot 100 during the session.

Figure 74:
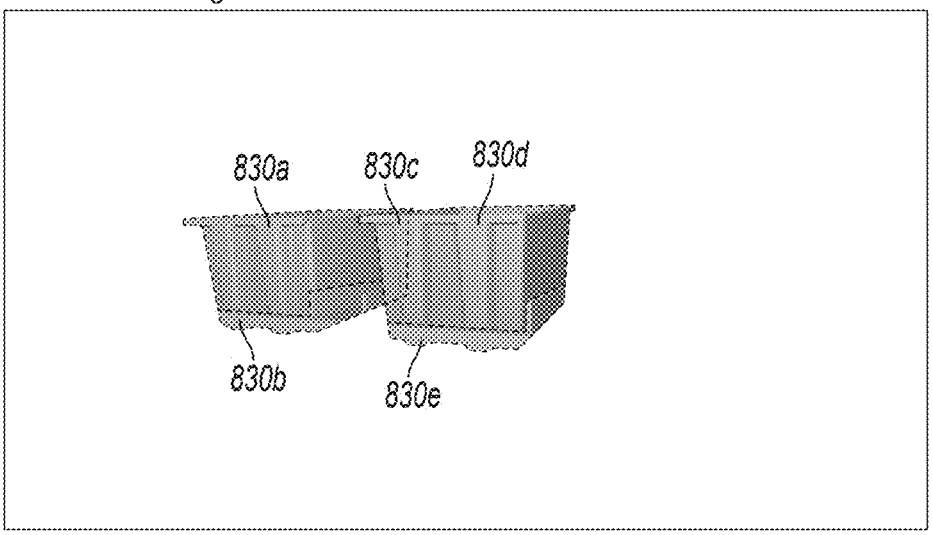
FIG. 74 is a representation of data processing on the two-dimensional input of FIG. 73 during an embodiment of the method of FIG. 70.

As shown in FIG. 70, the method 820 can also include processing the additional vision data via a rendering engine (block 822g). The rendering engine can be part of the object estimator 212' (FIG. 7). In at least some cases, the rendering engine generates a segmentation mask based at least partially on a model of the support structure 500, a model of the object 300 (FIG. 9), known locations at which the support structure 500 can carry the object 300, and the user input. As discussed above, the user input can indicate which expected object locations contain the object 300. Thus, in the example illustrated in FIGS. 71-73, the rendering engine can combine the model of the support structure 500 and copies of the model of the object 300 at the first and second expected object locations. The rendering engine can further use poses of the vision sensor, the support structure 500, and the first and second expected object locations to determine how segments of the segmentation mask relate to one another in three-dimensional space. FIG. 74 is a representation of data processing related to operation of the rendering engine. As shown in FIG. 74, the rendering engine can identify segments 830 (individually identified as segments 830a-830e) corresponding to the first and second expected object locations. The segments 830 can include vision data depicting the objects 708a, 800a and the support structure 500. The rendering engine can use three-dimensional information, such as the three-dimensional information from the model of the object 300, the model of the support structure 500, the pose of the support structure 500, the poses of the first and second expected object locations relative to the support structure 500, and the pose of the vision sensor relative to the support structure 500, to determine whether the segments 830a-830e should be associated with the first expected object location, the second expected object location, or the support structure 500.

The rendering engine can identify an intersection of the first and second expected object locations in a plane corresponding to a perspective of the vision sensor. As shown in FIG. 74, this intersection is at segment 830c in the illustrated example. Furthermore, the rendering engine can determine that the first expected object location overlaps the second expected object location at the intersection based at least partially on respective depth positions of the first and second expected object locations relative to the vision sensor. Based at least partially on identifying the intersection and a result of comparing the respective depth positions of the first and second expected object locations, the rendering engine can reduce or otherwise modify a portion of the additional vision data corresponding to at least one of the first and second expected object locations. For example, the rendering engine can subtract vision data corresponding to the intersection from vision data that would otherwise be associated with the second expected object location. Correspondingly, with reference to FIG. 74, the rendering engine can subtract vision data corresponding to the segment 830c from the vision data that would otherwise be associated with the second expected object location.

Figure 75:
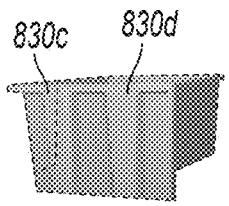
FIGS. 75 and 76 are representations of different portions of the two-dimensional input of FIG. 73 corresponding to first and second expected object locations in the environment, respectively, after the data-processing of FIG. 74 during an embodiment of the method of FIG. 70.

In addition to or instead of accounting for occlusion between two or more expected object locations, the rendering engine can account for occlusion between an expected object location and another known structure. The other known structure can be a reference structure on which the expected object locations are based. Furthermore, the other known structure can be a support structure that carries objects at the expected object locations. For example, the rendering engine can subtract vision data corresponding to intersections of the support structure 500 and the first and second expected object locations in the plane corresponding to the perspective of the vision sensor from vision data that would otherwise be associated with the first and second expected object locations. Correspondingly, within reference to FIG. 74, the rendering engine can subtract vision data corresponding to the segment 830b from the vision data that would otherwise be associated with the first expected object location and can subtract vision data corresponding to the segment 830e from the vision data that would otherwise be associated with the second expected object location. FIGS. 75 and 76 are representations of different portions of the two-dimensional input of FIG. 73 corresponding to the first and second expected object locations, respectively, after the data-processing of FIG. 74. As shown in FIG. 75, the additional vision data corresponding to the first expected object location can include vision data of the segments 830c, 830d. As shown in FIG. 76, the additional vision data corresponding to the second expected object location can include vision data of the segment 830a.

With reference again to FIG. 70, the method 820 can further include training a machine learning algorithm (block 822h) and/or evaluating machine learning models (block 822i) using the processed additional vision data. These portions of the method 820 can include any suitable operations discussed above in connection with FIGS. 38-69 and corresponding portions of the method 550. In at least some cases, the method 820 includes providing the additional vision data and/or derivatives thereof to a machine learning algorithm with modifications based at least partially on occlusion. The method 820 can further include training the machine learning algorithm on the modified additional vision data and/or derivatives thereof. Potential derivatives include bounding shapes. For example, in the method described above in the context of FIG. 26, a counterpart of the bounding shape 516b can be based on the corresponding expected object location partially occluded by a front rail of the support structure 500 rather than on the corresponding expected object location unoccluded. This, in turn, can cause a counterpart of the comparison process described in the context of FIG. 27 to be more reliable than would otherwise be the case. As shown in FIGS. 20-22, the contour 512b corresponding to the putative object estimate for the object 510b also accounts for occlusion.

The method 820 can further include selecting a machine learning model (block 822j) after evaluating machine learning models. The method 820 can also include using a trained and/or selected machine learning model (block 822k). These portions of the method 820 can include any suitable operations discussed above in connection with corresponding portions of the method 550. Although the method 820 is described above with the rendering engine determining how modeled objects occlude one another, other approaches to this aspect of the method 820 are also possible. For example, occlusion can be resolved at least partially using heuristics. Suitable heuristic-based processes include those involving comparing three-dimensional positions of centroids, such as the process described above in the context of FIGS. 29-36. In these and other cases, it can be useful to divide a relatively large structure into parts that can be identified based on corresponding centroids as being in the foreground or background relative to an expected object location. For example, the overall model of the support structure 500 can be divided into submodels of various rails, walls, pillars, etc. of the support structure 500. An algorithm for determining how modeled objects occlude one another can then compare centroids for the submodels to centroids for the expected object locations.

A rendering engine as described in the context of the method 820 can have uses in various embodiments of the present technology other than those associated with improving the reliability of propagated user input. For example, with reference to FIG. 6, the object estimator 212 can include a rendering engine that processes expected object locations from the expected object location estimator 256 before the expected object locations are sent to the two-dimensional checker 262 and/or to the three-dimensional checker 266. In some cases, two-dimensional checking of expected object locations processed via a rendering engine may be reliable enough to eliminate the need for the three-dimensional segmenter 264 and the three-dimensional checker 266. In other cases, a rendering engine, the three-dimensional segmenter 264, and the three-dimensional checker 266 can be used together. Furthermore, with reference to FIG. 7, the labeler 274 can include a rendering engine that processes expected object locations from the expected object location estimator 256' before the expected object locations are sent to the playback tool 275 and/or to the object estimator 212'. In these and other cases, the labeler 274 can generate indicators for expected object locations that account for occlusion. This can at least partially address issues of ambiguity for the user 276, such as those discussed above in the context of FIGS. 63-69. Examples of suitable rendering engines for use with the method 820 include MuJoCo® (DeepMind Technologies Limited) and Unreal® (Epic Games, Inc.).

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may be disclosed herein in the context of those embodiments, other embodiments may also exhibit such advantages, and not all embodiments need necessarily exhibit such advantages or other advantages disclosed herein to fall within the scope of the present technology. This disclosure and the associated technology can encompass other embodiments not expressly shown or described herein.

Certain methods described herein may be performed and fully automated by a computer system. As discussed elsewhere in this disclosure, the computer system may include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions. Further, the various illustrative logical blocks and modules described in connection with various embodiments disclosed herein can be implemented or performed by a machine, such as a processor device, a digital signal processor, an application specific integrated circuit (ASIC), a field programmable gate array (FPGA), or other programmable logic device, discrete gate or transistor logic, discrete hardware components, or any combination thereof designed to perform the corresponding functions. Where the computer system includes multiple computing devices, these devices may, but need not, be co-located. Results of at least some disclosed methods may be persistently stored by transforming physical storage devices, such as solid-state memory chips or magnetic disks, into a different state. In at least some embodiments, the computer system may be a cloud-based computing system in which processing resources are shared by multiple distinct business entities or other users.

In various embodiments, a network-based service may be requested or invoked through the use of a message that includes parameters and/or data associated with the network-based services request. Such a message may be formatted according to a particular markup language and/or may be encapsulated using a protocol such as Simple Object Access Protocol (SOAP). To perform a network-based services request, a network-based services client may assemble a message including the request and convey the message to an addressable endpoint corresponding to the network-based service, using an Internet-based application layer transfer protocol such as Hypertext Transfer Protocol (HTTP). Furthermore, when suitable, network-based services may be implemented using Representational State Transfer (RESTful) techniques rather than message-based techniques. For example, a network-based service implemented according to a RESTful technique may be invoked through parameters included within an HTTP method such as PUT, GET, or DELETE, rather than encapsulated within a SOAP message.

Operations described and/or illustrated in the present disclosure may begin in response to an event, such as on a predetermined or dynamically determined schedule, on demand when initiated by a user, or in response to some other event. When such operations are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In at least some embodiments, such operations may be implemented on multiple computing devices and/or multiple processors, serially or in parallel. Furthermore, depending on the embodiment, certain acts, events, functions, etc. of processes or algorithms described herein can be performed in a different sequence, can be added, merged, or left out altogether. Moreover, in certain embodiments, operations or events can be performed concurrently, such as through multi-threaded processing, interrupt processing, or multiple processors or processor cores or on other parallel architectures, rather than sequentially.

Logical blocks, modules, routines, and algorithm steps described in connection with various embodiments disclosed herein can be implemented as electronic hardware, computer software that runs on computer hardware, or combinations of both. A processor device can be a microprocessor, but in the alternative, the processor device can be a controller, microcontroller, or state machine, combinations of the same, or the like. A processor device can include electrical circuitry to process computer-executable instructions. Furthermore, a processor device can include a FPGA or other programmable device that performs logic operations without processing computer-executable instructions. A processor device can also be implemented as a combination of computing devices. Although described herein primarily with respect to digital technology, a processor device may also include primarily analog components. For example, rendering techniques may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Any reference herein to "the inventors" means at least one inventor of the present technology. As used herein, the terms "generally," "substantially," "about," and similar terms are used as terms of approximation and not as terms of degree, and are intended to account for the inherent variations in measured or calculated values that would be recognized by those of ordinary skill in the art. Additionally, the terms "comprising," "including," "having," and the like are used throughout this disclosure to mean including at least the recited feature(s) such that any greater number of the same feature(s) and/or one or more additional types of features are not precluded. This is the case even if a particular number of features is specified unless that specified number is preceded by the word "exactly" or another clear indication that it is intended to be closed ended. In a particular example, "comprising two arms" means including at least two arms.

Directional terms, such as "upper," "lower," "front," "back," "vertical," and "horizontal," may be used herein to express and clarify the relationship between various structures. It should be understood that such terms do not denote absolute orientation. The term "centroid" as used herein refers to a center-like data element for a given shape in two-dimensional or three-dimensional space. There are several known approaches to calculating centroids including approaches of greater and lesser precision. No particular approach is contemplated herein. Reference herein to "one embodiment," "an embodiment," or similar phrases means that a particular feature, structure, or operation described in connection with such phrases can be included in at least one embodiment of the present technology. Thus, such phrases as used herein are not all referring to the same embodiment. The headings provided herein are for convenience only. No heading in this disclosure should be interpreted as limiting the scope of the subject matter under such heading. Unless preceded with the word "conventional," reference herein to "counterpart" devices, systems, methods, features, structures, or operations refers to devices, systems, methods, features, structures, or operations in accordance with at least some embodiments of the present technology that are similar to a described device, system, method, feature, structure, or operation in certain respects and different in other respects. Finally, it should be noted that various particular features, structures, and operations of the embodiments described herein may be combined in any suitable manner in additional embodiments in accordance with the present technology.

We claim:

1. A computer implemented method comprising:
   providing, to a user via a graphical user interface, an image depicting an environment and corresponding to vision data collected by a vision sensor of a robot at a given timestep of a plurality of timesteps;
   receiving first user input for a first expected object location within the environment, wherein the first user input indicates a presence of a first object at the first expected object location and at the plurality of timesteps and is based at least partially on the image;
   receiving second user input for a second expected object location within the environment, wherein the second user input indicates a presence of a second object at the second expected object location and at the plurality of timesteps;
   associating additional vision data with the first and second user inputs, wherein the additional vision data is collected by the vision sensor at an additional timestep of the plurality of timesteps, and wherein the vision sensor has different respective poses at the given timestep and at the additional timestep;
   identifying an intersection of the first and second expected object locations in a plane corresponding to a perspective of the vision sensor at the additional timestep;
   determining that the first expected object location overlaps the second expected object location at the intersection and at the additional timestep based at least partially on respective depth positions of the first and second expected object locations relative to the vision sensor at the additional timestep; and
   modifying a portion of the additional vision data corresponding to the second expected object location based at least partially on identifying the intersection and determining that the first expected object location overlaps the second expected object location.

2. The method of claim 1, wherein modifying the portion of the additional vision data corresponding to the second expected object location includes subtracting vision data corresponding to the intersection from the additional vision data corresponding to the second expected object location.

3. The method of claim 1, wherein identifying the intersection, determining that the first expected object location overlaps the second expected object location, and modifying the portion of the additional vision data corresponding to the second expected object location are at least partially via a rendering engine having the additional vision data, a model of the first object, an occupancy state of the first expected object location, a model of the second object, and an occupancy state of the second expected object location as inputs.

4. The method of claim 1, wherein:
   the method further comprises providing, to the user via the graphical user interface, an indicator operably associated with the image;
   the indicator corresponds to the first expected object location; and
   receiving the first user input includes receiving the first user input via user interaction with the indicator.

5. The method of claim 4, wherein:
   the indicator is a first indicator;
   the method further comprises providing, to the user via the graphical user interface, a second indicator operably associated with the image;
   the second indicator corresponds to the second expected object location; and
   receiving the second user input includes receiving the second user input via user interaction with the second indicator.

6. The method of claim 1, wherein:
   the given timestep and the additional timestep are at different respective times of a session during which respective occupancy states of the first and second expected object locations are unchanged; and
   the vision data and the additional vision data are within a log of the session.

7. The method of claim 6, further comprising controlling the robot during the session.

8. The method of claim 1, further comprising providing the modified portion of the additional vision data, a derivative thereof, or both to a machine learning algorithm.

9. The method of claim 1, further comprising training a machine learning algorithm on the modified portion of the additional vision data, a derivative thereof, or both.

10. The method of claim 1, wherein:
    the robot is a first robot; and
    the method further comprises using a machine learning model based at least partially on the modified portion of the additional vision data to control a second robot in the environment.

11. The method of claim 1, further comprising:
    determining a location of a landmark within the environment; and
    determining the first and second expected object locations based at least partially on the location of the landmark.

12. The method of claim 1, further comprising:
    generating a putative object estimate based at least partially on the modified portion of the additional vision data;
    determining that the putative object estimate corresponds to the second expected object location; and
    determining a correspondence between the putative object estimate and the second user input.

13. The method of claim 12, wherein:
    the putative object estimate is a first putative object estimate;
    the correspondence is a first correspondence;

generating the first putative object estimate includes generating the first putative object estimate using a first machine learning model; and the method further comprises:
- generating a second putative object estimate based at least partially on the modified portion of the additional vision data and using a second machine learning model,
- determining that the second putative object estimate corresponds to the second expected object location, and
- determining a second correspondence between the second putative object estimate and the second user input.

14. The method of claim 12, wherein:

generating the putative object estimate includes generating the putative object estimate using a machine learning model; and the method further comprises generating a performance measurement for the machine learning model based at least partially on the correspondence.

15. The method of claim 14, wherein:

the robot is a first robot;

the putative object estimate is a first putative object estimate;

the correspondence is a first correspondence;

the machine learning model is a first machine learning model;

the performance measurement is a first performance measurement; and the method further comprises:
- generating a second putative object estimate based at least partially on the modified portion of the additional vision data and using a second machine learning model,
- determining that the second putative object estimate corresponds to the second expected object location,
- determining a second correspondence between the second putative object estimate and the second user input,
- generating a second performance measurement for the second machine learning model based at least partially on the second correspondence, and
- selecting one of the first and second machine learning models over the other of the first and second machine learning models to control a second robot in the environment based at least partially a difference between the first and second performance measurements.

16. A computer implemented method comprising:

providing, to a user via a graphical user interface, an image depicting an environment and corresponding to vision data collected by a vision sensor of a robot at a given timestep of a plurality of timesteps;

receiving user input for a first location within the environment, wherein the user input indicates a presence of an object at the first location and is based at least partially on the image;

associating additional vision data with the user input, wherein the additional vision data is collected by the vision sensor at an additional timestep of the plurality of timesteps, and wherein the vision sensor has different respective poses at the given timestep and at the additional timestep;

identifying an intersection of the first location and a second location in the environment in a plane corresponding to a perspective of the vision sensor at the additional timestep;

determining that the second location overlaps the first location at the intersection based at least partially on respective depth positions of the first and second locations relative to the vision sensor at the additional timestep; and modifying a portion of the additional vision data corresponding to the first location based at least partially on identifying the intersection and determining that the second location overlaps the first location.

17. The method of claim 16, wherein the second location is a location of a portion of a support structure within the environment.

18. The method of claim 17, wherein identifying the intersection, determining that the second location overlaps the first location, and modifying the portion of the additional vision data corresponding to the first location are at least partially via a rendering engine having the additional vision data, a model of the object, an occupancy state of the first location, and a model of the portion of the support structure as inputs.

19. The method of claim 17, wherein the first location corresponds to a bay of the support structure.

20. The method of claim 19, wherein the second location is a location of a rail of the support structure.

* * * * *